United States Patent
Slater et al.

(10) Patent No.: US 7,441,261 B2
(45) Date of Patent: Oct. 21, 2008

(54) VIDEO SYSTEM VARYING OVERALL CAPACITY OF NETWORK OF VIDEO SERVERS FOR SERVING SPECIFIC VIDEO

(75) Inventors: Alastair Michael Slater, Malmesbury (GB); Mark Robert Watkins, Bristol (GB); Andrew Michael Sparkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 10/455,405

(22) Filed: Jun. 6, 2003

(65) Prior Publication Data

US 2004/0010588 A1 Jan. 15, 2004

(30) Foreign Application Priority Data

Jun. 7, 2002 (GB) ................................. 0213072.2

(51) Int. Cl.
H04N 7/06 (2006.01)
(52) U.S. Cl. .............................. 725/96; 725/87; 725/98; 709/219; 718/105
(58) Field of Classification Search ................. 709/217, 709/218, 219, 238; 705/40; 725/31, 115, 725/96, 87, 98; 713/320; 370/486, 401; 714/6; 718/105

See application file for complete search history.

(56) References Cited

U.S. PATENT DOCUMENTS

| | | | |
|---|---|---|---|
| 6,170,006 B1 | 1/2001 | Namba | |
| 7,143,433 B1 * | 11/2006 | Duan et al. | 725/115 |
| 2001/0027491 A1 * | 10/2001 | Terretta et al. | 709/238 |
| 2002/0066050 A1 * | 5/2002 | Lerman et al. | 714/6 |
| 2002/0131428 A1 * | 9/2002 | Pecus et al. | 370/401 |
| 2003/0035442 A1 * | 2/2003 | Eng | 370/486 |
| 2003/0079222 A1 * | 4/2003 | Boykin et al. | 725/31 |
| 2003/0200473 A1 * | 10/2003 | Fung | 713/320 |
| 2003/0236745 A1 * | 12/2003 | Hartsell et al. | 705/40 |

FOREIGN PATENT DOCUMENTS

| | | |
|---|---|---|
| JP | 9-321759 | 12/1997 |
| WO | WO 00/75802 | 12/2000 |

\* cited by examiner

*Primary Examiner*—Le Luu

(57) ABSTRACT

A method of serving out video over a network of video servers includes evaluating a capacity of the network as a whole to serve out specific video items by establishing, for each video server in the network, an established ability of each server to serve out the specific items that are potentially servable from each video server. The method further includes using the established abilities of each video server to evaluate an overall capability of the network as whole to serve out each of the specific video items. The method also includes varying the overall capability to serve out at least a selected one of the specific video items in accordance with the overall capability of the network.

11 Claims, 25 Drawing Sheets

VIDEO SYSTEM VARYING OVERALL CAPACITY OF NETWORK OF VIDEO SERVERS FOR SERVING SPECIFIC VIDEO

BACKGROUND OF THE INVENTION

1. Field of the Invention

The present invention relates to serving out video over a network of video servers. More particularly, the present invention relates to a method of serving out video over a network of video servers, a video server monitor, a network of video servers, a video server, software for running on a processor of a video server, a method of modifying availability of video items on a network of video servers and a video serving system.

2. Description of the Related Art

Current web server systems, for example, e-commerce systems, application servers or any other web accessible systems, to be used as web-servers for connection to the Internet typically comprise a web-tier, an application tier and a storage tier, (see, for example, FIG. 1). The web-tier is typically highly replicated and homogeneous, having a large number of web servers that have data and applications highly distributed over them in a homogenous manner. These servers all do the same thing. Each of these web-servers will serve the same data for a given service provider (for example, xSP Internet, application or storage) in order to spread the accessibility of the data to thousands of users. The data content of each server in the web tier is therefore identical across all of the servers. This results in a massive utilization of disc space, in which some of the data content is not heavily accessed. This leads to a large amount of redundant storage, that is, a lot of data content and application is frequently not served out at all.

Load balancing (that is, directing, a specific request for a specific resource to be served out to a specific chosen server on the web tier) can be used to attempt to provide a better, faster, service to users of the World Wide Web. For example, "IP Virtual Server" software exists for Linux. Current web-based load balancing techniques for balancing the load between web tier servers are rudimentary and in one known version of load balancing, involve a principal server, router, or director server. Requests for data are distributed to a series of identical data content servers sequentially in turn until a server capable of servicing the request is found. The director server is looking for a server with the processing power available to service the request for data. The director server performs this function by asking a series of servers in "Round-Robin" until it finds one capable of servicing the request. In an alternative load-balancing technique for web tier servers, the director server (or router) sends an investigatory signal to the web tier servers and assesses which server had the quickest response time. The director server then directs the request to be serviced to the web tier data content server that provided the fastest reply. This technique of measuring response time is primarily a measure of the telecommunication links to the web tier servers, that is, the capacity of the telecom links is the major factor in determining response time. Depending upon whether or not the data content web tier server has a dedicated IC (interface card), the response time can be slightly influenced by how busy the CPU of the web tier server is. However, telecom factors usually far outweigh this.

Application servers (that is, servers in a network serving network particular applications—often different applications on different networked servers) have a scalability problem if demand for a particular application rises. Clustering is one answer to problems of providing greater access to data and functionality. However, it is expensive to replicate data content and functionality, and it is difficult to expand the capacity of a cluster of services horizontally by the addition of more resources in real time while the system is operational.

Clusters are not easily scaled horizontally by the addition of more network attached storage (NAS) at the web-tier level. NAS typically does not scale well horizontally as it is attached via a network interface card (NIC) to the network and there is a limit on the number of network connections allowed by the NIC. A NIC has a capacity to handle a limited number of connections. Cards are typically rated at 10 $Mbits^{-1}$/100 $Mbits^{-1}$/1000 $Mbits^{-1}$. Clusters typically require the purchase of expensive, cluster certified disc arrays and fiber channel, to support shared data between clustered servers.

Clustered systems typically fall into either a 'shared everything' class, where fiber channel, storage and switches, etc. are shared by the clustered machines, or a 'shared nothing' class, where each machine on the cluster has its own storage, fiber channel and switches, etc. It is difficult to configure the cluster. The 'shared nothing' arrangement is very expensive with high-end disc arrays costing around $300,000 per TeraByte (TB). Furthermore, since each disc cluster will contain similar data content at each server, or node, the expenditure on storage and other peripherals rapidly escalates.

A further problem with current web tier servers is that it is difficult and expensive to add extra data. For example, in the field of Internet Video Serving (that is, serving out video movies over the internet) a video website can have, say, ten web tier servers each having a copy of the one hundred most popular video films on them. A director server, or router, receives a request for a specific video and directs it to a chosen one of the ten servers either on the basis of "Round-Robin", or by assessing telecom response time. The chosen server serves out the selected video. However, let us imagine that a new video is to be added to the available videos. The new video is loaded into the memories of each of the ten web tier servers and added to the available videos deliverable in the directory of the director server. It will probably be necessary to delete a video from the available number of videos to make room in the memories of the web tier servers.

A lot of the memory of each web tier server is not actively used in any given period of time. A lot of the memory is redundant most of the time, but is needed in case there is a request for a less frequently requested video.

There are difficulties in horizontally scaling. Adding another web tier server means updating the director server and copying the data content of the other web tier servers to the new web tier server, so that the new web tier server has the same data content as that of the other web tier servers.

If it is desired to increase the number of video titles available at that website, it is necessary to increase the memory capacity (for example, the disc capacity) of each of the web tier servers so that they can accommodate more videos.

Currently collections of servers that deliver content to a user, for example, streaming videos, are unaware of their storage capacity, connection capacity and bandwidth usage. A central management tool, typically a management protocol, such as simple network management protocol (SNMP), loaded on an overseer machine, can in known systems assume a wide scale, low level monitoring responsibility that will typically include tripping an alert on a monitoring station if a server, or other network element, fails or if network traffic exceeds a threshold value. An attendant problem with this arrangement is that at the time that an alert is registered, it can be too late for a network administrator (person) to introduce a replacement server, or other additional network element, prior to a catastrophic system failure. Also, there cannot be a network administrator present at all times to react to a warning message.

As an example, the wide variations in demand for web-sites, for example, an increased demand for information, or live video feed during major sporting events, has resulted in web-sites crashing since the systems administrator cannot establish the rate of change of requests quickly enough in order to add resources quickly enough to cope with the fluctuations in demand. A known solution to this problem is to massively over provide for the availability of data to users, that is, to have much more data-serving capacity than is normally needed. This is expensive and inefficient as at times of low data demand. It results in large amounts of storage devices lying idle. High-end disc arrays typically cost $300,000 per TeraByte (TB).

It is possible to provide clusters of servers in order to accommodate fluctuations in demand for data. However, as mentioned above, clusters typically require the purchase of expensive, cluster certified disc arrays and network infrastructure, typically fiber channel, to support shared data between network nodes. Additionally, clusters tend to be built in advance of demand and are not readily horizontally scaleable, for example, by the addition of network attached storage (NAS) or by the addition of direct attached storage (DAS) to servers.

Video serving over the Internet is currently not very popular because it is so expensive, for the reasons discussed above.

SUMMARY OF THE INVENTION

In accordance with a first aspect the present invention, a method of satisfying a demand on a network for a network resource comprises: providing the network with a demand director server, a first resource server having a first resource thereon, and a second resource server having a second, different, resource thereon. The director server has information as to what resources are held on the first and second resource servers and upon receipt of a request for one of the first and second resources, the director server selects one of the first and second resource servers to serve out the requested resource and directs the request to the selected one of the first and second resource servers. The demand server selects an appropriate one of the first and second resource servers to receive the request using its knowledge of where the requested resource is located.

Previously, in worldwide web-based networks, there has been no differentiation in resources provided on web-tier servers, that is, the deliverable data content and applications have been homogenous between web-tier resource servers. Furthermore, even in other, non-Internet/World Wide Web environments, networked servers capable of serving out the same kind of resource (for example, videos) have all had identical content.

In the above-noted method, the demand director has information as to where different resources are stored so as to be able to direct a request for resources to the appropriate server that actually has the requested resource stored on it. However, the demand director is not necessarily aware of the current demand/load on each resource server.

In accordance with another aspect the invention, a method of satisfying a demand on a network for a network resource comprises: providing the network with a demand director server, a first resource server having a first resource thereon, and a second resource server having a second resource thereon. The director server has information as to the unused resource-serving capacity of the first resource server and of the unused resource-serving capacity of the second resource-server. The director server, upon receipt of a request for a requested resource present on both the first resource server and the second resource server, selects a selected one of the first and second resource servers to be the resource server that serves the requested resource. The director server selects the selected one of the resource servers using a knowledge of whether or not the first and second resource servers have unused resource-serving capacity capable of serving the requested resource.

In the method noted above, the director server is usage-aware (usage of the server, as well as or instead of telecommunications availability to the server), and the content, or resources, of the resource server can or cannot be dissimilar.

In accordance with a third aspect the invention, a method of sharing the demand for resources between a plurality of networked resource servers comprises: providing dissimilar resource content on at least some different resource servers, in accordance with what resource is available for serving out from which of the networked resources servers and the resource servers' current capacity to satisfy a request for resources that they are capable of serving, and allocating a request for a requested resource to a selected resource server chosen in accordance with the requested resource being available for serving and having the capacity to satisfactorily serve out the requested resource.

The method in accordance with third aspect of the present invention combines the methods in accordance with the first and second aspects of the present invention.

The director unit can also comprise a resource server (for example, it can also serve out resources such as videos). The data can be rich media files, which typically include real time (RT) video and/or audio files and/or MPEG files, and/or Real Networks format video data or Windows Media format data or any other file based format.

Each resource server can store dissimilar data content thereupon. The term dissimilar in this context means either (1) that the data, or resources, accessible by an external user is not directly mirrored and completely replicated across all of the resource servers units (whereas the operating system, etc. can be the same for all of the resource servers); or (2) that the data, or resources, accessible by an external user is very substantially different between at least some of the resource servers; or (3) that the data, or resources, externally accessible by a user is wholly different, or nearly so, between at least some of the resource servers, or (4) that there is a great deal of data content, or resource, difference between different resource servers some of which can or cannot have any shared, common, deliverable-to-the-user resource. At one extreme, each resource server could have entirely different, or nearly so, resource content. On the other hand, some content between some or all resource servers can be duplicated.

The director server can have a database therein which can detail which resource server has any given resource thereupon and can detail any one, or combination of the following for any given resource: access figures, statistics, metrics on utilization, number of clients, or users, currently accessing the data, time periods of frequent access number of clients, or users, historically served.

The resource servers can have data storage units associated therewith. The data storage units will typically be disc arrays but can include tape drives. The data storage units can be internal to the resource servers and/or they can be external to the resource servers, for example, network attached storage (NAS).

The director server can be arranged to load balance data access and/or the distribution of data across the server network, or across a server farm. The concept of automatically moving data, or resources, around the network to improve network performance is novel.

A request can be serviced by whichever resource server is adjudged to be the most able to serve out said requested resource. A requested selected resource server can serve up a reply to a request for resource in such a way that the reply appears to a requester who made the request to be coming from the demand director. The demand director server can be arranged to forward a packet of a request to a chosen resource server. The chosen resource server re-writes the packet header. The resource server can have first and second network interface cards (NICs). The second NIC can be configured to enable communications with an external network. The demand director server can have an interface, which can be arranged to specify input/output ports for an application and/or resource servers. The first NIC can be configured to enable intra-farm, or intra-network communication, typically with the demand director server. Having two subnets serves to restrict communications with outside users and movement of data within the farm or network to alter its availability to serve. Thus, one subnet can exist for each function so as not to congest either subnet.

The resource server can be arranged to rewrite the packet headers of outgoing data such that they appear to be transmitted from the demand director server. This will typically involve writing a network address of the director unit, usually a transmission control protocol/internet protocol (TCP/IP) address, with the packet header.

The director can provide an ephemeral means to access the data, for example, via the use of a file systems symbolic link which is typically time limited and is removed after the passage of a pre-determined length of time, usually after a client, or user, has already started accessing resources (for example, content). The removal of the symbolic link does not typically alter the client's consumption of the data but will usually prevent reaccess of the data without requesting a new session through the director.

The demand director server can be arranged to configure and/or start and/or stop resources (or applications) upon the resource servers and/or add, and/or remove, at least one resource server from the network, or farm, in response to variations in the number of requests for data. Alternatively, the director unit can be arranged to recommend to an administrator (for example, a person) the addition/removal of at least one resource server to/from the farm (or network) in response to variations in the number of requests for resources. The demand director server can be arranged to distribute data over the resource servers of the network/web tier/farm.

A resource can be created from a resource server by copying a resource onto another resource server, and informing the demand director that the copied resource exists on another resource server. The copying of the copied resource can increase the availability of the copied resource available for serving out from the resource servers. A resource can be deleted from a selected resource server, thereby freeing-up resource server capabilities for use in serving up a different resource. It can be desirable to dynamically distribute servable resources between available resource servers in accordance with the demand for the resources, and to vary the capacity of the resource servers collectively to serve out demand for a particular resource in accordance with the demand for the particular resource. The demand director server can communicate with an additional resource server that previously was not making its resources available for serving requests received by the demand director server, and can arrange for the additional resource server to make its resources available for serving requests received by the demand director server.

A method in accordance with an embodiment of the present invention can provide horizontally scaleable, distributed data storage, connected to a network, typically for use with audio or video data.

The concept of copying, or migrating, data dynamically to expand overall network capacity to serve out a particular kind of resource can apply to arrangements where all web tier servers have the same content/resources. It is still possible to add a server (with the same content) to the network in response to demand. It is still possible to increase the capacity of all servers together to serve out a specific resource that is in demand (for example, a further copy of the most popular movie could be added to each content server in response to demand, possibly at the expense of over-writing a copy of a less popular movie. It is not absolutely essential to use different, asymmetrically distributed, resources/content to use the "migration/copying of content" feature.

There can be more than one demand director server. This increases fault tolerance.

In accordance with another aspect of the present invention, a demand director server comprises a processor and a data storage device, the demand director server being arranged to manage asymmetric distribution of data across a plurality of data storage devices and mediate requests for access to the data to load balance the requests for data received by each of the data storage devices.

The demand director can copy data to different memory locations itself, or can initiate a data copying process performed by another machine. The management of the data across the plurality of storage devices improves the efficiency of data storage. The load balancing of the requests for data improves the efficiency of usage of the storage devices and ensures a high degree of reliability with respect to supplying files to a user.

The processor can be arranged to facilitate the uploading of data from tape media, a DVD, or an audio CD, to the storage devices. Alternatively, the processor can be arranged to facilitate the downloading of data from a network, typically the Internet.

The processor can be arranged to update a data (or resource, or content)-location database, for example, whenever any one or more, of the following occurs: the number of storage devices is increased or decreased, data is copied to or deleted from a storage device, data is uploaded or downloaded to a storage device, or an application or resource, resident upon a data storage device, is started up or shut down.

The demand director server can be arranged to act as a Level 7 switch. High-level network switches are aware of the types of requests being made within a data packet and can deal with the contents of the packet dependent upon the type of request. Level 7 switches are described in the Open Systems Level model of network information systems.

In accordance with another aspect of the present invention, a method of data storage management of data in a network comprises:

(1) monitoring the usage of a servable resource;
(2) determining if the usage of the resource has increased or decreased;
(3a) introducing an additional resource server to the network and/or starting up a resource-serving application on a resource server if the usage has increased; and/or
(3b) removing the resource from a resource server and/or shutting down a resource-serving application on a resource server if the usage has decreased.

In many embodiments of the method in accordance with the present invention, especially those with asymmetrically distributed resources/content over the resource servers, a database containing details of which resource servers have which particular resources thereupon will be updated.

The method can include removing a resource server from the network as part of step (3b). The method can include copying a resource to the additional resource server as part of step (3a). The resource can be a data file, such as a video.

In accordance with a fourth aspect the present invention, a server network comprises: a demand director server, a first resource server having a first resource on it, and a second resource server having a second resource on it, the second resource being different from the first resource. The director server has information as to where the first and second resources are located, and can receive a request for a selected one of the first and second resources to be served out, and can direct the request to whichever resource server is determined to have the requested resource.

The request can originate from outside of the network, and the resource can be served out of the network.

In accordance with another aspect the present invention, a server network comprises: a demand director server, a first resource server having a first resource thereon, and a second resource server having a second resource thereon. The demand director server is adapted to have information as to the unused resource-serving capacity of the first resource server and of the second resource server, and the director server, upon receipt of a demand for a requested resource present on both the first and said second resource servers, can select a selected one of the first or second resource servers to serve out the requested resource and cause the selected one of the first or second resource servers to serve out the requested resource. The demand director is adapted to select, in accordance with the unused resource-serving capacities of the selected resource of the first and second resource servers, which resource server is to be the selected resource server and serve out the selected resource.

In accordance with still another aspect the present invention, a demand director server is adapted for use with a plurality of resource-serving resource servers having resources distributed between them. The demand director can monitor and manage distribution of resources across the resource servers, and can mediate requests for resources to be served out by the resource servers to direct a request for resource-serving to a resource server chosen by the demand director in accordance with which resource servers are capable of serving out the requested resource.

In accordance with yet another aspect the present invention, a method of network resource management, in a network having a demand director and resource serving servers, comprises:
(1) receiving a request for a resource from a requester at a demand director unit;
(2) determining the availability of resource serving servers that are capable of serving the requested resource;
(3) selecting a resource server that is capable of serving the requested resource and sending the request to the selected resource server;
(4) establishing a connection between the requester and the selected resource server; and
(5) serving out the selected resource from the selected resource server to the requester.

In accordance with another aspect the present invention, a method of satisfying a demand on an Internet network for a network resource comprising: providing the network with a demand director server, a first resource server having a first resource comprising one of a video file and a data file thereon, and a second resource server having a second resource comprising one of a video file and a data file thereon, the second resource being different from the first resource. The director server has information as to what resources are held on the first and second resource servers and, upon receipt of a request for one of the first and second resources, selects one of the first and second resource servers to serve out the requested resource and directs the request to the selected one of the first and second resource servers. The demand server selects an appropriate one of the first and second resource servers to receive the request in accordance with where the requested resource is located.

In accordance with another aspect the present invention, a method of satisfying a demand on an Internet network for a network resource, the method comprises: providing the network with a demand director server, a first resource server having a first resource comprising one of a video file and a data file thereon, and a second resource server having a second resource comprising one of a video file and a data file thereon. The director server has information as to the unused resource-serving capacity of the first resource server and of unused resource-serving capacity of the second resource-server. The director server, upon receipt of a request for a requested resource present on both the first resource server and the second resource server, selects one of the first and second resource servers to be the resource server that serves the requested resource. The director server selects the selected one of the resource servers in accordance with whether or not the first and second resource servers have unused resource-serving capacity capable of serving the requested resource.

The present invention can be used with both video files and other files (termed "data files" for convenience).

In one embodiment of the present invention, a web tier of resource serving servers comprises a plurality of resource servers at least some of which have different servable resource content, thereby enabling a specific resource to be served out of one resource server but not another.

In a further embodiment of the present invention, a tier of resource serving servers comprises a plurality of resource servers at least some of which have different servable resource content of the same kind or class, thereby enabling a specific resource of a kind or class to be served out of one resource server but not another, both resource servers having resources of the same kind or class.

There is usually also a demand director server that is aware of which resources are servable out of which resource servers, and which resource server is capable of receiving a request for a particular resource and can direct the request to a resource server capable of satisfying the request.

The demand director can be thought of as part of the resource-serving web tier, or as sitting above the resource serving web tier as a demand director server/router, that is, a level 7 switch.

In accordance with an aspect of the present invention, a network has a plurality of networked resource servers having dissimilar resource content, and a demand director. The demand director has information as to what resources are potentially available on which of the resource servers, and can determine current capacity of each of the resource servers to serve out each of the resources that they are capable of serving out. The demand director is adapted to allocate a request for a specific resource to a resource server that it selects in accordance with the capacity of the servers to serve out the requested resource.

In accordance with another an aspect of the prevent invention, a demand director for use in a network of resource servers has information associating specific resources available for serving out from specific resource servers, and is adapted to ascertain the capability of the resource servers to serve out their potentially servable resources, and is adapted to allocate a demand for a specific resource to a selected resource server in accordance with the information and the capability.

In accordance with another aspect of the present invention, a demand director for use in a network of resource servers has resources that are potentially servable-out. The demand director has the capability of ascertaining the capability of the resource servers to serve out their potentially servable-out resources and can, in accordance with the capability of the resource servers to serve out a specific resource, determine to which resource server a request for the specific resource is directed.

In accordance with another aspect of the present invention, a network having a plurality of content servers can serve out content of a particular kind stored therein. A demand manager is adapted to allocate a request for specific content to an appropriate content server for serving the request. The content servers have dissimilar servable content of the particular kind stored therein and the demand manager has a mapping unit for mapping specific content with specific content servers Such that the demand manager is adapted to receive a request for specific content and to allocate the request to an appropriate content server having the specific content therein, using the mapping unit.

In accordance with yet another aspect of the present invention, a network has a plurality of content servers capable of serving out content of a particular kind, and content server monitor adapted to monitor capacity of the content servers to serve out specific resources. The content server monitor is adapted to allocate a request for requested specific content to a content server chosen by the content server monitor in accordance with the capacity of each of the content servers to serve out the requested specific content.

In accordance with an aspect of the present invention, a metropolitan area video serving network comprises a plurality of video servers having at least some different videos on at least some of the video servers, and a demand director having a location map correlating the address of which of the video servers has which of the videos available for serving. The demand director is adapted to direct demands for a specific video to an appropriate video server for serving out the specific said video, using the location map to select the appropriate video server.

In accordance with another aspect of the present invention, a metropolitan area video serving network comprises a plurality of video servers having videos available for serving out, and a video server monitor and demand director adapted to establish the capacity of the video servers to serve out additional videos beyond their current activity, and to direct a request for a specific video to a video server that the video server monitor and demand director has established has the particular video and is capable of satisfactorily serving out the video.

In accordance with an aspect of the present invention, a method of satisfying a demand on a network for a network resource comprises: providing the network with a demand director server, a first resource server having a first resource thereon, and a second resource server having a second resource thereon, the second resource being different than the first resource. The director server has information as to what resources are held on the first and second resource servers and, upon receipt of a request for one of the first and second resources, selects one of the first and second resource servers to serve out the requested resource and directs the request to the selected one of the first and second resource servers. The demand server selects an appropriate one of the first and second resource servers to receive the request in accordance with where the requested resource is located. Servable resources are dynamically distributed between available resource servers in accordance with demand for the resources, and the capacity of the resource servers is collectively variable to serve out demand for a particular resource in accordance with the demand for the particular resource.

In accordance with an aspect of the present invention, a method of satisfying a demand on a network for a network resource comprises: providing the network with a demand director server, a first resource server having a first resource thereon, and a second resource server having a second resource thereon. The director server has information as to the unused resource-serving capacity of the first resource server and of unused resource-serving capacity of the second resource-server. The director server, upon receipt of a request for a requested resource present on both the first resource server and the second resource server, selects one of the first and second resource servers to be the resource server that serves the requested resource. The director server selects the selected one of the resource servers in accordance with whether or not the first and second resource servers have unused resource-serving capacity capable of serving the requested resource. Servable resources are dynamically distributed between available resource servers in accordance with demand for, the resources. The capacity of the resource servers is collectively varied to serve out demand for a particular resource in accordance with the demand for the particular resource.

In accordance with still another aspect of the present invention, a method of sharing the demand for resources between a plurality of networked resource servers comprises: providing dissimilar resource content on at least some different resource servers, determining what resource is available for serving out from which of the networked resources servers, determining which of the resource servers' has the current capacity to satisfy a request for resources that they are capable of serving, and allocating a request for a requested resource to a selected resource server chosen in accordance with it having the requested resource available for serving and having the capacity to satisfactorily serve out the requested resource, and dynamically distributing servable resources between available resource servers in accordance with demand for the resources, and varying the capacity of the resource servers collectively to serve out demand for a particular resource in accordance with the demand for the particular resource.

In accordance with an aspect of the present invention, a computer readable memory device encoded with a data structure for managing networked resources held on a plurality of resource servers connected to a network in accordance with a change in network traffic, the resource servers having a plurality of server programs running thereupon and the data structure having entries, each entry containing:

a network address associated with a resource that is servable out; and resource server-utilization information or statistics.

In accordance with an aspect of the present invention, a method of making available computer network resources to users of a network comprises: providing a plurality of resource servers capable of serving out a resource of a common kind, automatically monitoring the demand for a particular resource of the common kind using a computer, and automatically modifying overall capacity of the network to serve out the particular resource in response to monitored or predicted demand.

In accordance with an aspect of the present invention, a data structure manages the automatic transfer of data between a server program and a further server program in response to a change in traffic on a network, the data structure being arranged to manage the distribution of the data over the server program and the further server program, the data structure having entries, each entry containing:
 a locator associated the said server program;
 an identifier associated with at least a portion of the data; and
 traffic statistics associated with network traffic to the server program.

In accordance with an aspect of the present invention, a program storage device, readable by a machine, tangibly embodying the program of instructions executable by the machine to perform method steps for controlling allocation of a request for a specific resource on a network of resource servers to a selected resource server, the method steps comprising: directing the request to the selected resource server, receiving a map input derived from a resource locator map adapted to provide network addresses at which specific resources are available for serving out, and using the input to select an appropriate resource server that has the specific resource available on it for serving out and to direct the request to the appropriate resource server.

In accordance with an aspect of the present invention, a program storage device, readable by a machine, tangibly embodying a program of instructions executable by the machine to perform method steps for controlling allocation of a request for a specific resource on a network of resource servers to a selected resource server comprises the following steps: directing the request to the selected resource server, receiving a capacity input derived from an evaluation of capacities of each of the resource servers to serve out the specific resource, and selecting the selected resource server using the capacity input to establish that the selected resource server has capacity to serve out the requested specific resource.

In accordance with another aspect of the present invention, a method of increasing the number of different resources servable out from a web tier comprises having a web tier in accordance with the previous aspect of the present invention and adding an additional resource server to the web tier, the additional resource server having additional resources not previously servable by the web tier.

A resource server's capacity to serve out a resource that it has can be dependent upon:
 whether there is unused application software capable of serving out the requested search;
 the amount of unused CPU processing power there is available; and
 the bandwidth available for serving out that resource from the resource server (which can be dependent upon which part, or parts, of the server can support the serving out of the requested resource).

The demand director can use information relating to one or more (or any combination of) the above in order to select which resource server will be chosen to serve out a demanded resource.

Information on what activity a resource serve is currently performing, and possibly when it expects to be freed of that burden, is useful to the demand director to enable it to evaluate the unused capacity of the resource server available to serve out additional resources. An alternative to having the demand director evaluate the unused capacity of a resource server to serve out additional resources is for the resource server to evaluate its unused capacity to serve out additional resources and to inform the demand director of its unused capacity (instead of its used capacity).

The demand director preferably monitors network traffic associated with each resource server. The demand director preferably has traffic capacity limits for each type of resource available on each resource director and uses these limits, along with a knowledge of current traffic for each resource server, to select which resource server will satisfy a particular demand for resources.

The method can include polling a resource server (or non-master server) by the demand director (or master server). The method can include replying to the polling, by the resource server with information relating to any one or combination of the following: network address associated with the resource server, bandwidth utilization of the resource server, resource served out by the resource server (either/or, or both, currently and since the last polling), a network address to which the resource is being/has been sent, and a price associated with the resource served.

The method can include generating billing information for a user by the demand director server. The method can include checking to see whether a bill is due, by the demand director server. The method can include billing the user.

The demand director can evaluate whether usage and/or network capacity information is within a predetermined limit. It can be determined whether a server or server farm has spare data serving capacity and can include copying a file thereto. A demand director resource-location directory or database can be updated, typically with the network address of the resource server with spare data serving capacity, and an identifier associated with what resource is available for serving.

A further server can be connected to the network by the demand director, which can communicate, for example, multicast, details of the new resource available and/or available bandwidth over the network. The method can include the storing of said details upon the demand director, or master, server and/or some or all other servers. The method can include directing a request for the resource content of the further server to the further server by the demand director server. The method can include varying the resource (for example, data) content of the further resource server or by the demand director server in accordance with demand for the resource content.

The method can include self-monitoring of the bandwidth utilization of a resource server and can include determining if the bandwidth utilization of the resource server is within a predetermined limit. The method can include passing an alarm message from the resource server to the master server, demand director, if the bandwidth utilization is outside of the predetermined limit.

The method can include self-monitoring of input-output (IO) port traffic by a resource server. The method can include transmitting the results of the monitoring to the demand director, master server. The results of the monitoring can be compared to a statistical model, and it can be determined if additional resource serving servers need to be connected to the network, by the demand director, master, server. The method can include connecting an additional resource serving resource server to the network.

The method can include having a server farm (a "farm" is defined later) and designating one of the servers of the server farm as a master, or demand director, server. The method can include storing on the master, or demand director, server a database containing details of any one, or combination, of the following: a list of federated server farms and the network address of the demand director and/or resource servers participating therein, resources potentially available on each server, network address of each resource server, current and/or historical usage statistics relating to each resource that can be served out, current network traffic through an input-output (IO) device of each resource server, the cost of accessing each resource, an identifier of users who have accessed any given resource.

The method can include setting a threshold level of network traffic through each (IO) device. The setting of a threshold means that problems such as when the network, or an individual server, is approaching its capacity can be determined early and extra resources or processing capacity added before the situation becomes critical. Typically, the IO device is a network interface card (NIC) or it can be an IO port, possibly of an NIC. The demand director can automatically added extra resources or processing capacity with or without human intervention.

The method can include resource servers informing the master server, or demand director, when the threshold level is passed. The method can include using the demand director's (or master server's) database to determine if there is an additional resource serving resource available within the network, or server farm, able to service a request for the resource being served by the IO device.

The method can include generating a bill based upon a user's aggregate access of resources. The method can include providing a central register of resources (for example, data content) on a server farm, or farms. This allows digital rights management to be centrally tracked, thereby limiting the opportunities for piracy.

In accordance with yet another aspect of the present invention, a computer readable memory device is encoded with a data structure for managing networked resources held on a plurality of resource servers connected to a network in accordance with a change in network traffic, the resource servers having a plurality of server programs running thereupon, and the data structure having entries, each entry containing:

a network address associated with at least one server resource program;
an identifier associated with a resource that is servable out; and
resource server-utilization information or statistics.

The utilization information or statistics can be associated with network traffic through an input-output (IO) device associated with the resource servers.

The data structure can be arranged to facilitate the addition of further entries relating to an additional resource server, those entries containing one or more of: an additional network address, identifier and resource-server utilization statistics thereto. The resource server-utilization statistics entries in the data structure can include entries relating to any one, or combination, of the following: usage of resources, access patterns for the resources, access times for the resources, and outgoing bit rates. The data structure can be arranged to facilitate a deletion of an existing entry therefrom. The data structure can contain an entry containing a port identifier associated with each resource. The port identifier can be a sub-set of the network address entry.

The data structure can contain an entry relating to a threshold level of network traffic associated with a particular resource on a particular resource server. The data structure can contain entries relating to upper and lower threshold levels of network traffic for particular resources on particular resource servers. Typically, these threshold levels will be expressed as a ratio of the theoretical to actual deliverable capacity of an input-output (IO) device, typically a network interface card (NIC).

When there is a tier or network of servers with different resources (e.g. data content) of the same kind on them or associated with them, for example different videos, the capacity of the network to serve out a specific resource can be modified by replicating the resource and making it available from different, or more, servers on the network, or from different, or more ports on a server. This can make available different telecommunications bandwidth/routes, as well as increasing the overall capacity of processing power capable of serving out the specific resource. The original resource can still be present and functional on its original server, or it can be removed therefrom during the migration of data/resource operation. Thus, typically (but not always) in response to an increased demand for a particular resource (for example, a specific video) the resource can be made more available on the network. Since the demand director allocates request for a specific resource to a selected one of those servers capable of serving out the selected resource, it will be usual to update the demand director's load balancing data to associate the addresses and capabilities of the server(s), or ports, to which the specific resource has been migrated, or copied, to the places at which the specific resource can be found on the network—so that the demand director can take into account the fact that it has an increased range of options post-resource-migration.

In accordance with yet another aspect of the present invention, a method of making available computer network resources to users of a network comprises: providing a plurality of resource servers capable of serving out a resource of a common kind, automatically monitoring the demand for a particular resource of the common kind using a computer, and automatically modifying overall capacity of the network to serve out the particular resource in response to monitored or predicted demand.

Preferably, the method comprises having a demand monitor server monitor the demand for particular resources of the common kind, the demand monitor being aware of the capacity of each of the resource servers to serve out additional servings, beyond a current level of resource serving, of the particular resources. The demand monitor can be aware of the capacity of each of the resource servers to serve out additional servings of each of a plurality of user-selectable resources potentially available for serving out from each of the resource servers. The demand monitor can also comprise a resource server.

Thus, the demand monitor is "others aware", that is, it knows the capabilities of other servers (and of itself) to satisfy future requests for the serving out of each of different selectable resources of the same kind (for example, different video movies).

The demand monitor can automatically cause additional capacity to serve out a specific resource to be created on the network, in response to monitored demand for the specific resource. However, the additional capacity can be created in advance of actual demand for it, for example, in response to predicted future demand. The demand monitor can remove capacity from the network to serve out a specific resource, possibly to free-up serving capacity for a more popular resource.

The demand monitor can itself monitor what resources are being served out by what resource servers, by monitoring traffic on input/output ports of other servers, or a resource server can monitor its own resource-serving activities and provide information to the demand monitor regarding what it is serving and/or its capacity to serve out additional resources, preferably information indicative of its ability to serve out each specific resource of the common kind available on it for serving out.

In accordance with another aspect of the present invention, a method of monitoring network traffic on a computer network comprises providing a network of computers, or servers, and enabling the individual computers or servers to monitor their telecommunication activity on their input/output ports and to report on their telecommunication activity to a network traffic monitor.

Thus, resource or content servers can self-monitor their network activities and/or their capability to contribute further to serving out particular resources.

The network traffic monitor can take an action automatically if network traffic for a computer or server is determined to be outside of permissible parameters. For example, if network traffic to a computer drops to too low a level, an automatic alarm can be raised. Alternatively, or additionally, resources potentially available for serving from the computer/ sever with a reported drop in telecommunications activity can be automatically made available for serving from one or more other servers in the network. For example, such "missing" resources can be made available by automatically migrating content/resources from the server that is experiencing a drop in serving-out abilities, or by obtaining the "missing" resources from other places in the network (a record of what resources are available on what servers is typically kept on a demand director server). If the resources are kept on at least two different servers, then a back-up copy should be available to be the "seed" for copying to a new server, to compensate for the degradation in service from the "missing", or impaired server.

In accordance with another aspect of the present invention, a network comprises a plurality of content servers and a monitor server, the monitor server being capable of monitoring the network traffic to and/or from each content server, wherein the monitor server compares monitored network traffic to a threshold level and, upon traffic levels meeting the threshold level, the monitor server is adapted to take an action.

Said action can be to increase the capability of the network to serve out content that is in demand.

The threshold can comprise a level of capability of serving out content from a particular content server, and upon a monitored level of content serving reaching the threshold level, the monitor server takes the predetermined action which comprises causing the capability of the network to serve out the content to increase. The monitor server can be adapted to copy the content to another networked server. The servers can have telecommunication ports and the monitor server can cause an increase in the number of telecommunication ports made available to a particular content of a content server. The threshold level can comprise a minimum activity threshold level and the action can comprise performing a diagnostic check to ensure that the content servers are properly operational and/or communicated with the monitor server. The minimum threshold level can be assessed in many different ways, for example, a threshold for a particular resource, a threshold for overall network traffic to a specific server, a threshold for all resources from a particular port, a threshold for a specified resource from a particular port, or any other identified subset of measurable activity of said servers.

In accordance with yet another aspect of the present invention, a server includes a processor, a memory, and a self-monitoring software program capable of being run by the processor, the monitoring program, when run monitoring levels of usage on applications servable out of the server, is capable of identifying when the level of usage of the applications reach a threshold level and, in response thereto, causes the server to take an action which increases availability of the application to a requester who can request the application to be served to them.

The action can comprise copying the application to another server.

When the server has a plurality of output ports and the application is available on less than all of the output ports, the action can comprise increasing the number of output ports of the server that are capable of serving out the application.

In accordance with the present invention, a data content server comprises: a processor, a storage device and an input-output (IO) device (IO), the storage device having data content stored thereupon and the processor being arranged to execute a monitor application that is stored within the storage device, the processor being further arranged to monitor the IO device when running the monitor application and to automatically determine whether a trigger condition has been met, and if so, to automatically produce a control signal responsive thereto.

The control signal can comprise a replicate signal adapted to cause at least part of the data content of the data content server to be copied to a further server or made available at a further IO port on the server.

This arrangement allows the data content server to self manage and distribute content based upon the visibility of content use and its ability to deliver the data content. The data content server becomes 'self-aware' for the purposes of application serving, typically based upon bandwidth usage, and can replicate data content to further servers in order to provide scaleable serving. The further server can be a server application that runs upon the data content server or it can be a further data content server.

In accordance with another aspect of the present invention, a data management system comprises: a monitor unit and at least one data content server, the monitor unit including a processor and a storage device, the server including an input-output device, and the processor being arranged to run a monitor application that is stored within the storage device, and the processor being further arranged to monitor the data content server's IO device when running the monitor application and to execute an action in response to a trigger condition associated with the IO device.

The monitor can itself be a resource server.

The data content server can have a processor arranged to monitor it's own IO device.

Typically the data stored on the servers will be file-based data that is readily partitioned and for which access patterns are known or are predictable, for example, video or audio data. Alternatively, the data stored on the servers can be block based, for example a section of a database stored across several compute units can be copied when one of the computer units is heavily accessed and the network configuration can be altered appropriately.

The monitor unit can be arranged to monitor the server for faults. Alternatively, or additionally, the server can be arranged to self-monitor for faults. The monitor unit can be arranged to monitor the server ports and/or it can be arranged to monitor a client server network connection. The monitor unit can be arranged to spawn an appropriate server application either on a further port of the server or on a further server. The monitor unit can be arranged to facilitate the replication of the part of the data content of the server serviced by a failing port to a further server. This ensures the continued and reliable supply of data to users. The monitor unit can update load balancing/routing tables that can be stored on the monitor unit. The monitor unit can also comprise a director server of other aspects of the invention, or indeed a resource server.

In accordance with another aspect of the present invention, a method of data management comprises:
(1) monitoring traffic on at least one data content server on a network;
(ii) either or both of:
(a) starting up or shutting down an appropriate data serving application automatically upon a further server on the network in response to network traffic;
(b) copying at least part of the data content of the data content server to the further server;
(3) updating routing/load balancing tables associated with the network of resource servers; and
(4) directing a portion of the network traffic to the further server.

The method can include providing the server as a server application upon the data content server or providing the server as a further data content server.

The method can include copying at least part of the data content from either of the data content server or an original data source, for example, a CD, a DVD, or tape media. This allows the data to be copied to the server even if the data content server has failed. The method can include executing steps (2), (3) and (4) of the method in response to a change in network traffic due to any one of the following: application server failure, application server overload, or insufficient nodes present upon a server based upon a statistical model.

The method can include executing steps (2), (3) and (4) of the method in response to a change in the number of active connections to a given port on the director unit. The method can include connecting or disconnecting a further server to/from a server farm in response to a variation in network traffic. The method can include configuring the further server within the network environment.

In accordance was another aspect of the present invention, a data structure manages the automatic transfer of data between a server program and a further server program in response to a change in traffic on a network, the data structure being arranged to manage the distribution of the data over the server program and the further server program, the data structure having entries, each entry containing:
a locator associated with the server program;
an identifier associated with at least a portion of the data; and
statistics associated with network traffic between the server programs and the further server program.

The data structure can be arranged to distribute the data between the server programs in response to the statistics, typically to improve the reliability of transfer of the data between the server program and the client program. The data structure can be arranged to facilitate the addition of further entries containing an additional locator, identifier and statistics thereto. The addition can occur in response to the statistical entries in the data structure.

The statistics entries in the data structure can include entries relating to any one, or combination, of the following: usage of data, access patterns, access times, outgoing bit rates, and accessed locations. The data structure can be arranged to facilitate the deletion of an existing entry therefrom. The deletion can occur in response to the statistical entries in the data structure.

The data structure can contain an entry containing a port identifier associated with each portion of the data. The port identifier can be a sub-set of the network address entry. The data structure can be arranged to copy the portion of the data associated with a port identifier from a first server program to a second program in response to a variation in the statistics relating to the network traffic. In the most preferred embodiments there is a port per video being served.

By "port" is meant a part of a logical network address (for example, port 10020 from IP address 15.144.117.245). "Port" does not mean the network cabling connector of the NIC card.

The data structure can contain an entry relating to a threshold level of network traffic. The data structure can contain entries relating to upper and lower threshold levels of network traffic. Typically these threshold levels can be expressed as a ratio of the theoretical to actual deliverable capacity of an input-output (IO) device, typically a network interface card (NIC).

The server program and the further server program can be resident upon the same network element. There can be a plurality of server programs.

It will be appreciated that in many aspects of the present invention it is intended that the data is managed with minimal, preferably no, human intervention.

In accordance was another aspect of the present invention, a method of billing for access to data comprises:
(1) logging a request for data;
(2) logging the origin of the request;
(3) generating a bill from data stored on a database; and
(4) issuing the bill.

The method can include marking data at a given price for use and/or type of use. The method can include logging a user's identifier.

In accordance with another aspect of the present invention, a method of data rental comprises:
providing a server farm according to another aspect of the present invention either as a stand-alone or as part of a library;
servicing a request for data from a user of the farm; and
charging the user for the supply of data.

In accordance with yet another aspect of the present invention, a method of maintaining availability of requested network resources comprises: providing a network of servers each having associated network-servable resources of a specific kind, and dynamically distributing servable resources between said resource servers in accordance with demand for the resources, thereby varying capability of the network as a whole to serve out a particular resource dependent upon the level of demand for the particular resource.

In accordance with another aspect of the present invention, a method of data management comprises:
(1) monitoring traffic on at least one data content server on a network and/or software application response time for an application software running on at least one data content server on a network and
(2) automatically starting up or shutting down an appropriate data serving application upon the server or upon a further server on the network in response to network traffic and/or application response time.

In accordance with an aspect of the present invention, a network of resource servers each have a deliverable resource of a specific kind available for serving out, and a resource manager is adapted to receive a demand indicator input indicative of demand for a particular one of the deliverable resources of the specific kind and to output a resource-varying output adapted to vary capability of the network as a whole to serve out the particular one resource.

In accordance was an aspect of the present invention, a network comprises:
a plurality of resource servers adapted to serve out servable resources of a specific kind;

a usage monitor; and
a resource manager;
the usage monitor being adapted to monitor usage of the servable resources and to determine if a usage level of a particular resource has changed significantly and to communicate such changes in usage level to the resource manager, and the resource manager being adapted to introduce an additional server to the network and/or start up a resource serving application on a networked resource server if usage of the servable resources has increased significantly, and/or the resource manager being adapted to remove the specific resource from a networked resource server and/or shut down a resource-serving application on a networked resource server if the usage of the servable resources has decreased.

In accordance with an aspect of the present invention, a resource management server is adapted for use with a plurality of resource servers having resources of the same particular kind available for serving out, the resource management server being adapted to evaluate demand for a particular one of the resources of the specific kind, in order to vary capacity of said network to serve out the particular one resource in response to changes in demand for the particular one resource.

In accordance with an aspect of the present invention, a content management server adapted for use with a content server network comprises: a servable content monitor adapted to monitor levels of usage of servable content of a specific kind, and a content availability manager adapted to change the availability of specific servable content in accordance with demand for the specific servable content; the content management server being adapted to introduce an additional resource server to a network and/or start up a content serving application on a content server if levels of usage of a particular content have increased significantly, and/or being adapted to remove content from a networked content server and/or shut down a content serving application on a content server if levels of usage of a particular content have decreased significantly.

In accordance with an aspect of the present invention, a resource management server is adapted for use with a plurality of resource servers having resources of a common particular kind available for serving out, the resource management server having a demand evaluation unit adapted to evaluate demand for a particular one of the servable out resources of the specific kind, and a capacity modifying unit adapted to modify capacity of the network to serve out the particular one resource, the capacity modifying unit being responsive to evaluated demand signals from the demand evaluation means.

In accordance with yet another aspect of the present invention, in a network of video servers each having videos available for serving out, at least one of the video servers comprises: a video migration manager adapted to receive video demand-indicative signals indicative of a level of demand on the network for the videos available for serving, and to cause at least one of:
(1) activation of video serving application software on a video server having an available copy of the particular video, thereby making the particular video available for serving from the video server; or
(2) copying a particular video for which the demand is high from a first video server where it is available for serving to a second, different, video server and to make the particular video available for serving from the second video server to increase the capacity of the network to serve out the particular video; or
(3) enabling a particular video for which the demand is high to be servable out from an increased number of port addresses of a video server where the particular video resides, thereby increasing capacity of the video server to serve out the particular video; and
wherein the video migration manager is adapted to operate automatically, without human intervention, to dynamically distribute video serving capabilities over the video servers of the network in accordance with demand for the videos.

In accordance with another aspect of the present invention, a video server for use with a network of video servers each having videos available for serving out, the video server being capable of having videos available for serving out and further comprising: a video migration manager adapted to receive video demand-indicative signals indicative of the level of demand on the network for the videos available for serving, and to cause at least one of:
(1) activation of video serving application software for a particular video, for which demand is high, in a video server that has the particular video in memory; or
(2) copying a particular video for which the demand is high from a first video server where it is available for serving to a second, different, video server and to make available for serving from the second video server to increase the capacity of the network to serve out the particular video; or
(3) enabling a particular video for which the demand is high to be servable out from an increased number of port addresses of a video server where the particular video resides, thereby increasing capacity of the video server to serve out the particular video; and
wherein the video migration manager is adapted to operate automatically without human intervention to dynamically distribute video serving capabilities over the video servers of the network in accordance with demand for the videos.

In accordance with another aspect of the present invention, software for controlling the distribution of network resources over resource servers of a network comprises: a demand evaluation operative capable of establishing levels of demand for particular resources available on the network, and a resource allocation operative adapted to receive input from the demand evaluation operative and to cause at least one of:
(1) copying resources from one resource server of the network to another resource server of the network to thereby increase capacity of the network to serve out the resource; or
(2) enabling a specific resource to be started up and made servable out from at least one additional port address of a resource server that already has the specific resource in memory to increase capacity of the resource server to serve out the specific resource; or
(3) enabling an additional server, not previously part of the network, to be added to the network so as to increase capacity to serve out resources.

In accordance with another aspect of the present invention, in a network of video servers each having videos available for serving out, at least one of the video servers comprises: a video demand manager adapted to receive video demand-indicative signals indicative of the level of demand on the network for the videos available for serving, and to cause at least one of:
(1) deactivating video serving application software on a video server which has a copy of particular video available, thereby making the particular video unavailable for serving from the video server; or (2) enabling a particular video for which the demand is low to be servable out from a decreased number of port addresses of a video server where the particular video resides, thereby decreasing capacity of the video server to serve out the particular video; or (3) deleting from memory of a video server a video; and wherein the video demand manager is adapted to operate automatically without human intervention to dynamically distribute video serving capabilities over the video servers of the network in accordance with demand for the videos.

In accordance with another aspect of the present invention, a video server for use with a network of video servers each having videos available for serving out, the video server being capable of having videos available for serving out and further comprising: a video demand manager adapted to receive video demand-indicative signals indicative of the level of demand on the network for that videos available for serving, and to cause at least one of:

(1) deactivating video serving application software for a particular video, for which demand is low, in a video server that has the particular video in memory; or (2) deleting a particular video for which the demand is low from a memory of a video server to decrease the capacity of the network to serve out the particular video; or (3) enabling a particular video for which said demand is low to be servable out from a decreased number of port addresses of a video server where the particular video resides, thereby decreasing capacity of the video server to serve out the particular video; and wherein the video demand manager is adapted to operate automatically without human intervention to dynamically distribute video serving capabilities over the video servers of the network in accordance with demand for the videos.

In accordance with an aspect of the present invention, a program storage device, readable by a machine, tangibly embodying a program of instructions executable by the machine to perform method steps for controlling the distribution of network resources over resource servers of a network, the method steps comprising: a demand evaluation operative capable of establishing levels of demand for particular resources available on the network, and a resource allocation operative adapted to receive input from the demand evaluation operative and to cause modification of capacity of the network to serve out particular resources, the modification including an increase in capacity or a decrease in capacity to serve out a particular resource.

In accordance with still another aspect of the present invention, a method of serving out video over a network of video servers comprises:

evaluating a capacity of the network as a whole to serve out specific video items by establishing for each video server in the network an established ability of each server to serve out said specific items that are potentially servable from each video server;

using the established abilities of each video server to evaluate an overall capability of the network as whole to serve out each of the specific video items; and varying the overall capability to serve out at least a selected one of the specific video items in accordance with the overall capability of the network.

In accordance with another aspect of the present invention, a video server monitor for use with a network of video servers each of which having video items, the video server monitor comprising:

an input adapted to receive inputs;

an output adapted to output outputs, and a processor adapted to process the inputs and to generate the outputs;

wherein the inputs are representative of capabilities of each of the video servers to serve out video items potentially servable from respective video servers; and wherein the processor is adapted to evaluate an overall capacity of the network from the inputs representative of each individual video server's capacity to serve out each video item; and wherein the processor is adapted to use its evaluation of the overall capacity of the network to control output of the outputs, the outputs being adapted to vary the overall capacity of the network to serve out a selected one of the video items.

In accordance with another aspect of the present invention, in a network of video servers having video items available for serving, and a video server monitor, the monitor comprising:

an input adapted to receive inputs;

an output adapted to output outputs; and a processor adapted to process the inputs and to generate the outputs;

wherein the inputs are representative of capabilities of each of the video servers to serve out video items potentially servable from respective video servers; and wherein the processor is adapted to evaluate an overall capacity of the network from the inputs representative of each individual video server's capacity for each video item; and wherein the processor is adapted to use its evaluation of the overall capacity of the network to control the outputs, the outputs being adapted to vary the overall capacity of the network to serve out a selected one of the video items.

In accordance with another aspect of the present invention, in a network of video servers, each video server includes information as to its own capability to serve out videos that it has available, and further includes information as to a capability of each other networked video server to serve out videos that they have available; wherein one of the video servers comprises a master video serving capacity controller and is adapted to assess a future capability of the network as a whole to serve out an additional copy of each video that is potentially servable in the network, and to compare this assessed future capability for each video with threshold capabilities for each video and to automatically take pre-programmed action in response to the assessed capability reaching the threshold capabilities.

In accordance with another aspect of the present invention, a video server comprises:

a processor;

a memory; and a telecommunication unit;

wherein the memory is adapted to have video items for serving out of the video server; and wherein the processor is adapted to cause a video item to be located in the memory and served out of the telecommunication unit to a network; and wherein the video server has an input for inputting inputs to the processor indicative of an ability of other video servers networked to the video server to serve out video items available on the other video servers, the processor adapted to monitor an ability of the video server to serve out those of the video items available on the video server and being adapted to monitor, from the inputs, abilities of the other networked video servers to serve out video items available on the other video servers; and wherein the video server is adapted to monitor an ability of the network to serve out particular the video items; and wherein the processor has an output adapted to output outputs for causing the network to have an increased or reduced capacity to serve out at least a specific selected video item.

In accordance with another aspect of the present invention, a program storage device, readable by a machine, tangibly embodying a program of instructions executable by the machine to perform method steps for running on a processor of a video server having a memory containing video items, an input port, a control output port, and a video streaming port, the method steps comprising: a monitor routine adapted to process signals received by the input port from other video servers networked to the video server to establish a network-wide usage level of a plurality of videos items, or to establish a capacity of the network as a whole to serve out an additional copy of each of the video items potentially servable by the network; and a video item availability-controlling routine adapted to cause an increase or decrease in an ability of the network as a whole to serve out at least one specific video item in accordance with the established usage level for each video item.

In accordance with still another aspect of the present invention, a method of modifying availability of video items on a network of video servers comprises: providing a network of video servers, each video server including information as to its own capability to serve out videos that it has available and information as to a capability of each other networked video server to serve out videos that they have available; and wherein one of the video servers comprises a master video serving capacity controller adapted to assess a future capability of the network as a whole to serve out an additional copy of each video that is potentially servable in the network, and to compare this assessed future capability for each video with threshold capabilities for each video, and to automatically take a pre-programmed action in response to the assessed capability reaching the threshold capabilities.

In accordance with another aspect of the present invention, in a video serving system having a monitor unit and at least one video content server, the monitor unit comprising: a processor and a storage device having a monitor application stored therein, the server including an input-output device, and the processor being arranged to run the monitor application and being further arranged to monitor the input/output device when running the monitor application and to execute an action in response to a trigger condition associated with the input/output device being met.

Lastly, in accordance with another aspect of the present invention, a method of modifying availability of video items on a network of video servers comprises:

providing a network of video servers, wherein each video server includes information as to its own capability to serve out videos that it has available;

assessing an aggregate capability of the network by aggregating individual video server capabilities; and modifying availabilities of videos on specific video servers to modify capability of the network as a whole to serve out specific particular video items.

It will be understood that references to video both hereinbefore and hereinafter are taken to encompass video (visual), audio and any other streamed performances.

BRIEF DESCRIPTION OF THE DRAWINGS

The present invention will now be described, by way of example, with reference to the accompanying drawings, in which.

DETAILED DESCRIPTION

Figure 1:
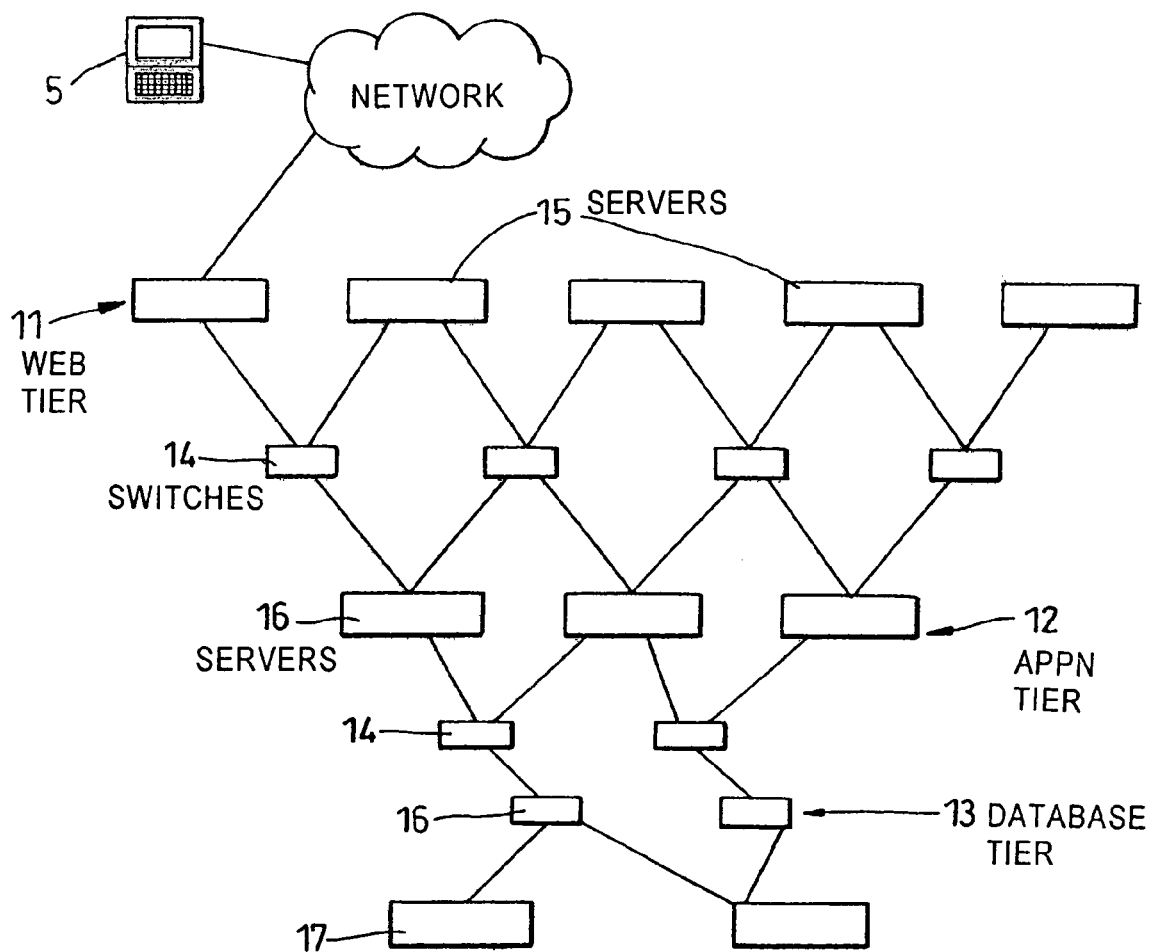
FIG. 1 is a prior art data storage system.

FIG. 1 is a representation of a typical prior art arrangement for infrastructure for an Internet service provider, for example, an on-line retailer. The infrastructure typically comprises three layers, a web-tier 11, an application tier 12, and a database tier 13 connected by switches 14. The web-tier has a large number, typically, 100 or 200, highly distributed servers 15 each having a small amount of attached storage (e.g. 100 GB) and each having the same data content replicated thereupon to ensure that a large number of external users can access the data (that is, the same data can be accessed on a large number of servers 15, using an even larger number of telecom routes). The data upon the web-tier 11 is usually is the form of static hypertext markup language (HTML) pages. The HTML pages do not require a great deal of memory. The application tier 12 has fewer servers 16 than the web-tier 11 and runs the applications. A network switch or router, 14 that sits above the web-tier 15 directs external users to the web-tier server 15 that is next in line for a request, load balancing the user request for data over the servers 15 in a crude way. The database tier 13 has a very small number, typically only 1 or 2, large capacity servers 16 connected to high end large capacity, for example, hundreds of GB to tens of TB, consolidated storage elements 17 that are typically very expensive, for example, $100,000 high end disc arrays. The storage elements 17 contain data relating to, for example, user details, user profiles, stock and auction details for the retailer. Data on the web-tier 11 is accessed by a user 5 via the web-tier 11, the application tier 12, and particularly via the switches or routers 14. The switches or routers 14 are typically level 2, level 3, or level 4, switches.

Each tier of the infrastructure processes the data as best it can and the passes the data down to the tier below it. One problem with this approach is the increasing cost of the lower tier devices coupled with the need to replicate the devices at least once in order to build fault tolerance into the system.

Systems in which placement of network attached storage (NAS) at the web-tier are used are not particularly efficient as the web-tier servers do not have sufficient network connections to satisfy the information demands placed upon them by users in such architectures (see, for example, FIG. 2) and, NAS boxes have relatively few network connections. The cost of placing high end disc arrays, fiber channel and switches in the web-tier is prohibitive due to the large number of servers and the cost of Fiber channel adapter cards and disc arrays for the web tier is simply uneconomic.

Each content or resource server 15 has identical content capable of being served out to the user 5. This reduces the data management burden on the switches or routers 14, allowing "dumber" switches to be used.

In at least one embodiment of at least an aspect of the present invention, the following definitions can be applied:

Server farm: a collection of servers acting together to provide a given application type (for example video streaming). In many embodiments of the present invention, a server farm will provide a load-balanced delivery of content to users requesting use of that content from the farm. The user will potentially be able to access content on all servers of the farm using a single web address, as far as the user is concerned.

Demand Director: a server acting as a management and co-ordinating station within a server farm for determining the location of content across the servers of the farm, and capable of directing a request for a specific resource to an appropriate resource server that contains that resource.

Resource Server: a server device capable of serving out a resource which can be requested by a user. Typically, a general purpose PC with some storage associated therewith, for example, and internal disc or an external disc array, is arranged to store the content or resource to be delivered.

Figure 2:
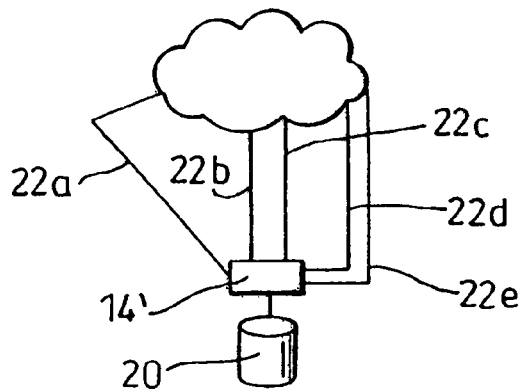
FIG. 2 is a representation of a plurality of network telecommunications routes.

FIG. 2 is a representation of a server 20 connected to a router 14 that is in turn connected to the Internet by a plurality of different telecommunications links 22a, 22b, 22c, 22d, and 22e.

Figure 3:
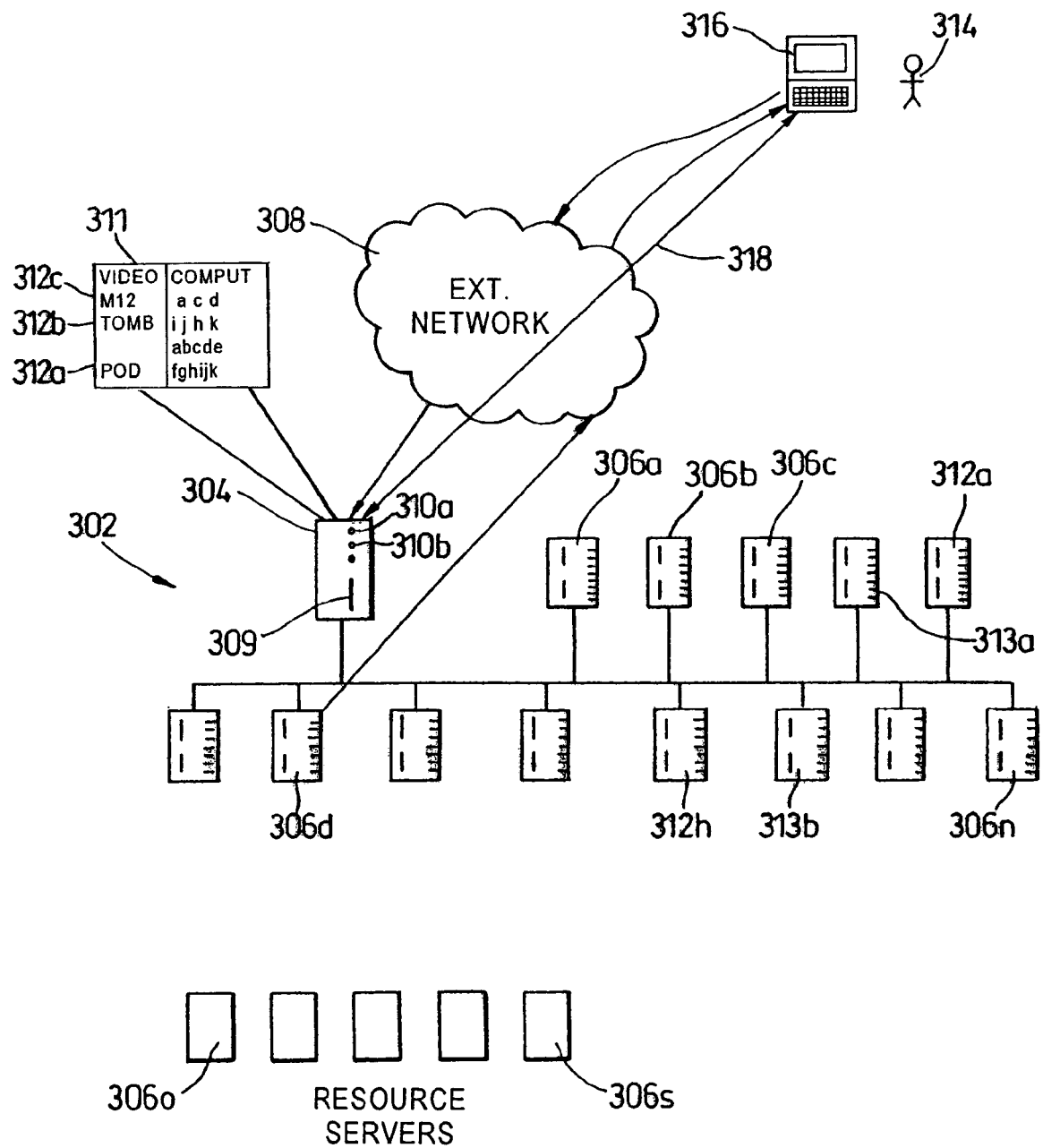
FIG. 3 is a schematic representation of a data storage system according to at least one aspect of an embodiment of the present invention.

FIG. 3 is a representation of a networked video server farm 302, in accordance with at least part of an aspect of an embodiment of the present invention, comprising a director unit 304 and a plurality of resource servers 306a-n. The term "network" can be substituted for the term "farm". A farm is a sub-class of a network, characterized by the servers all being "local" in the sense of local in telecommunications terms, that is, they can communicate easily with the requesting demand director. Often this is because they are truly geographically local, for example, in the same room or building, but "local" can mean "bandwidth/telecom" local, that is, good telecom links between the server and the demand director. The farm 302 is connected to an external network 308, typically the Internet or a MAN (Metropolitan Area Network).

A typical server farm, for serving out video movies, for example, can comprise around forty content or resource servers and a demand director in a nineteen-inch wide rack. The typical farm will be able to store up to seven thousand feature length videos, each video being about 2 GigaBytes (GB) in size.

The director unit 304 has an interface 309 therein that specifies which ports 310a-c a resource-serving application is listening to and which of the resource servers 306a-n are able to participate in serving out that application resource. For example two resource servers 306b and 306a are able to serve port 10045 requests for hypertext transfer protocol (HTTP) application data (a resource capable of being served out), and all of the resource servers 306a-n are able to serve requests for real time streaming protocol (RTSP) application data. Other ports can be able to serve file transfer protocol (FTP) requests. Thus, there can be different categories of servable resources.

The video data can be partitioned into groups that are located on a per resource server basis. Serving the videos on a per resource server 306a-n basis allows a video to be tracked and a determination made as to how busy/popular any given video is.

The director unit 304 contains a database 311 which, in the current embodiment, contains details of real time videos 312a-h and upon which of the resource servers 306-n the videos 312a-h are stored. The database 311 can determine which resource server 306a-n has a port suitable for serving new content as it is introduced to the farm 302. Typically, a video will stick to a specified port. Video operates in a predictable manner and is deterministic in nature, that is, the input/output (IO) requirements are well understood. For example, if a video is read back from a disc subsystem, it is highly likely that the video will be read sequentially from the disc during playback. Thus, the capacity per resource server can be readily estimated. It will be appreciated that the data stored on the resource servers need not be video data. The stored data can be audio data or any other data set where data access patterns are predictable and the data is readily partitioned, as the data is already divided into objects, that is, the files. For example, NAS devices that serve files can also be implemented using this scheme in order to provide greater scalability than is currently available.

Each resource server 306a-n has two network interface cards (NIC) 313a-b, one for communication with the demand director unit 304 and one for outputting data to the network 308.

A user 314 connected to the network 308 requests a video 312a that is stored in the farm 302. The request is passed from a user's terminal 316 via the network 308 to the demand director unit 304. The director unit 304 compares the request to the contents of the database 311 to ascertain if the requested video (requested resource) is present in the farm 302. If the requested video is not present in the farm, the demand director unit 304 returns an error message to the user 314.

Should the requested video be present in the farm 302, the demand director unit 304 accesses the database 311 in order to find a resource server 306d that has the video stored therein. If more than one of the resource servers 306d-306j has the requested video therein, the demand director unit 304 checks to see which of the resource servers 306d-306j is best placed to serve out the requested video. This load balancing is typically achieved by monitoring one or more of the bandwidths available to a resource server, whether the resource server is currently being accessed either for the request serving out the same resource or for serving out another video, or possibly even projected access requirements based upon previous access demands placed upon a resource server. This load balancing is more sophisticated than the prior art "Round-Robin" or "response time" based approaches.

For example, resource server 306f can have the most popular video 312b stored therein along with all of the other resource servers 306a-e and 306g-n in the farm 302. The server 306f can also have a previously unpopular video 312c stored therein. The previously unpopular video 312c can increase in popularity, with the increase in access being recorded by the director unit 304. Thus, when the next request for the most popular video 312b is received by the demand director unit 304, it knows that the computer unit 306f is likely to be accessed for the video that is increasing in popularity 312c, and will therefore use one of the other resource servers 306a-e,g-n to service this request for the most popular video 312b (assuming that they have available unused serving-out capacity).

Figure 4:
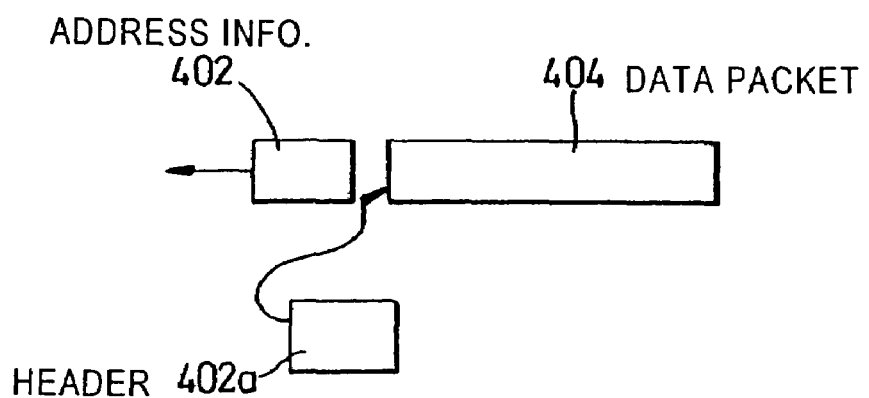
FIG. 4 is a schematic representation of a request data packet.

Once the demand director unit 304 has established which of the resource servers 306a-n, for example, 306d, it intends to service the request for the video 312a it strips TCP/IP address information 402 from a data packet 404 containing the request, see FIG. 4, and splices a replacement TCP/IP header 402a containing the network address of the resource server 306d to the payload of the data packet 404, as is known from standard routing techniques. The request data packet 404 is forwarded to the director unit 304, typically via an Ethernet link.

Figure 5:
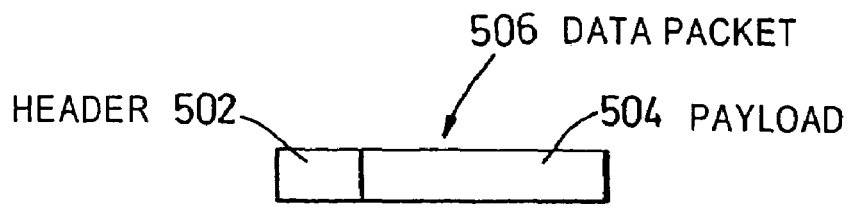
FIG. 5 is a schematic representation of a video data packet.

The resource server 306d will have the desired video file available for serving out to the user. As represented in FIG. 5, prior to streaming the requested video directly to the user 316, the resource server 306d rewrites a TCP/IP header 502 corresponding to the network address of the demand director unit 304 to the payload 504 of each outgoing data packet 506 containing the streamed video data. The video data will typically be in real time format, although it can be MPEG format, Real Networks format or Windows Media format. The direct nature of the streaming bypasses the demand director unit 304, resulting in the removal of a potential bottleneck in the data transfer. The data is usually streamed via a telecommunication network.

The effect of placing the network address of the demand director unit 304 in the header 502 is to create a one time virtual connection 318 between the user terminal 316 and the demand director unit 304. This hides the network address of the resource server 306d while allowing the user 314 to play the video multiple times as long as the virtual connection 318 is maintained, in a manner similar to the rental of video cassettes. However, once the ephemeral virtual connection 318 is broken, the user 314 has no means of re-accessing the video without accessing the demand director unit 304, as they do not know the network address of the resource server 306d that served the data to them. This arrangement limits the opportunities for a user to copy the data, or view it again at a later time, as the serving protocols are not the same as those used by a NAS that serves out data as raw files.

One of the resource servers 306a-n, or the demand director unit 304, can act as a billing unit 306c. The user can be required to provide details such as their e-mail address, address, telephone number and bank details before they are allowed full access to the farm 302. The billing unit 306c receives information from the director unit 304 relating to the users details, the video that the user has requested and the cost of viewing the video. Thus, the billing unit 306c can automatically produce and issue bills to users of the farm 302 based upon their viewing habits. Where the users bank account details are retained by the billing unit 306c, payment for viewed videos can be taken from a user's bank account. Typically, billing occurs about three days after viewing the video or on a regular basis, for example, monthly, and any subscription fee for the use of the service can be billed at the same time.

It will be appreciated that video clips can be provided as a 'free trial' service for potential users of the video farm.

As the demand for a particular video increases, the demand director unit 304 writes the popular video data to additional resource servers 306d-n that are within the server farm 302. Should the demand for a video increase so much that there are not sufficient resource servers 306 within the farm 302, the demand director unit 304 adds additional resource servers 306o-s to the server farm 302. These additional resource servers can be on other server farms connected to a MAN, as detailed hereinafter. Alternatively, they can be additional, non-utilized, resource servers associated with the farm 302.

The non-utilized resource servers are typically added to the server farm 302 as demand begins to increase. The horizontal scalability of resource servers allows an xSP (e.g. SSP, ASP, ISP, or FSP) to start with a small amount of relatively cheap infrastructure and increase their access provision in line with demand.

As will be appreciated, because there is asymmetric, different, data on the web tier resource servers 306, it is easy to add extra new, different resources, (e.g. videos). A new video, or other resource is provided on a networked resource server 306 and the demand director 304 is updated to be aware of the existence of the new resource capable of being served out, and of its location on the network (so that it can accept a request for the newly available resource and direct requests to the correct resource server).

Similarly, it is straightforward to add additional serving capacity. A new resource server is simply connected to the network and the demand director informed of its existence/presence on the network and what resources it has for serving out.

By way of example, new releases of video movies could simply be loaded into a new video server and the new server connected to the network. Alternatively or additionally, old, unused, videos could be overwritten with more popular videos, or newer videos. So long as the demand director knows what is on the network capable of being served out, and where it is, the demand director can provide a user with a requested resource.

Altering the content servable out from a resource server can be done with human intervention/manually, or a computer, such as the demand director, can automatically redistribute resources over the network in order to be able better to serve out often-requested resources. This can involve automatically copying resources either to provide multiple copies of the resource with a resource server, or copies on an additional or different server.

Once one is freed from the conventional straightjacket of having all web tier servers have the same servable content, things become much easier to change. There is, of course, an increase in the overhead in managing the knowledge of what resource is where, and this requires a smarter demand director than that of the prior art. The decision to go against the conventional mantra that all resource servers capable of serving a particular kind of resource (for example, videos) have the same variety of and number of available resources of that specific kind of resource, has very significant advantages.

Returning to FIG. 3, as demand for a particular video decreases, the demand director unit 304 removes this video data from some of the resource servers 306k-n within the farm 302. Alternatively, the demand director 304 stops the unpopular application serving on the resource servers 306k-n and leaves the content in situ. Should the overall demand for videos drop to a low enough level, the director unit 304 retires resource servers from the server farm 302. Those resource servers that are retired can be recalled to the server farm 302 should the demand increase again, or added to other farms on a MAN, as noted hereinafter. Alternatively, or additionally, typically in the case of a chronic shortage of disc space, the demand director unit 304 can overwrite unpopular video files, as determined by a statistical analysis that it can perform on the existing resource servers 306a-n, with more popular video files. Thus, is it possible for any one of the resource servers 306a-n to have more than one copy of a video on it at any given time. It is more likely, however, to have one copy of a specific video file on a video server and run more serving processes on the video server to serve out to different users, using the same video file. An advantage of having more than one copy of a video file on the same server is to not overly tax the disc on which that video file is housed.

Thus, the server farm 302 is horizontally scaleable and dynamically expandable. This enables the provision of content level granularity. The amount of resource-serving capacity dedicated to a particular resource (for example, video) can be dynamically changed depending upon demand.

Figure 3A:
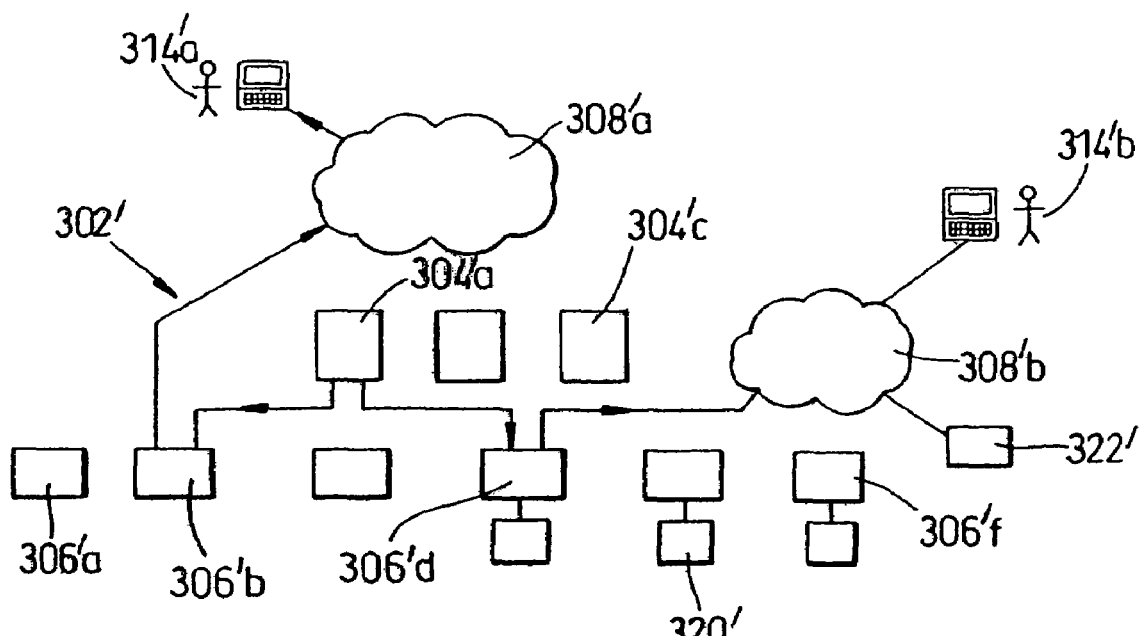
FIG. 3a is a schematic representation of a modified version of the data storage system of FIG. 3.

FIG. 3a represents a modified version of a server farm 302' similar to the server farm 302 of FIG. 3 in which three demand directors 304'a-c are provided in order to build fault tolerance into the system 302'. Additionally, some of the resource servers 306=d-f have additional storage associated with them, either in the form of DAS 320' or NAS 322'. A SCSI or Ethernet link typically connects the DAS to the resource servers 306'd-f. Thus, the horizontal scalability of this arrangement is evident.

In FIG. 3a, demand director 304'a services two requests for data to two users 314'a,b via respective resource servers 306'b,d. The data is transferred to the users 314'a,b via respective networks 308'a,b in the manner described hereinbefore. The users 314'a,b start their session by connecting to the resource servers 306'b,d via the demand director unit 304'a. Thereafter the users 314'a,b are connected directly to the resource servers 306'b,d.

Figure 6:
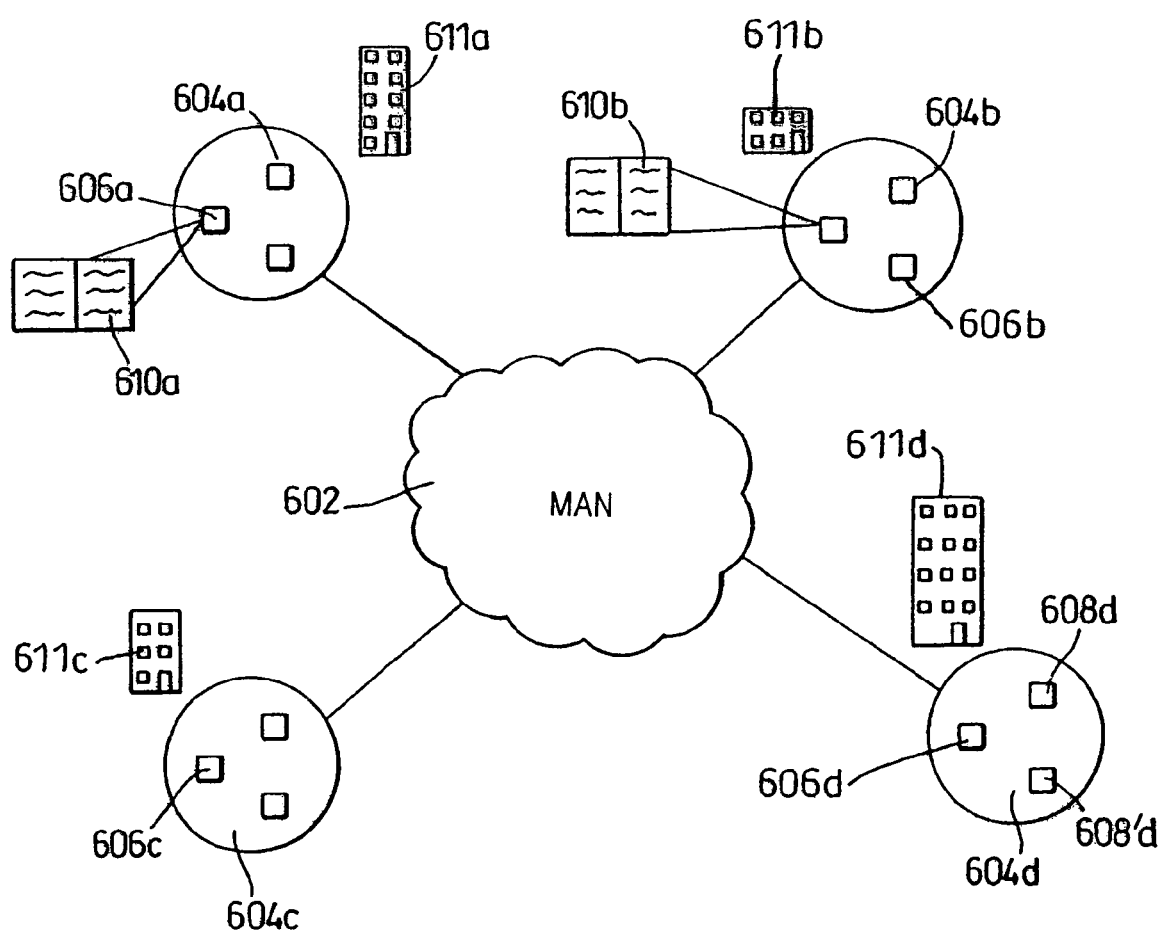
FIG. 6 is a schematic representation of a networked video library.

In FIG. 6, a MAN 602 has several server farms 604a-d connected thereto. Each of the farms 604a-d has its own demand director 606a-d and resource servers 608a-d, 608'a-d therein. Each of the demand directors 606a-d has a database 610a-d that contains details of the video content of each of resource servers 608a-d, 608'a-d. The farms 604a-d are typically situated in multiple occupancy dwellings 611a-d, such as condominiums or apartment blocks, usually in the basement or service area. When one of the demand directors 606a receives a request for a particular video, it accesses database 610a which is stored therein to see which, if any, of the resource servers 608a-d, 608'a-d has the required video data stored therein. If none of the resource servers 608a-d, 608'a-d has the video data, the demand director 604a issues a notification of that fact to the user who requested the video. There can be multiple databases, for example, each dwelling 611a-d can have a self-contained farm and does not need to go outside its own farm to find content (videos). However, a dwelling's farm can extract content from other dwellings' farms, as necessary.

If at least one of the resource servers 608a-d, 608'a-d has the required video data therein, the demand director unit 604a uses the database 610a to decide which of the resource servers 608c, 608b is best placed to serve out the data, that is, which resource server 608c, 608'b has the most available output bandwidth, which resource server 608c, 608'b has its CPU not currently being over-used, etc.

Once the decisions as to which resource server 608c is accessed in order to fulfil the request for the data, the databases 610a-d are updated to show the resource server 608c as being utilized.

The packet headers sent between the demand director 606a and the resource server 608c, and between the resource server 608c and a requester 612 are re-written such that a virtual connection 614 between the demand director unit 606a and the user, and between the resource server and the user, is established as described hereinbefore. The packets appear to the recipient user to have come from the demand director, which is where the user was expecting them to come from.

The arrangement allows data content to be further distributed over the server farms 604a-d, forming a library without each farm having to maintain the full data content of the library. For example a first set of 100 different videos could be stored in one server and a second different set of 100 videos (different from each other and from that of the first set) could be stored on a second server.

Data can be added to, or removed from each farm and additional resource servers added or removed from the farms as described hereinbefore.

Additionally, one of the demand director units 606c can operate as a central billing facility where all requests for video, wherever that request originates, for example, apartment building 611a, and whichever farm 604a-d services the request, are logged and billed. This central billing facility bills users of the system in the same manner as the billing unit 306c for the single server 302.

In both the individual farm or in the MAN connected library of farms, the content is loaded into the resource servers from a variety of sources. For example, the content can be loaded directly from a videocassette or DVD. Alternatively, the content can be downloaded into the resource servers over a network, typically the Internet, from other resource servers, or via a network, typically the Internet, from a film studio or film archive, or from a tape library connected to the server farm 302, or via a satellite download.

Figure 7:
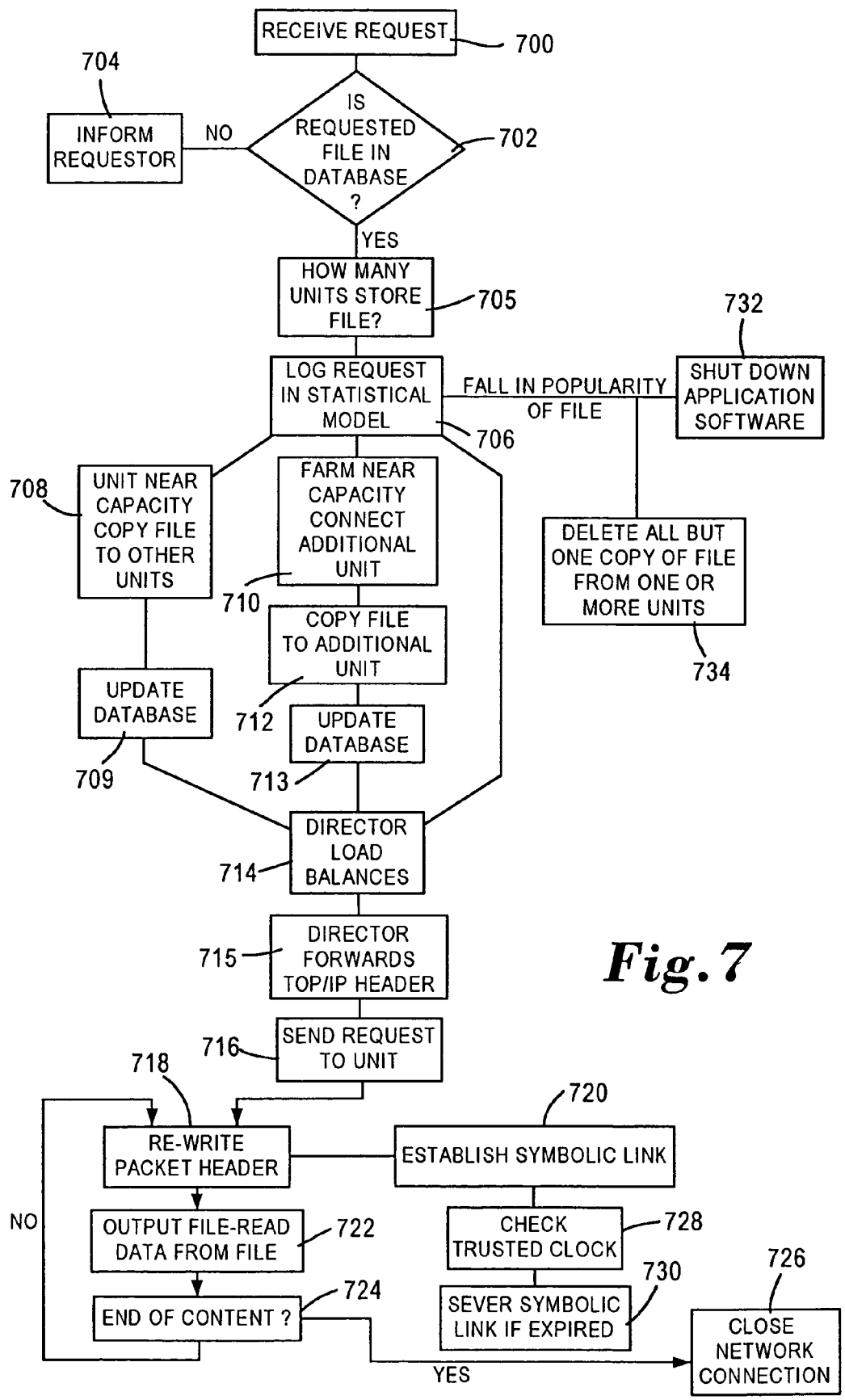
FIG. 7 is a flowchart detailing a method of data management according to an aspect of an embodiment of the present invention.

FIG. 7 is a flowchart detailing the methodology used in a server farm. The director unit 304 receives a request for a file (for example, video or audio) from a user (step 700). Typically, the user will be presented with a selection of videos from which to choose. The demand director 304 accesses the database 311 in order to ascertain if the file is stored on the farm (step 702). If the file is not stored on the farm, the demand director 304 sends a notice to that effect to the user 314 (step 704).

If the file is stored on the farm, the demand director 304 accesses the database to check how many of the resource servers 306a-n are available to service the request for the file (step 705) and logs the request in a statistical model (step 706). Resource server 306f has the requested file stored therein. There are a number of options available to the demand director unit 304.

If the statistical model has calculated an increase in the number of requests for the file, there is a possibility that the resource server 306f will not be able to serve all of the requests for the file. The demand director 304 can copy the file to an additional resource server(s) 306g-n (step 708) and update its database 311 (step 709). Also, if the other resource servers 306a-e, 306g-n within the farm are near their capacity, the demand director unit 304 can connect to additional resource servers, possibly having been previously retired from the farm, in order to use their storage and connection capacity (step 710), and can copy the requested file to one of them (step 712) and update its database 311 (step 713). Alternatively, the director unit 304 can start up additional service providing applications on the resource servers 306f.

Should the demand director unit 304 establish that there is more than one resource server 306f, 306i capable of serving a request for a file, the demand director unit 304 executes a load balancing routine (step 714) to ascertain which of the resource servers 306f, 306i is best placed to serve out the requested resource, for example, by looking at the database in order to determine the current server activity, or by using the statistical model, or by using a simple round-robin scheme.

If there is no reason why the resource server 306f is incapable of dealing with the request the demand director unit forwards a TCP/IP packet of the request for the file (step 715) to a first, inward, NIC 313a of the resource server 306f (step 716). Prior to outputting the file, the resource unit 306f writes the TCP/IP header of the output data packets such that it appears to the user's machine that they issue from the demand director unit 304 (step 718), thus establishing the one time virtual connection 318 between the demand director unit and the user's machine 316. The symbolic link is created in step 720. In step 722, the file from the resource server 306 is outputted to the user via a suitable port of the second, outward, NIC 313b, over the network 308. In step 724, the resource server 306 periodically checks to see if some of the requested content is still to be served out. If there is still remaining content, the server 306 continues to re-write packet headers (step 718). If there is more content to serve out, the network connection of the server 306 is closed down (step 726).

Once a resource server 306f is found that can service the request, the file is sent via the network 308 to the user 314 as described previously (steps 714-720). The user is free to view the file for as long as the symbolic link is maintained on the file system and as long as the resource application being run on the resource server has a free resource to service the client's request. The symbolic link can have a time limit. The demand director unit 304 can include a trusted clock that is checked periodically to see if the symbolic link has expired (step 728). If the time limit for the link has expired, the demand director unit 304 issues an instruction to the resource server 306f to sever the link (step 730), that is, to remove the file system's symbolic link to the content or drop support for the resource application being run on the resource server, typically by disabling the resource server's packet rewriting ability. Alternatively or additionally, the resource server can, by default, remove the link after a predetermined time.

As a particular file becomes less popular, the database will record less requests for it until at a threshold value, for example, no requests within a week, two weeks or a month, the demand director 304 will issue an instruction to a resource server 306d containing the file to delete all but a single copy of the file (step 732) and to leave the content of the last copy of the video file of a server in situ on the server and to shut down (step 734) the resource application running on the resource server 306f. This process will continue repeatedly over a period of time until all of the copies of the file have been disabled from all of the resource servers 306d, 306k, 306j that had the file stored therein (if demand falls off to the extent to justify that). Alternatively, the threshold can be set such that all of the copies of the file are disabled from any resource server once the threshold is reached. It is possible to delete a file from a resource server if it is unpopular, and this can be a preferred option sometimes, but since it is expensive in I/O telecoms to re-load a file to a server, it is usually preferred to de-select the file by closing the serving out application for that file running on the server.

Figure 8:
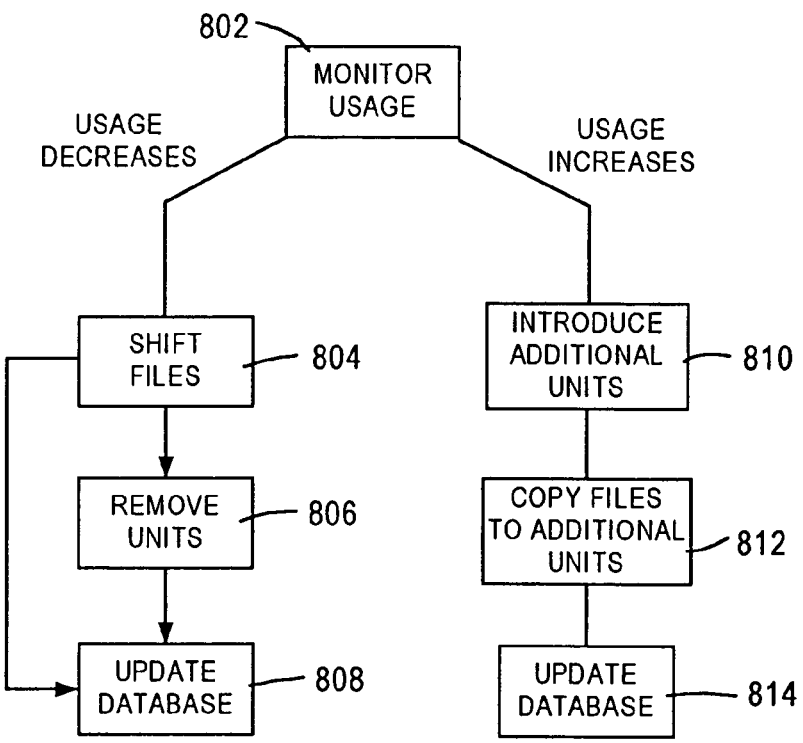
FIG. 8 is a flowchart detailing a method of data storage management according to an aspect of the an embodiment of present invention.

Referring now to FIG. 8, the demand director 304 also monitors the total usage of the farm as the usage varies (step 802). As the total number of requests for files decreases, the director unit 304 moves files between resource servers 306 to minimize the number of resource servers 306 required to service the estimated number of requests for the files (step 804). This enables redundant resource servers 306 to be retired from the farm 302 (step 806). The demand director unit 304 updates the database to reflect the redistribution of files and the retired resource servers (step 808).

As usage of the farm increases toward the capacity of the existing resource servers 306a-n, the director unit 304 adds additional resource servers 306o-s to the farm 302 (step 810) and copies some of the files to these additional resource servers 306o-s (step 812). The files copied to these additional resource servers 306o-s will typically be the most popular files. The demand director also starts up appropriate resource application serving programs on the resource servers 306o-s upon their addition to the farm. However, this is not always the case. If, for example, the additional resource servers 306o-s have a lower specification that those already in the farm 306a-n, the demand director can copy less frequently requested files to the additional resource servers 306o-s to enable more copies of the most popular files to be created on the high specification resource servers 306o-s, in order to guarantee high quality access to the more popular files. Once the additional resource servers 306o-s have been introduced into the farm 302, their content and application serving capabilities are uploaded into the demand director's database 311 (step 814).

Figure 9:
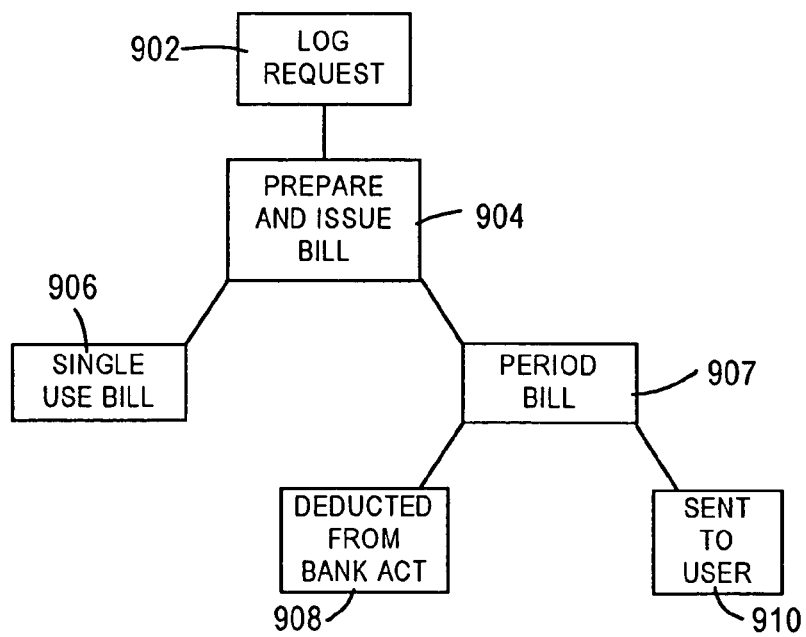
FIG. 9 is a flowchart detailing a method of credit management for data access according to an aspect of an embodiment of the present invention.

Referring now to FIG. 9, one of the resource servers 306c, or the demand director 304, can act as a billing unit. The billing unit logs an incoming request for a file (step 902) including the network address of the requestor's computer and the requestor's identification. The billing unit then causes bills to be issued to the user (step 904). The bill can be for access to an individual file (step 906), typically billed by direct debit in three working days from a user's bank account, the bank account details being held in a database. Alternatively, the billing unit can produce a bill for a billing period (step 907), typically a day, or a week, or a month, and the bill can include a subscription charge, if one is levied. This 'period' bill can be automatically deducted from a bank account (step 908) or sent to the user for manual payment (step 910).

Figure 10:
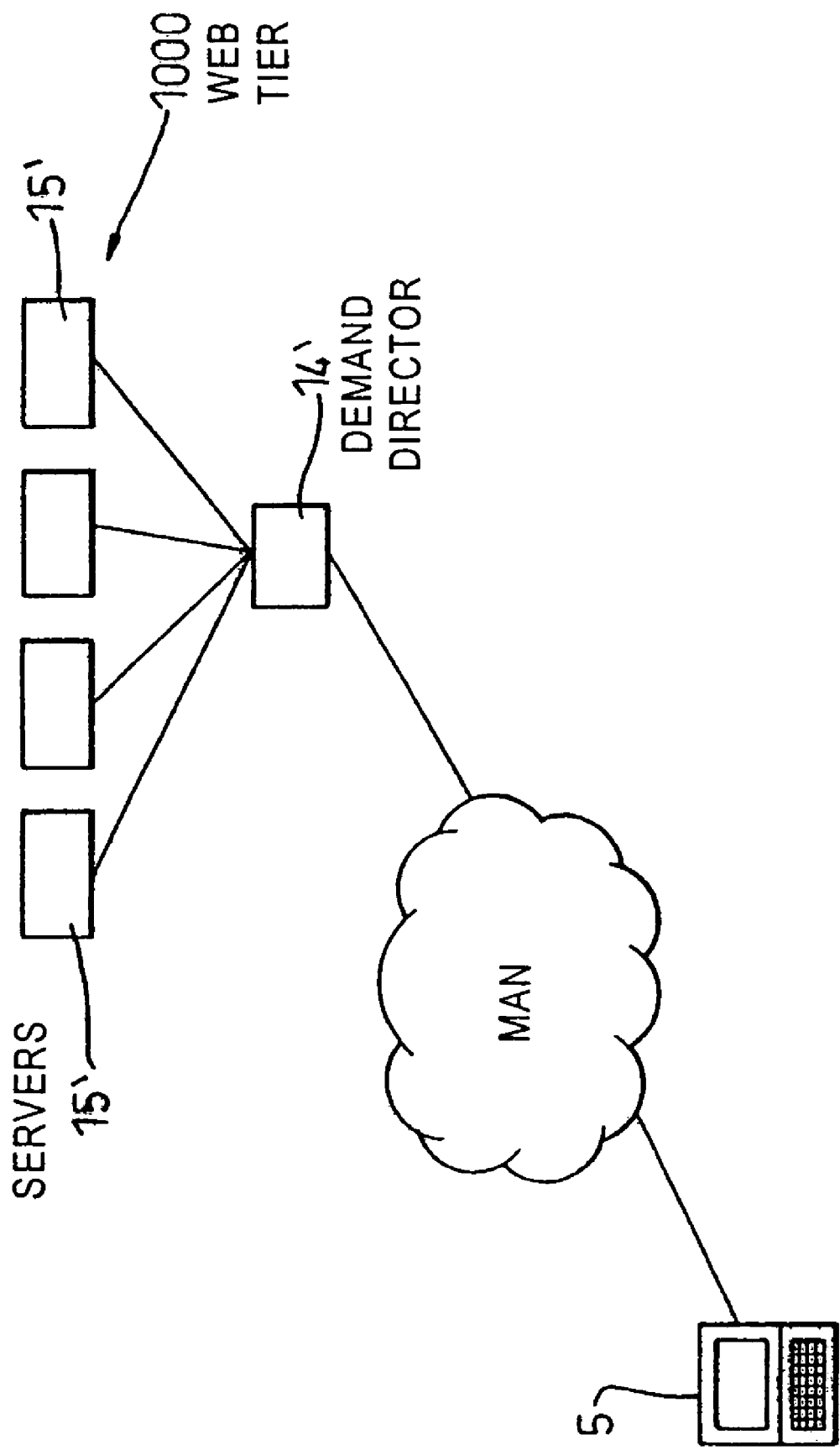
FIG. 10 schematically shows a web tier of Resource Servers in accordance with one aspect of an embodiment of the present invention.

In FIG. 10, a new web tier 1000 has resource servers 15' and a demand director 14', with different resources of the same kind on the web tier servers 15', and the demand director 14' having a "map" of where to find requested resources.

It will be appreciated that it is new in a web tier of an Application Service Provider to have a demand director know where different resources are non-homogeneously distributed over a plurality of web tier servers, each of which has the same type of resource available for serving (for example, videos, audio, data records, streamed media products), but which have different resource content, all accessible to a user by inputting the same www address. This model is more flexible than the previously sacrosanct "all content-servers have the same content" model when it comes to expanding the available resources/content (for example, increasing the number of videos). It is not necessary to modify existing web tier servers in order to add another server with different content. However, it can be desirable to do so to remove unwanted content from either being available for serving out, for example, by stopping running the software necessary to serve out that unwanted resource, or by removing it from the available resource database in the demand director, or by deleting or overwriting the resource/content with more desirable content. This avoids an increasing amount of infrequently accessed content/resource—which is wasteful in memory and/or processing capacity of the web tier servers.

It is known to have different web tier servers (accessible by the same address as seen by the user) have different content/resources in the sense of a first web tier server can have one category of resource available for serving (for example, music) and another can have a different category of resource (for example, car prices) but there has previously been a prejudice against having dissimilar source-category content/resource on different web tier servers of the same ASP.

There can be a plurality of farms connected to a MAN. Each farm can have a portion of data stored therein. The sum of the data stored on the farms can be a library.

It is apparent from comparing FIG. 10 with FIG. 3, using similar reference numerals, how simple the new arrangement is in comparison with the prior art of FIG. 3. The web tier 11, application tier 12, and database tier 13, and their associated switches, have been replaced by the single tier, web tier 1000, and the relatively dumb level 2, 3, 4 switches 14 have been replaced by a demand director, effectively level 7 switch 14'.

This makes it much easier for new companies to set up a web tier. They need to buy some resource servers (which could be PC's, for example), and buy a demand director (which could also be a PC), install the appropriate control software, and install appropriate resources (for example, videos). This is much easier, and cheaper, than establishing the complex and expensive infrastructure of FIG. 3. An ASP could now be set up in a garage if appropriate telecoms to the www are available.

It will be appreciated that in practice it can be desirable to build in some redundancy to the demand director, for example, perhaps have more than one demand director, with one acting as a slave to the other until the master develops a fault, at which point the slave, with mirror records and functionality, takes over. It can be desirable to have a copy of each resource on at least two resource servers (Raid I files in case a resource server develops a fault).

Partitioning the available resources onto different resource servers works well with partitionable content/resources. Each resource/content has an identify distinct from others in its class, and this facilitates partitioning. A large integrated database can be difficult to partition between different resource servers. Files are readily partitionable. The fact that in video serving, the resource is a datastream of content also makes it worthwhile to increase the complexity and overhead of finding the video on the web-tier, because once a user is connected to the video resource they will stay connected for a significant time while the video content is streamed to them. If the content was of small size, and the user—web tier server connection time was small, the increase in data content management may not be worthwhile. In a typical example, a user can stay connected to a web-tier video streaming server for 10 minutes, 20 minutes, 30 minutes, 60 minutes, or 90 minutes, depending upon the bandwidth of the telecoms and the size of buffer/memory available at the user's end into which the video can be stored. As technology improves, this time can be shorter.

The invention works well for read-only access to the resource servers.

While the serving of video moves has been the main example it is also envisaged that the present invention can have significant uses in other areas. For example, the present invention can be utilized for e-learning. Streaming a rich media product (for example, video, audio, multi-media performance, etc.) using the present invention can be used for teaching or training. Schools could use the present invention, as could companies for corporate training/education. Tailored training packages can be easily added to a website using the present invention. It is easier to change resource content with the present invention. A user could receive an educational video or an interactive session with streamed rich media coming to him (for example, video clips, pictures, questions, forms, music, games, etc.) or a non-interactive, read-only, session with the above. In a structured learning program, the ASP could make different modules available at different times (for example, add more complex/higher level training after more basic training). The speed and ease at which served out data content can be changed could be very useful.

There now follows a consideration in more detail of how the serving out of videos can be implemented in a Metropolitan Area Network (MAN).

Figure 11:
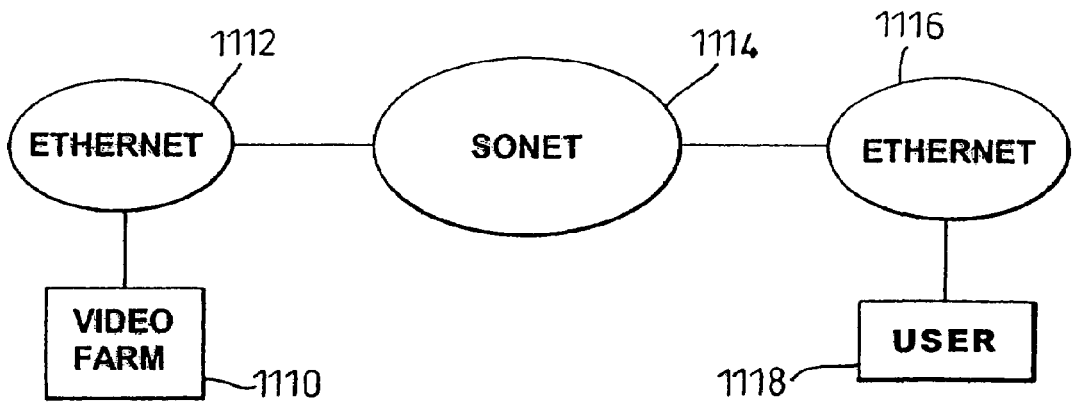
FIG. 11 is a schematic representation of a prior art long haul video serving arrangement.

Referring now to FIG. 11 which shows a prior art arrangement, a long haul video serving arrangement comprises a video farm 1110, a server local area network (LAN) 1112, typically an Ethernet, a long haul infrastructure 1114, typically a switched frame relay system, for example, using an ATM, such as SONET, a client LAN 1116 and a client machine or user 1118.

The client machine 1118 issues a request for a video stored in the video farm 1110. This request is passed over the client LAN 1116, the long haul infrastructure 1116, and the server LAN 1112 to the video farm 1110 where the request is serviced, that is, the requested video file is accessed. The file is transmitted from the video farm 1110 via the server LAN 1112 to the long haul infrastructure 1114 where it is placed into cells for transmission via the fast frame switched network to the client LAN 1116. The transmitted data is reassembled at the interface between the infrastructure 1114 and the LAN 1116. The user views the video on the client machine 1118.

This arrangement has a problem in that the long haul infrastructure 1114 is costly to install and maintain. Also, the cellularization of the data introduces a point at which transcription errors can occur or data can be lost.

Typically, long haul networks consist of networks that are owned by telecommunication carriers. Data passes between these carriers' networks through peering relationships that are not actively managed and hence can cause quality issues such as packet loss.

Figure 12:
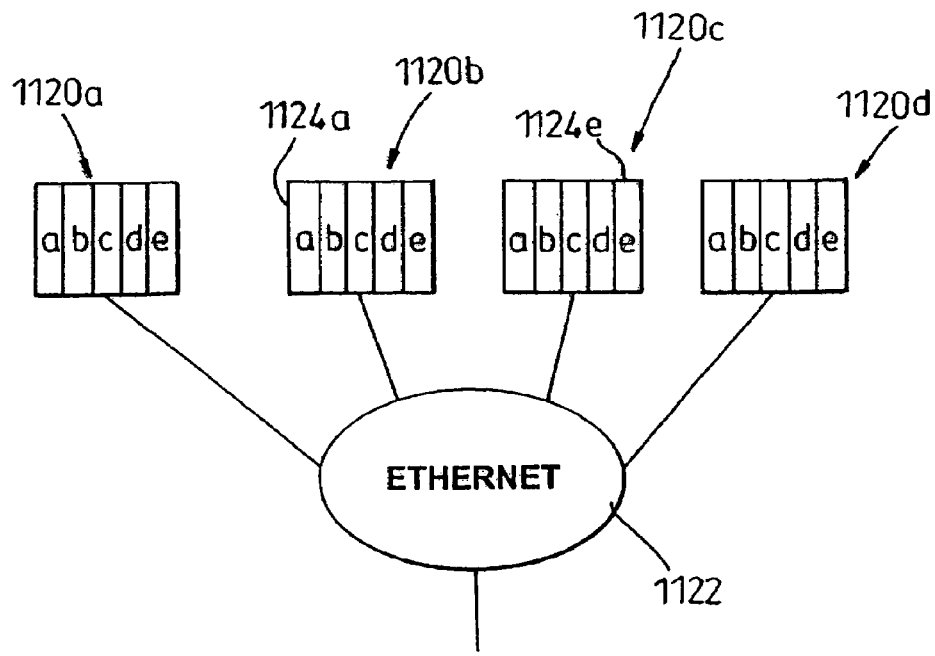
FIG. 12 is a schematic representation of a prior art Ethernet enabled video serving arrangement.

Referring now to FIG. 12, another prior art arrangement comprises a number of video servers 1120a-d (resource servers) that are connected to a LAN 1122, typically an Ethernet. All of the servers 1120a-d have the same video content 1124a-e therein and there is no awareness of a load being placed upon any single server or file. This is the current nature of video serving on LAN's, metropolitan area networks (MAN) and the Internet, that is, there is a massive overprovision of capacity in order to ensure the availability of data to a client.

Figure 13:
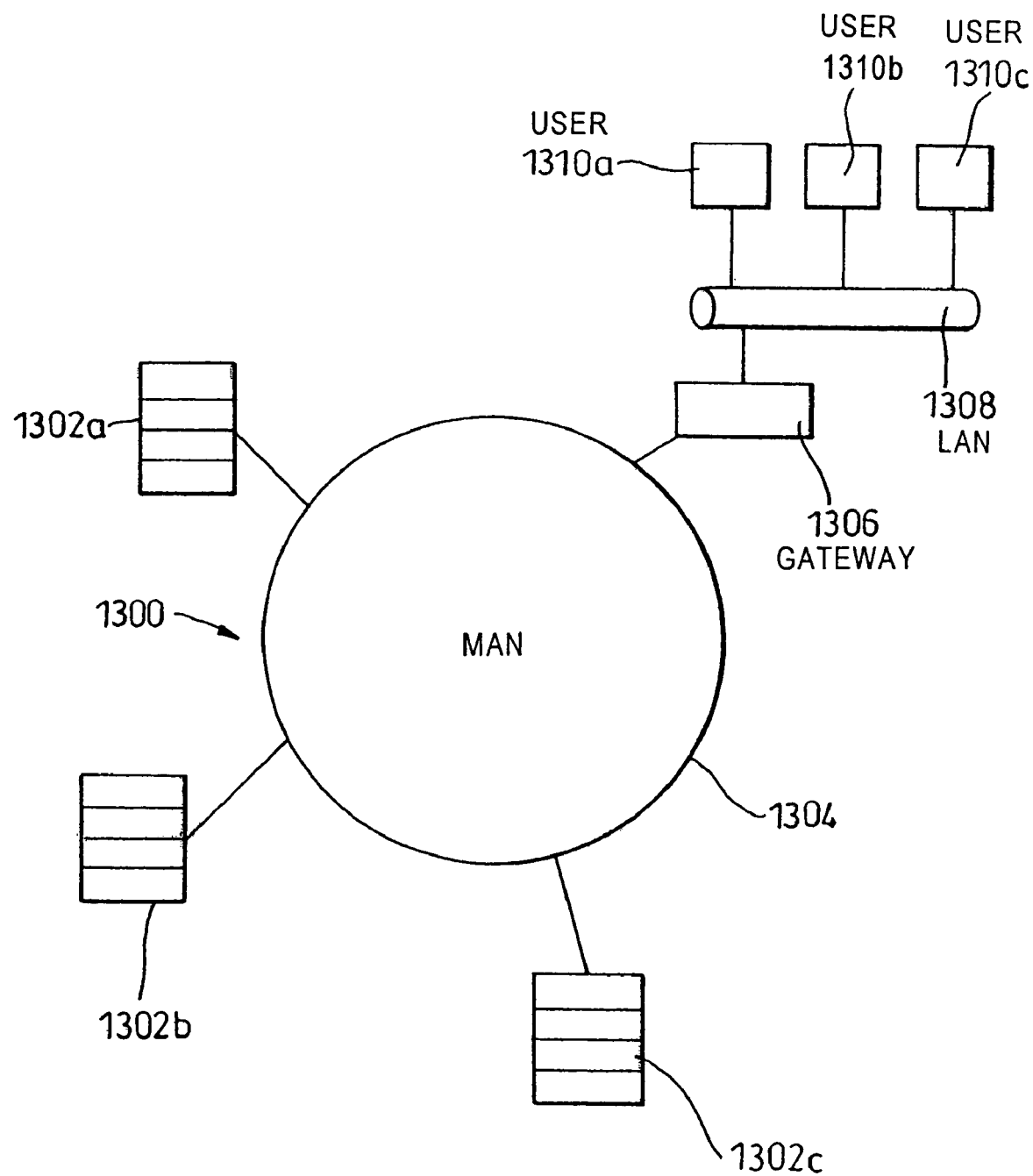
FIG. 13 is a schematic representation of an embodiment of a video serving arrangement according to an aspect of an embodiment of the present invention.

Referring now to FIG. 13, a federated video serving arrangement 1300 in accordance with an embodiment of the present invention comprises a plurality of distributed video servers, 1302a-c, connected to a MAN 1304, a gateway 1306 connected to the MAN 1304 which is in turn connected to a LAN 1308 having client workstations (that is, users) 1310a-c attached thereto.

A user on one of the workstations 1310b requests a video. The request is transmitted over the LAN 1308, typically an Ethernet, to the MAN 1304 via the gateway 1306. The MAN 1304, which is also typically an Ethernet, has the distributed video servers 1302a-c connected thereto. One of the servers 1302b acts as a master server, or demand director server, and the request for the video is forwarded by the gateway 1306 to the master demand director server 1302b.

Figure 14:
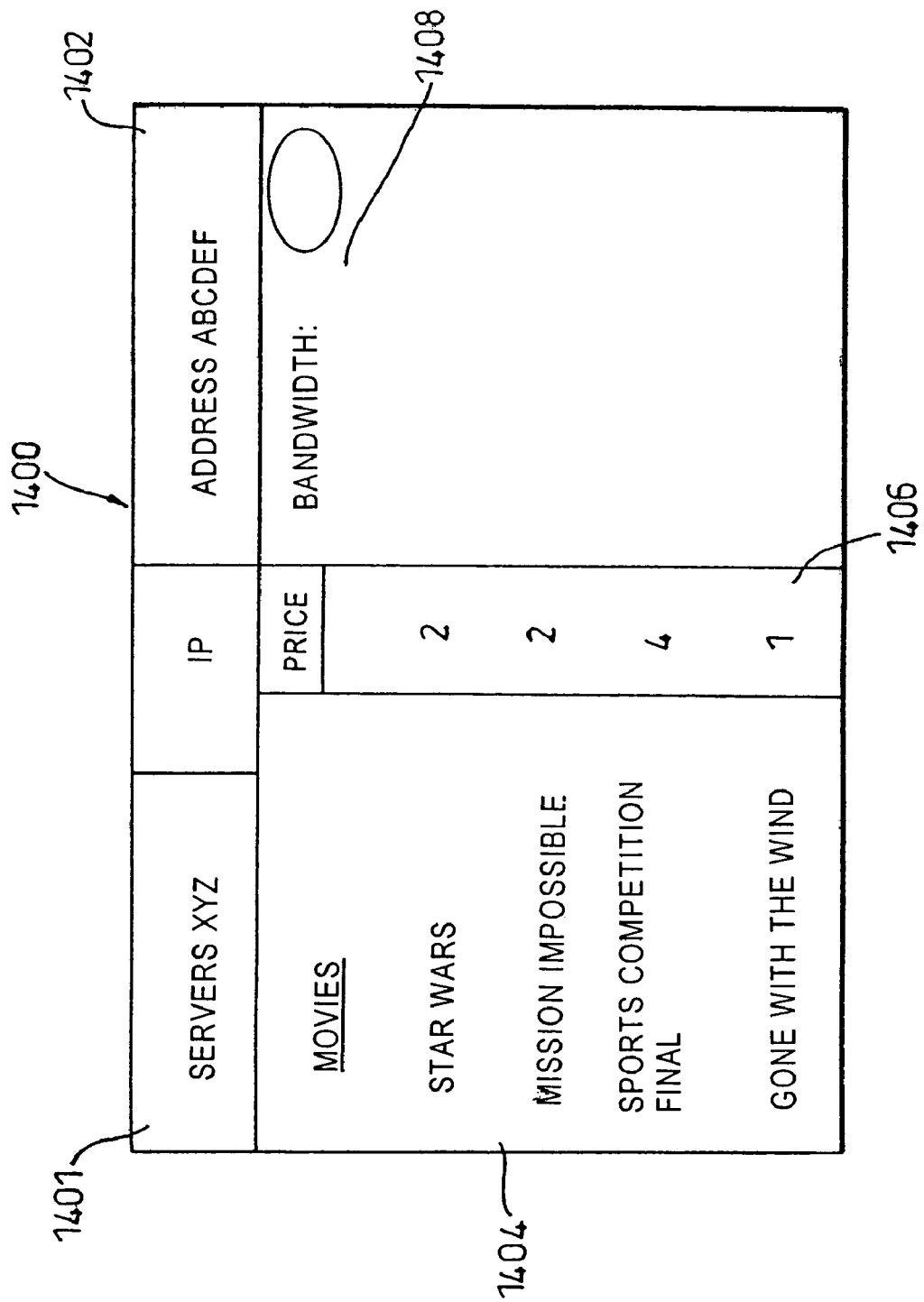
FIG. 14 is a representation of a routing/pricing table according to an aspect of an embodiment of the present invention.

The demand director master server 1302b stores a table 1400, as shown in FIG. 14, having entries relating to a resource server identifier 1401, a network address 1402 associated with each resource server, typically an internet protocol (IP) address, each resource server's data content 1404, pricing information for each data file 1406, and the current bandwidth usage 1408 associated with each resource server. The demand director master server 1302b interrogates the table 1400 in order to ascertain which resource server 1302a-c is best placed to service a request for data.

The resource servers 1302a-c do not necessarily have the same data content upon each of them. Usually, each server 1302a-c will have at least partially dissimilar content with respect to any other of the servers in order to maximize the data content available over the MAN 1304. In many instances, different servers will have wholly dissimilar or at least substantially dissimilar content stored therein. The MAN 1304 will typically cover a conurbation and each of the resource servers will usually be situated in a separate building. The building is typically a multiple occupancy dwelling, such as a condominium or an apartment building. Alternatively, the building can be a service provider's office or a designated server building.

The demand director master server 1302b and the 'slave' servers 1302ac (resource servers) use an Internet video streaming protocol (IVSP) that will be detailed hereinafter, in order to monitor the usage and manage the data content distributed over the servers 1302a-c.

The master server 1302b ascertains which of the servers 1302a-c is best placed to service the demand and the video data is transmitted via the MAN 1304 and Ethernet to the client machine 1118 using a packet based transmission protocol such as, for example, carrier sense multiple access with collision detection (CSMA/CD) or user datagram protocol (UDP).

The master server 1302b updates the table 1400 in order to account for the request being serviced should a new request for data be made. The table 1400 is updated using the protocol that is described hereinafter.

Should the master server 1302b fail or become disconnected from the MAN 1304, the slave servers 1302a,c will detect this, as they will not receive a reply to a request or response (that they periodically send out), and the first of the slave servers 1302a to detect the failure of the master server 1302b will assume the role of master, demand director, server. The new master, demand director, server 1302a builds a table that is analogous to that held by the failed master server 1302b by interrogating the remaining servers. In this example, there is only one remaining server 1302c, although there can be a plurality of other slave, resource providing, servers.

The master server 1306b can act as a centralized billing unit that correlates a client's access to data with the cost of the data and generates a bill. The bill can be either sent to the client via E-mail or conventional mail, deducted directly from a client's bank account, or added to the user's service provider's, or cable operator's, bill.

For example, a client's bill can be made up of 20% access to server A, 5% to server B and 75% to server C. The master server 1306b aggregates this server's usage to produce the client's bill.

In order to fulfil the billing role, the master server 1306b must log which video data the client accesses, the cost of accessing the data and the clients network address, typically their IP address. If the master server 1306b is to send a bill to the client via conventional mail, it must retain the client's address and if it is to deduct the bill directly from an account, it must retain the client's bank details.

Figure 15:
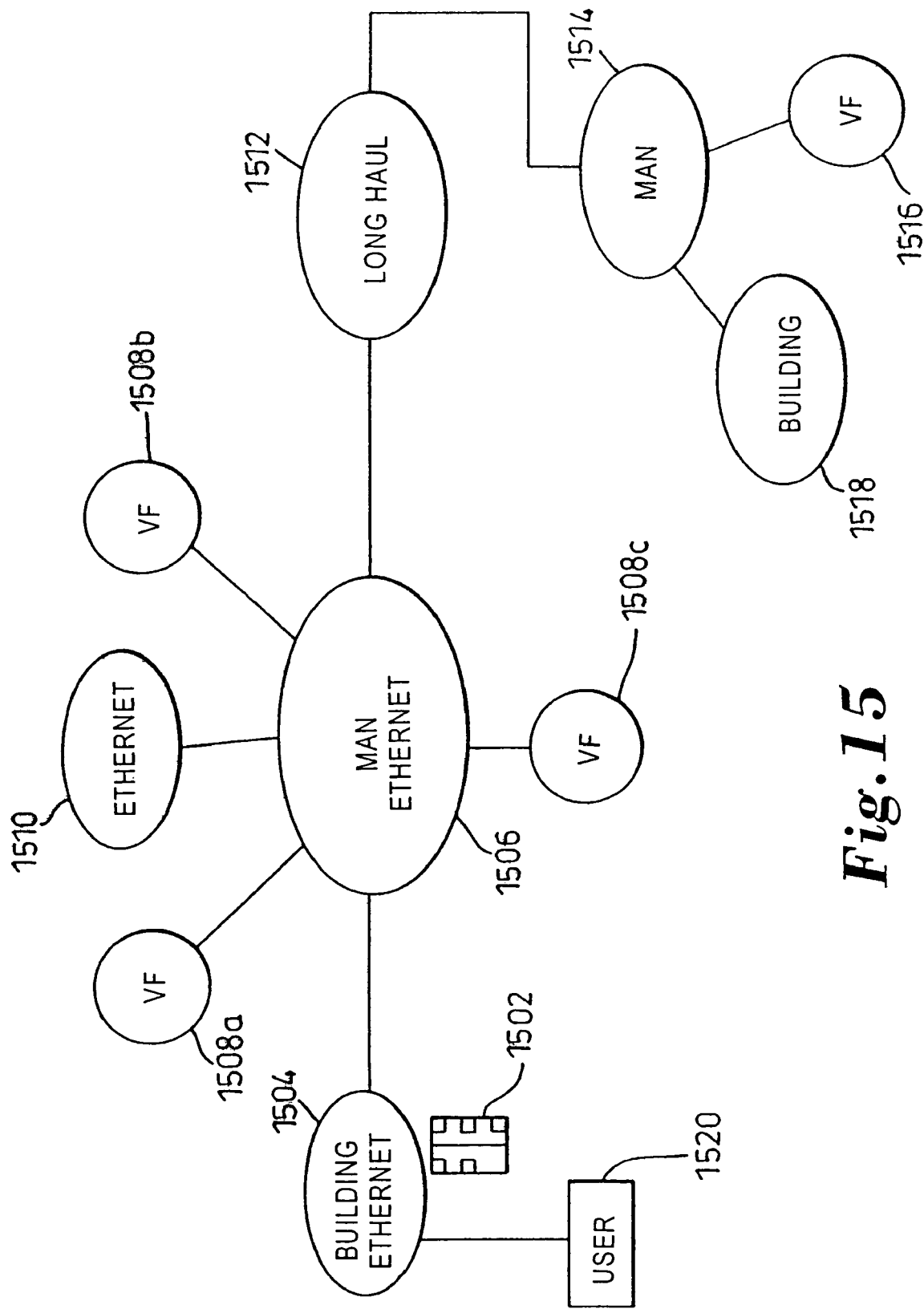
FIG. 15 is a schematic representation of a long haul video serving arrangement incorporating an embodiment of the present invention.

Referring now to FIG. 15, a second embodiment of a federated video serving arrangement in accordance with the present invention includes a long haul data transfer arrangement 1500 that comprises a building 1502 having its own Ethernet LAN 1504 that is connected to an Ethernet MAN 1506. The MAN 1506 has a plurality of video server farms 1508a-c, as described hereinbefore, and another Ethernet LAN 1510 connected thereto. The MAN 1506 is also connected to a long haul digital network 1512, for example SONET, a synchronous digital hierarchy (SDH) network or a frame based fast packet-switched network typically based on asynchronous transfer mode (ATM). A second Ethernet MAN 1514 is also connected to the long haul network 1512 and has a video server farm 1516 and a building Ethernet 1518 connected thereto.

A user 1520, located in the building 1502, requests a video. This request is passed via the building LAN 1504 to the MAN

1506. The request will either be addressed to one of the farms 1508*a-c* or it will circulate about the MAN 1506 until it identifies a video farm 1508*b* which is capable of serving out the desired video. Once the request is received by the farm 1508*b*, the master server within the farm 1508*b* consults the table 1400 to ascertain which server has the requested file and the available bandwidths to service the request.

Additionally, the table 1400 holds details of the data content stored in servers of the other farms 1508*a,c* connected to the MAN 1506, it can also retain the details of the data content stored in the server of the video server farm 1516. Thus, if necessary, the request can be forwarded to the video server farm 1516 via the long haul digital network 1512 and the requested video can be served to the user 1520 using MANs 1506 and 1514, the long haul digital network 1512 and the LAN 1504.

Conversely, a user on the building Ethernet 1518 requesting a video that is present in one of the server farms 1508*a-c* can be served in a manner similar to that hereinbefore described.

Figure 16:
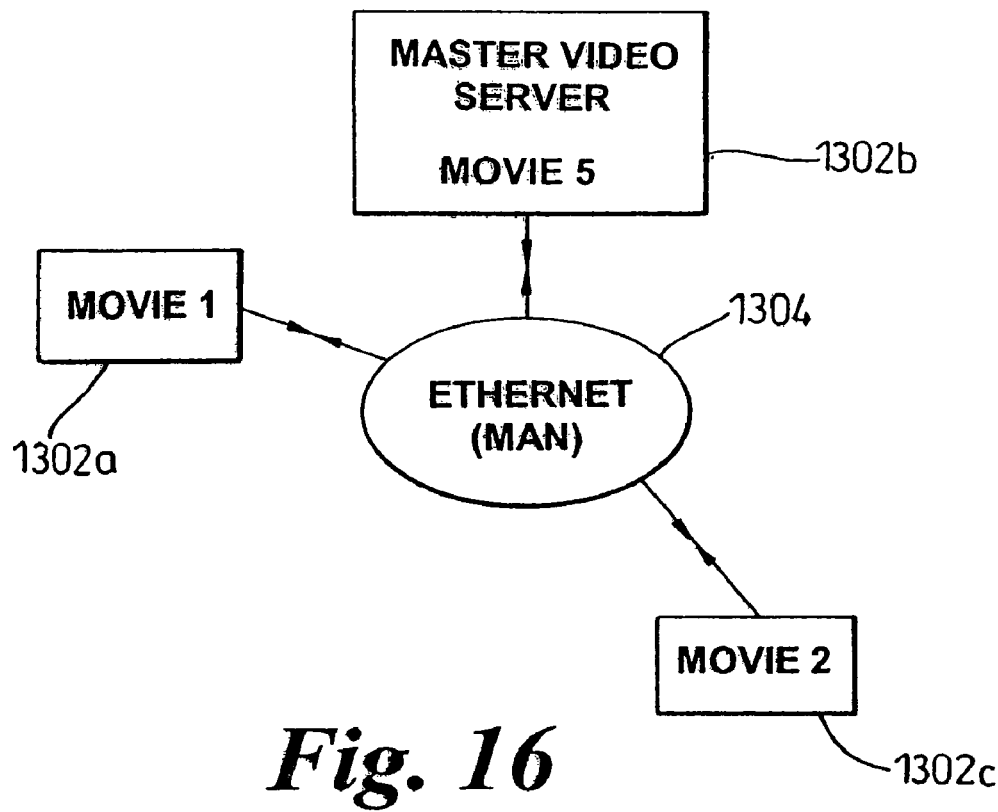
FIG. 16 is a schematic representation of the 'master'/'slave' video server relationship of the video serving arrangement of FIG. 13.
Figure 17:
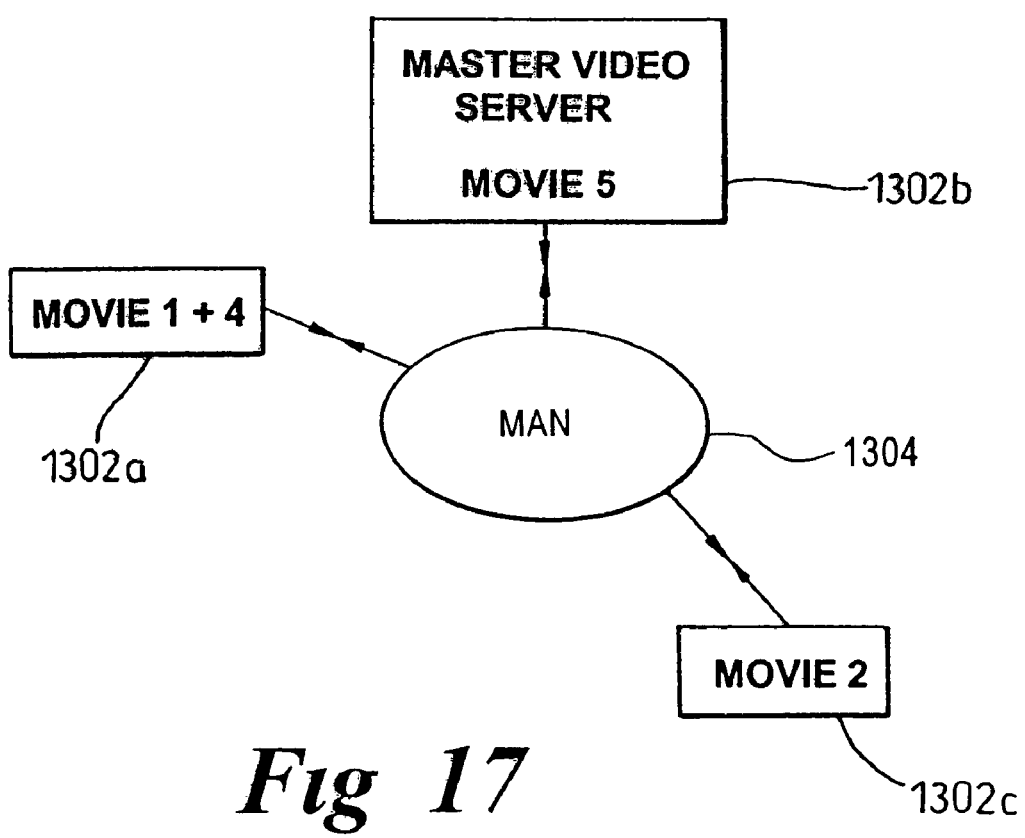
FIG. 17 is a schematic representation of a master-slave video serving arrangement of FIG. 16 with a redistribution of files between servers.
Figure 18:
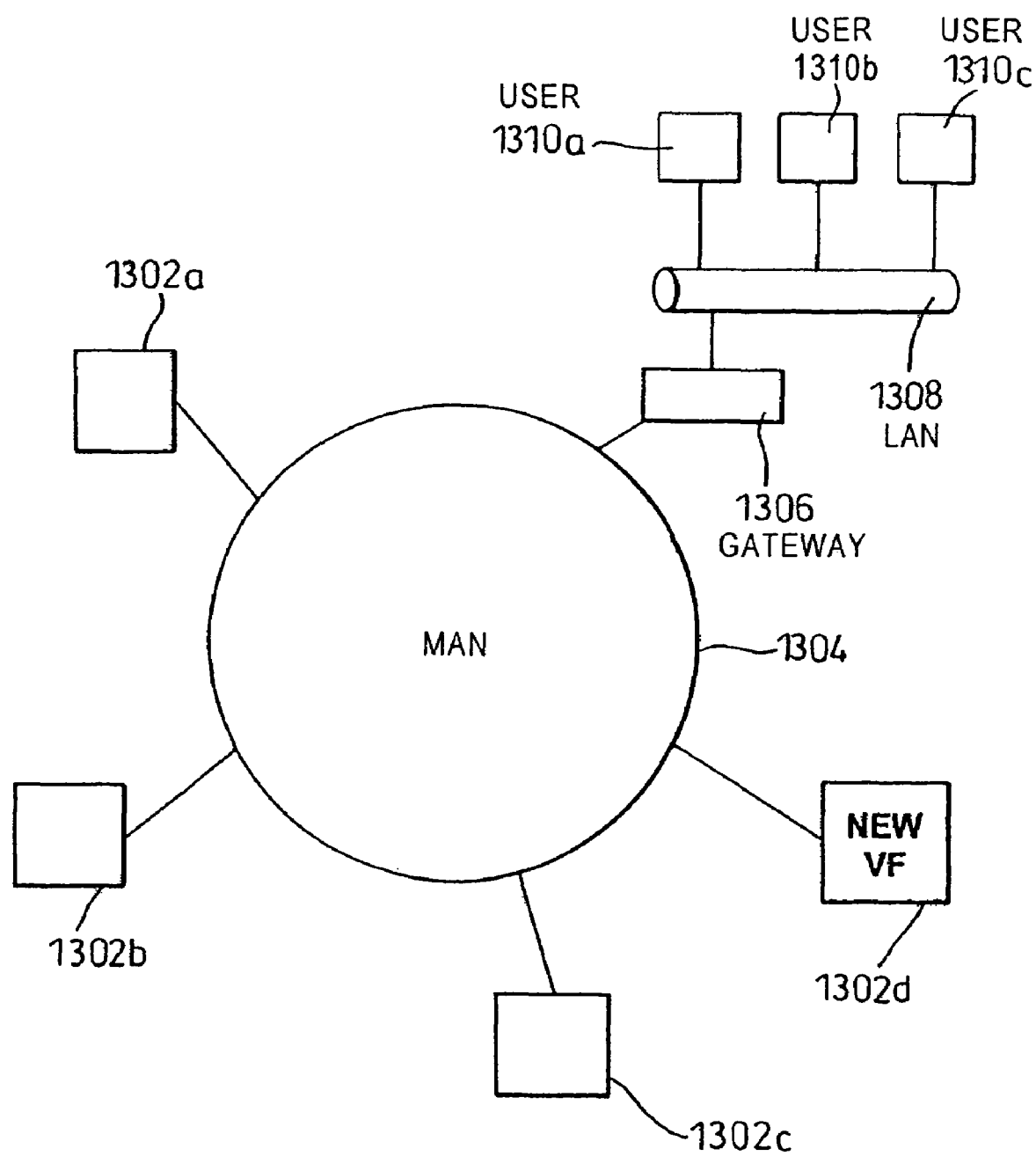
FIG. 18 is a schematic representation of the video serving arrangement of FIG. 13 incorporating an additional data content server.

FIGS. 16, 17 and 18, are representations of the federated servers of FIG. 13 and similar parts will be accorded similar reference numerals. As described hereinbefore, the master server 1304*b* receives a request from one of the terminals 1310*c* for a video. The master server 1304*b* accesses the database 1400 to ascertain if one of the servers 1304*a-c* has the video data content stored therein and if such a server 1304*a* has spare bandwidth available to stream the video to the terminal 1310*c*. If the server 1304*a* has the data content therein but does not have the bandwidth available for streaming purposes, for example, all streaming ports are at or near the capacity, but has bandwidth and or ports available for, for example, file transfer protocol (FTP) transactions or for RSYNC, the master server 1304*b* instructs the server 1304*a* to copy the requested data file to another server 1304*c* within the farm 1300 with available streaming capacity.

Alternatively, typically if there are no servers currently within the farm 1300 with ports available for streaming or no available streaming capacity, the master server can connect an additional server 1304*d* to the farm 1300 and transfer the requested file to the additional server 1340*d* in order to service the request.

However, if subsequently demand is seen to fall significantly, the data content can be consolidated on the original servers 1304*a-c* and the additional server 1304*d* can be returned from the farm 1300 by the master server 1304*b*.

In order to carry out a suitable method of data management upon the arrangements detailed hereinbefore it is necessary to define a data management protocol.

Figure 19:
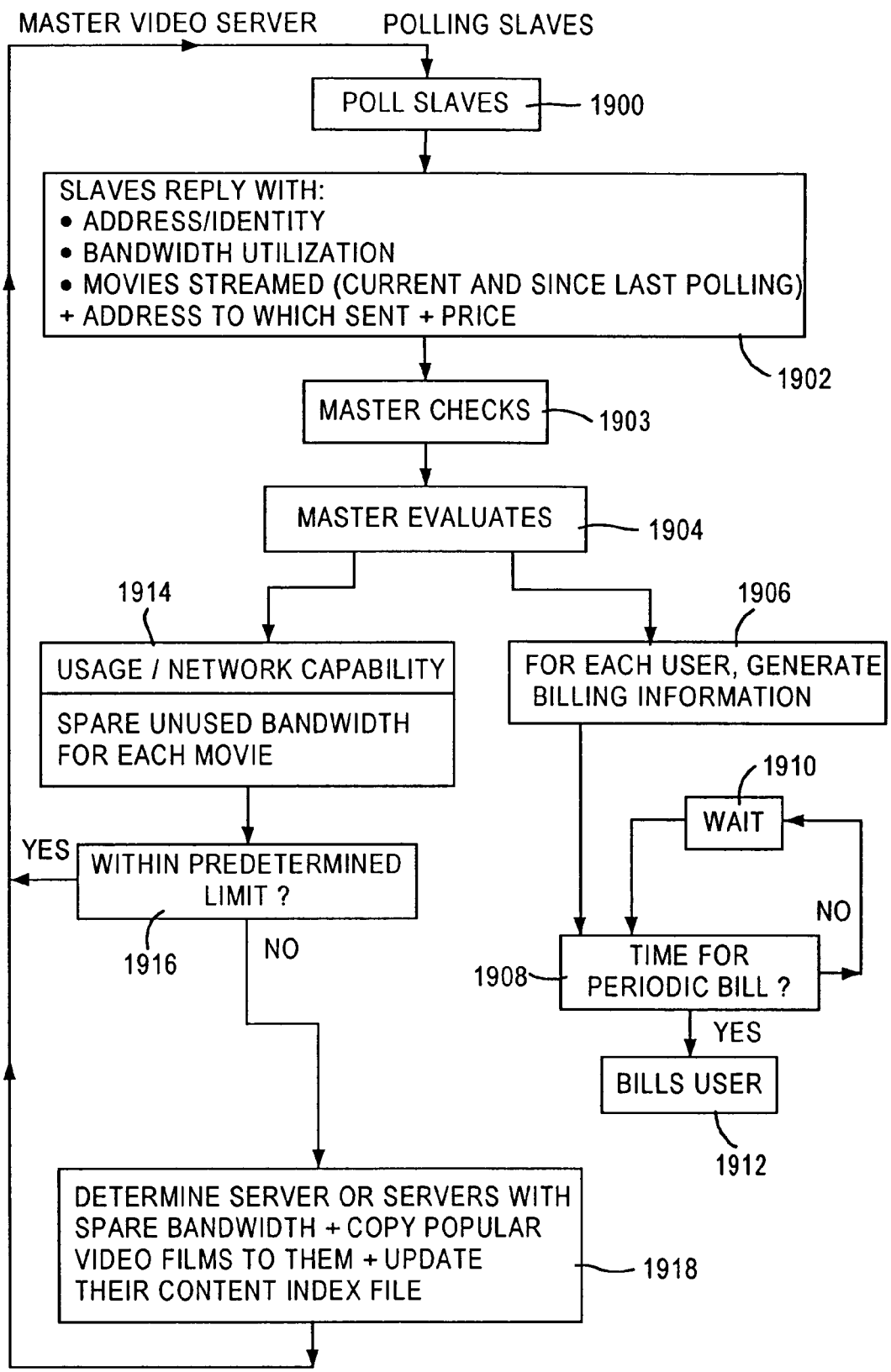
FIG. 19 is a flowchart of a method of data management according to an aspect of an embodiment of the present invention.

Referring now to FIG. 19, the master server (demand director) polls the slave servers (resource servers) periodically, typically every few seconds (Step 1900) in order to ascertain their bandwidth and port utilization. The slave servers respond with details of their network address, bandwidth utilization, the videos streamed (both currently and since the last polling), the address to which the streamed movies were sent and their price (Step 1902). If a server streaming data content to a user is polled for billing information, the master server checks to see if it has already received the information for that particular streaming of data from a previous polling in order to prevent multiple billing occurring (Step 1903).

The master server evaluates the responses from the slave servers (Step 1904) and generates billing information for each user (Step 1906). The master server then checks to see if it is time to generate the periodic bill for the user (Step 1908). If it is not time to issue the bill, the master server waits a set time, typically a few days, (Step 1910) before again checking to see if it is time to bill. If it is time to issue the bill to the user, the master server generates an aggregate bill for the user for their data access wherever upon the network it originated and issues the bill (Step 1912).

In parallel with the billing function, the master server evaluates the bandwidth usage and capabilities of each of the servers, that is, which servers have spare ports and bandwidth to output further videos (Step 1914). The master server determines whether the usage of each of the servers, and possibly even each of the ports of IO devices of each server, are within a predetermined limit. (Step 1916). If the usage is within the predetermined limit, the master server returns to polling the slave servers. Alternatively or additionally, each server can evaluate its own bandwidth usage and capability to serve out.

Should the usage fall outside of the predetermined limit, the master server determines which server or servers have an appropriate port, or ports, and spare bandwidth to service the required file types and copies the most heavily used video data file to a server or server with the appropriate port and spare bandwidth (Step 1918).

Once the master server has received an acknowledgement that the data has been transferred to the appropriate slave server (content server) and has updated the database of distribution of content and network address of content servers, the master server returns to polling the slave servers.

Figure 20:
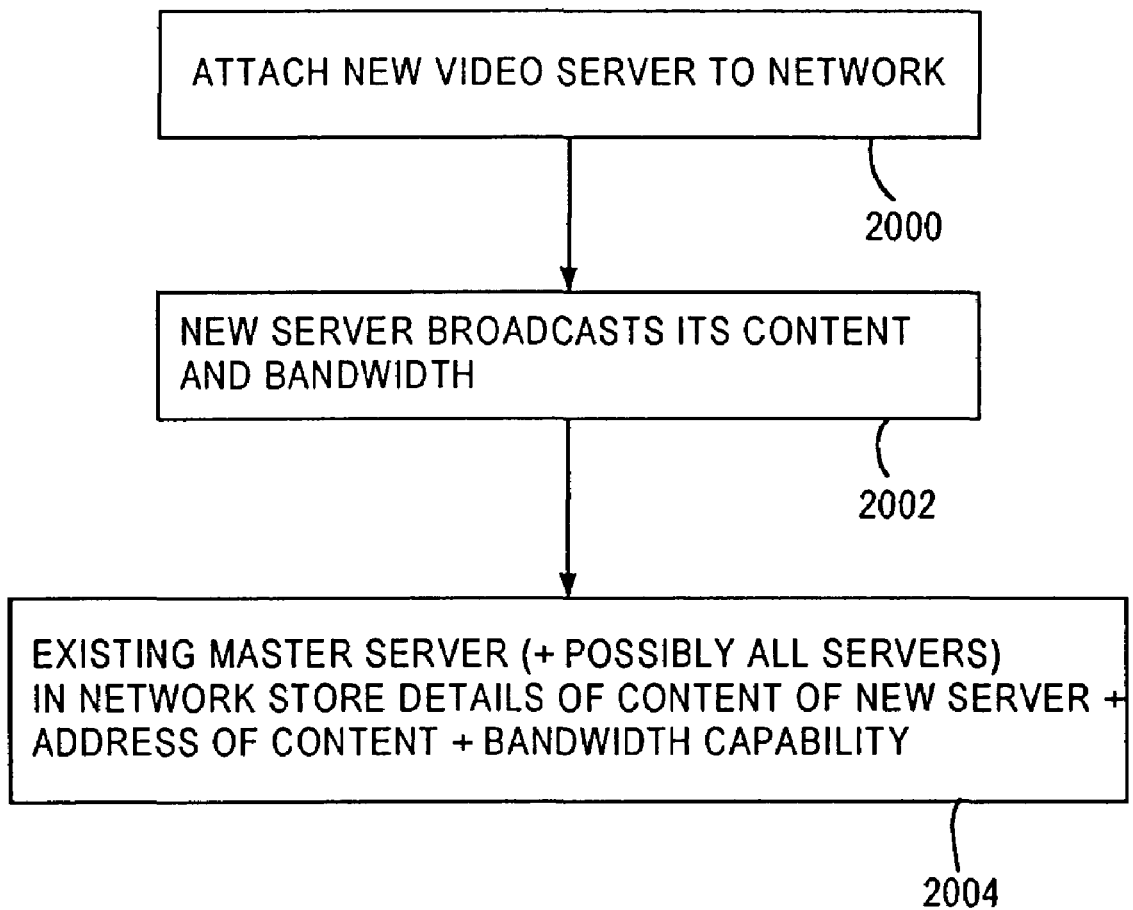
FIG. 20 is a flowchart of a functional step according to at least part of an aspect of an embodiment of the present invention.

One command associated with such an Internet video streaming protocol (IVSP) is a "joining" command (IVSP-OP-JOIN) in which an additional server is added to a server farm. Referring to FIG. 20, IVSP-OP-JOIN comprises connecting a video content data server to the network, (Step 2000). Once connected to the network, the new video server broadcasts its data content and bandwidth available for streaming, and typically also other types of data transfer, (Step 2002) in order that the master server can capture them and add them to the database that retains details of which network address has which data content and available bandwidth (Step 2004). It is possible that servers other than the master server can also retain such tables and they too will auto-update on receiving the new video servers network address, data content and available bandwidths.

As server bandwidth usage increases, it is necessary to compensate for this, for example, by starting up additional application servers software on existing video data content servers, migrating content between video data content servers or connecting new video servers to the video server farm. This requires a trigger, or alarm, command (IVSP-OP-BNDALARM).

Figure 21:
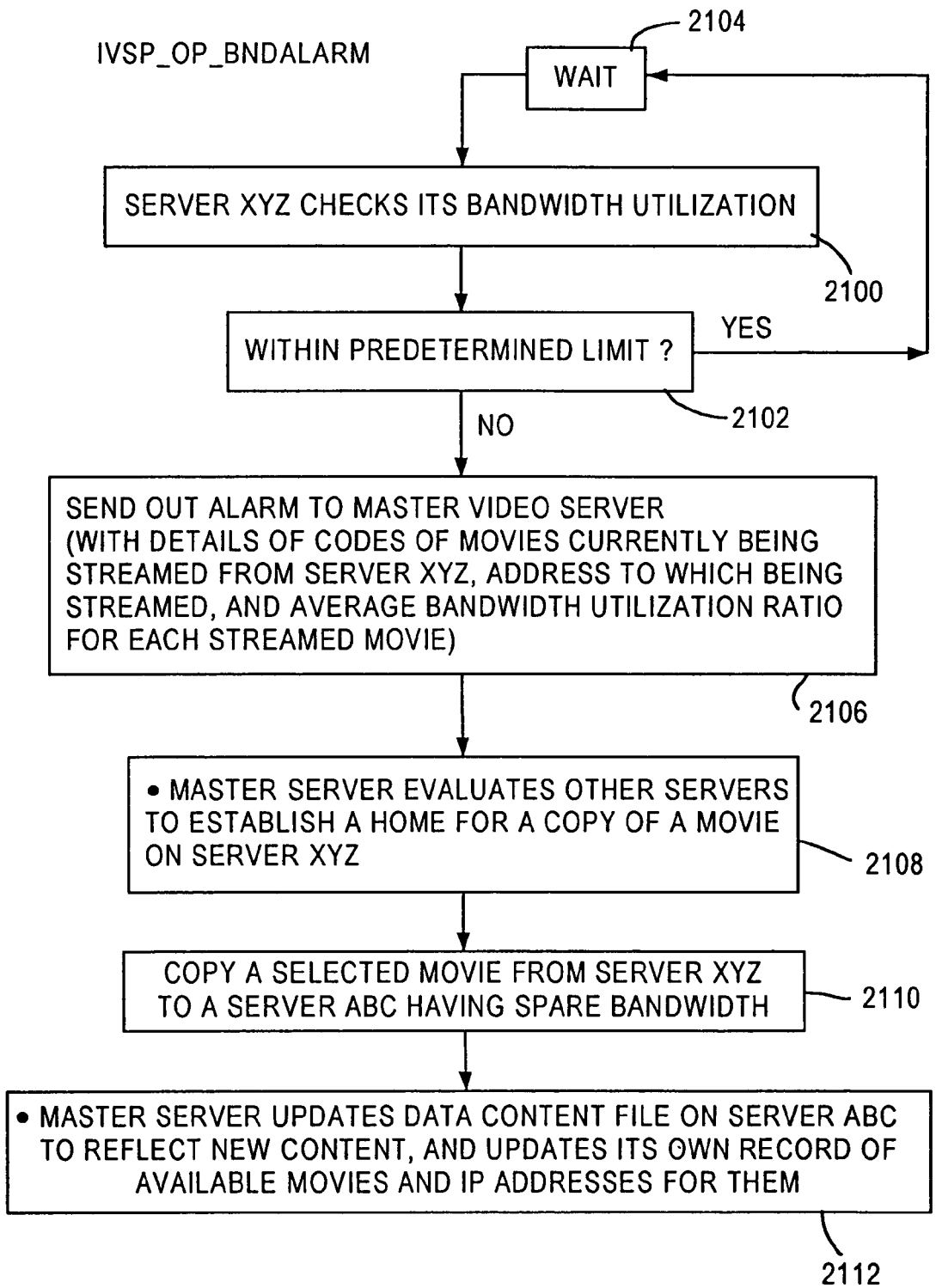
FIG. 21 is a flowchart of a yet further functional step according to at least part of an aspect of an embodiment of the present invention.

FIG. 21 is a representation of IVSP-OP-BNDALARM and comprises a server monitoring either its own or another server's bandwidth utilization (Step 2100). The server checks to see if the bandwidth utilization is within a predetermined threshold limit (Step 2102). If the bandwidth utilization is within the threshold limit, the server waits for a period (Step 2104), typically a few minutes before checking the server's bandwidth utilization again. Waiting a few minutes between checking bandwidth utilization prevents the network and/or CPU of the servers being swamped with protocol execution and transport.

If this bandwidth utilization is above the threshold limit indicating high usage, or below the threshold limit possibly indicating a problem with the server, the server sends out an alarm message to the master server (Step 2106). The alarm message will typically include details of the codes of videos currently being streamed from the server, the address to which they are being streamed, the average bandwidth utilized by each movie being streamed and details of codes of videos in the server that are not being streamed.

The master server accesses the database and evaluates which of the other available servers within the farm is suitable and has spare bandwidth, if any, for serving the data content of the heavily utilized server (Step 2108). The master server facilitates the copying of the data content from to available, suitable server from the heavily utilized server (Step 2110). The master server thus updates the database entries relating to the suitable server's content and the address for the copied data content (Step 2112).

Figure 22:
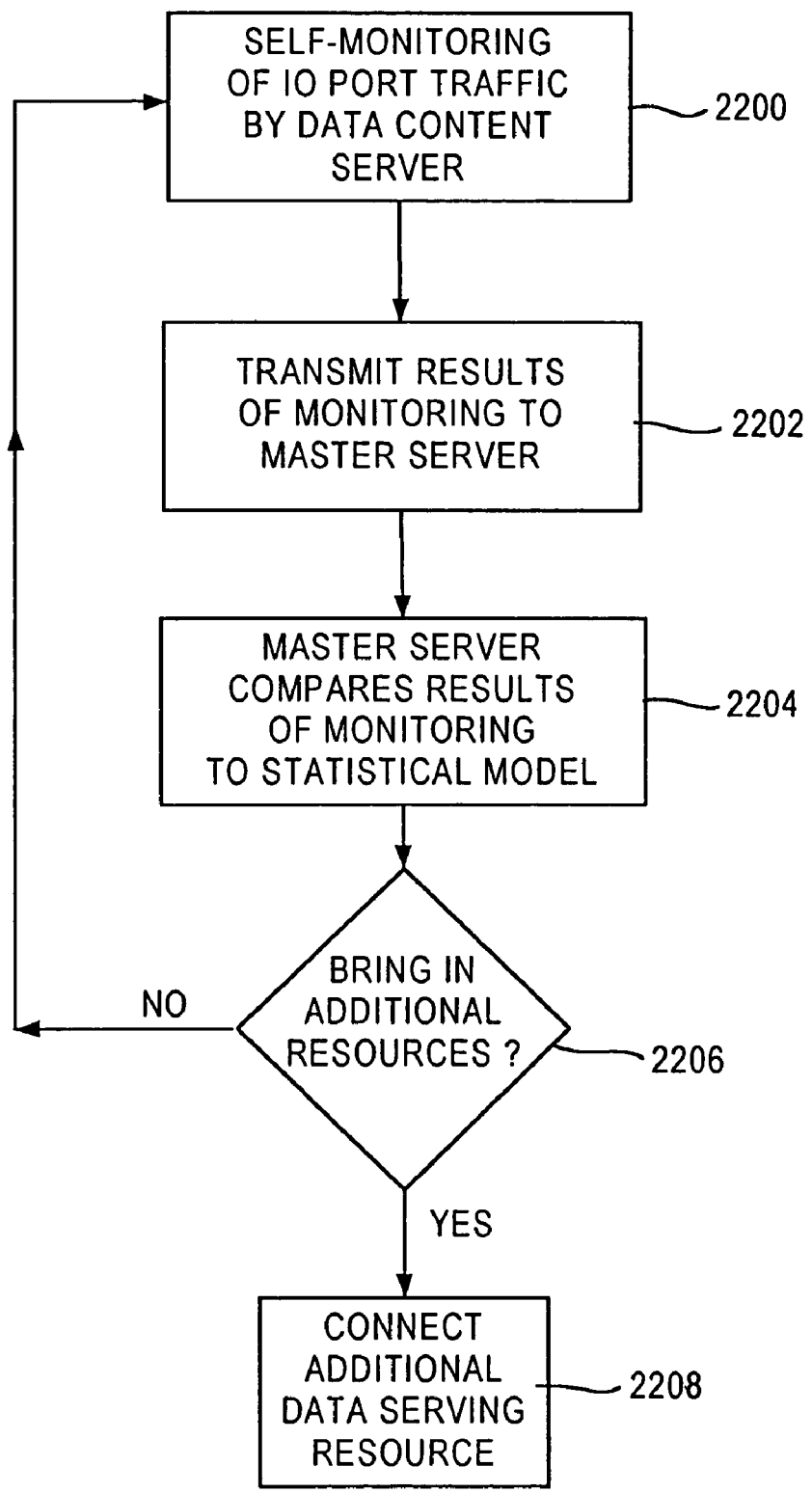
FIG. 22 is a flowchart of a still further step functional step according to at least part of an aspect of an embodiment of the present invention.

Referring now to FIG. 22, a message is sent from each server to the master server detailing their respective usages (IVSP-OP-USAGE).

IVSP-OP-USAGE comprises each data server self-monitoring its own input output ports traffic (Step 2200). These results are transmitted to the master server (Step 2202) that compares the results to a statistical model of network traffic (Step 2204) in order to determine whether or not to bring in additional data serving resources in the server farm (Step 2206). If there is no need to bring in additional resources, the data content server returns to self-monitoring. Should the master server determine that additional data serving resource is required, the resource is connected (Step 2208). The additional resource can be either, or both, server application software or an additional data content server.

In order to produce an aggregated bill for a user, it is necessary for the master server to be aware of what data content is accessed from the slave servers by the user. Therefore, a message must be transmitted to the master server each time a user accesses the data (IVSP_OP_BILL).

Figure 23:
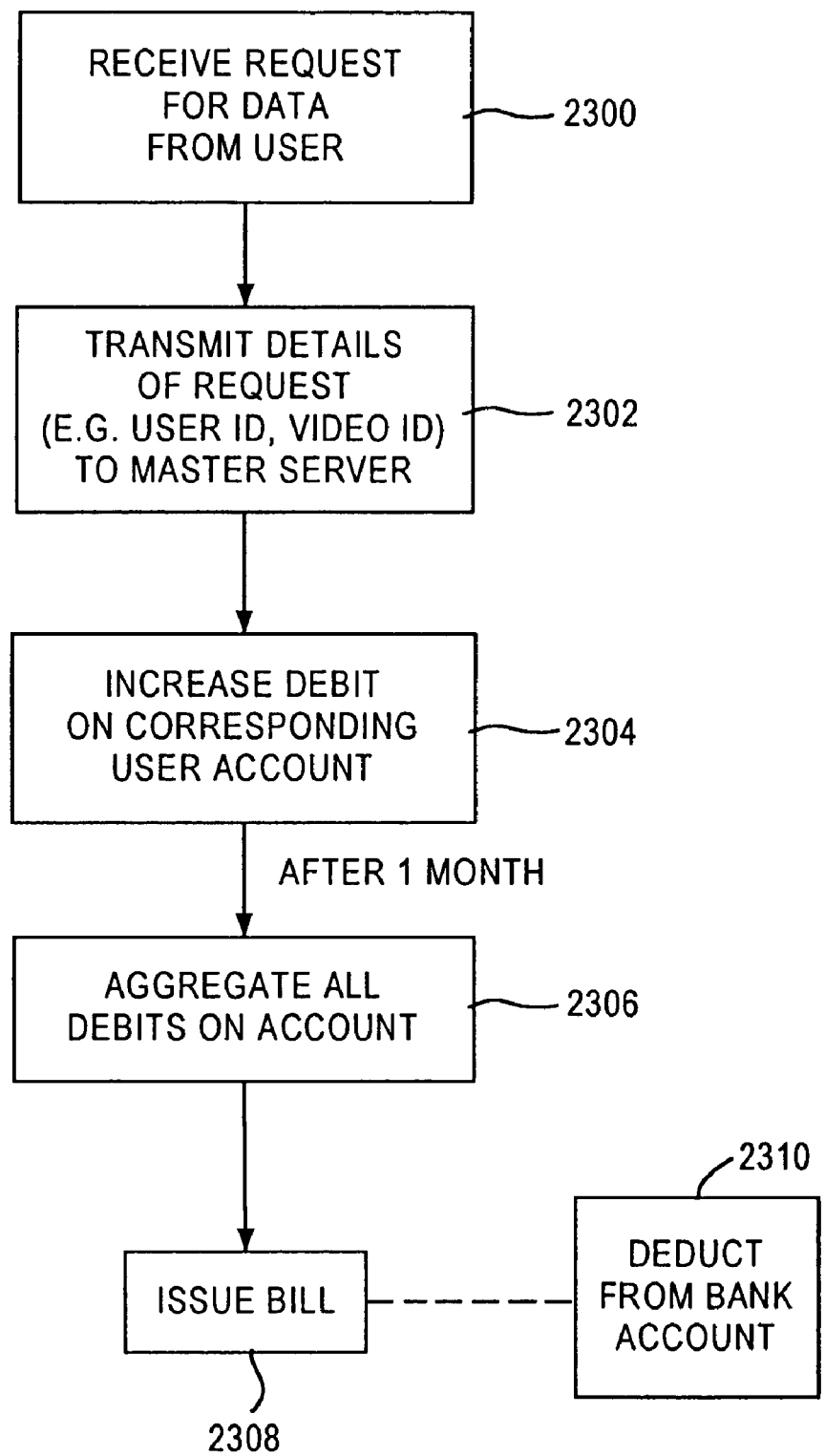
FIG. 23 is a flowchart of a yet still further step functional step according to at least part of an aspect of an embodiment of the present invention.

Referring to FIG. 23, IVSP_OP_BILL comprises the data content server receiving a request for data from a user (Step 2300). A message containing details of the request is transmitted, via the network, to the master server (Step 2302). Typically, the details contained within the message include what video has been requested, or has been streamed, the network address to which they were streamed, a user identifier and the price charged for streaming the video.

Each user of the video farm will have an account that is established via the network, in a manner well known in network business services. The balance of a user account is debited each time the master server receives an access message with a user identifier corresponding to that account (Step 2304). The user account will typically be password protected in order to prevent unauthorized access of files, for example, access of 18 certificate videos by minors.

After one month, an aggregate bill for all of the data accessed by a user, from whatever source on the network, is produced by the master server (Step 2306) and is sent to the user, either electronically or manually (Step 2308). Although shown as occurring monthly, the aggregate billing can occur at any convenient interval, for example, daily, weekly, biweekly, etc. If a user gives their consent, the master server retains their bank account details and the aggregate bill is deducted directly from their bank account (Step 2310).

There is also a message relating to a request for a copy of a video to be sent to a data content server (IVSP_OP_COPY) and an acknowledgement of such a request (IVSP_OP_ACK).

An IVSP_OP_COPY request payload will typically include details of the video required, the coding format, for example, MPEG, REAL MEDIA, encoding rates and file size.

IVSP_OP_ACK contains details of whether the server can service the request, that is, whether it has sufficient bandwidth available and whether the server already has a copy of the data resident therein. If the server does not already have a copy of the data resident therein, the fact that it requires a copy to be sent to it in order to service the request is contained within IVSP_OP_ACK.

It will be appreciated that while the present invention has been described with reference to video data, it is equally applicable to any file based data, for example, audio data or computer based training modules, and to non-file based situations.

There can be a counter that is arranged to increment each time data is accessed. The farm can be part of a (Metropolitan area network) MAN. The farm can be situated in a residential building, typically, a multiple occupancy dwelling (for example, a block of apartments, condominiums, or an office block). The farm can be an element in a video and/or audio rental or pay per view system. The farm can include an automatic billing unit for the rental or pay per view system. The billing unit can be arranged to generate and/or distribute bills to a user of the rental/pay per view system for content that they have accessed.

There now follows a description of another embodiment in accordance with the present invention, with an emphasis on a monitor server monitoring the available capacity of resource servers and/or traffic levels, and varying the capacity of the network to serve out a requested resource in response to the level of demand of the resource in question. The monitor server can be the same server as the demand director server referred to earlier, or it can be a different server.

Figure 24:
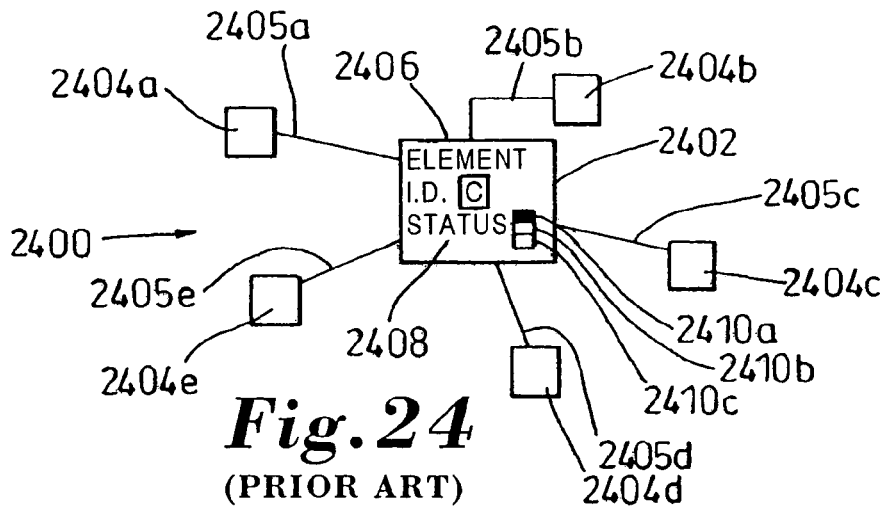
FIG. 24 is a schematic representation of a prior art simple network management protocol (SNMP) network management system.

It will be helpful to discuss the embodiment after a brief discussion of how prior art networks manage demand for resources. Referring to FIG. 24, a prior art network management system 2400 comprises a management console 2402 and a plurality of network elements 2404*a-e*. The network elements 2404*a-e* are typically PC's, servers, disc arrays, tape drives and/or printers. The network elements 2404*a-e* are connected to the management console 2402 via network connections 2405*a-e*. These connections need not, of course, be directly connected to the console 2402 as long as the network exists.

The management console 2402 typically displays a network element identifier (I.D) 2406 and its status 2408. The status display 2408 usually takes the form of a series of color-coded screen regions 2410*a-c*. One of the regions 2410*a* is highlighted to indicate the status of the network element 2404*c* whose identifier 2406 is displayed. Typically a red region indicates a faulty condition, such as a server failure, a yellow region indicates a warning condition, for example, high network traffic and a green region indicates normal operating conditions. In an alternative embodiment, the management console can display a map of the network and each network element is displayed in a color appropriate to its operational status.

The above arrangement is limited in its functionality and does not remedy problems within the network as they arise. Rather, it alerts a person, the network administrator, to the existence of the problem. Thus, the network still requires a great deal of slow, possibly flawed, human intervention in order to remedy any fault.

Figure 25A:
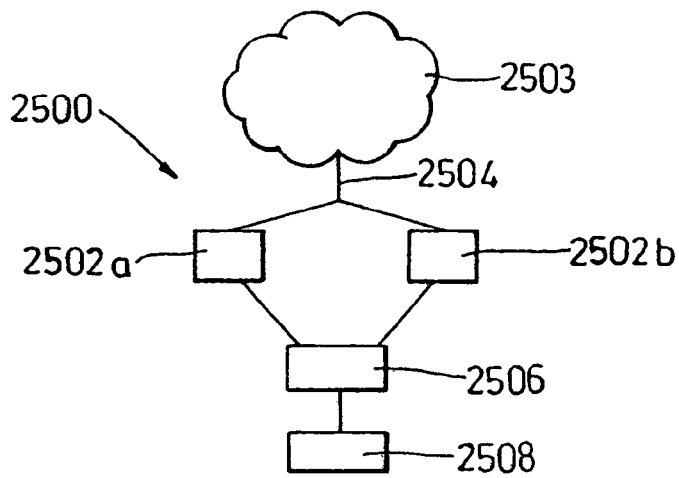
FIGS. 25a and 25b are prior art cluster arrangements for data management.

Referring now to FIG. 25*a*, a prior art shared everything clustered (SEC) server arrangement 2500 has two servers 2502*a,b* that are connected to a network 2503 via a shared network connection 2504. Both of the servers 2502*a,b* share a common network switch 2506 that connects them to a common storage device 2508. Any fault of the network connection 2504, the network switch 2506, or the storage device 2508, renders the arrangement 2500 inoperable. This is one of the reasons that clustered server arrangements require expensive, cluster certified components. Whilst increasing fault tolerance for the servers this SEC arrangement does not increase tolerance to faults in the network, storage or switches.

Figure 25B:
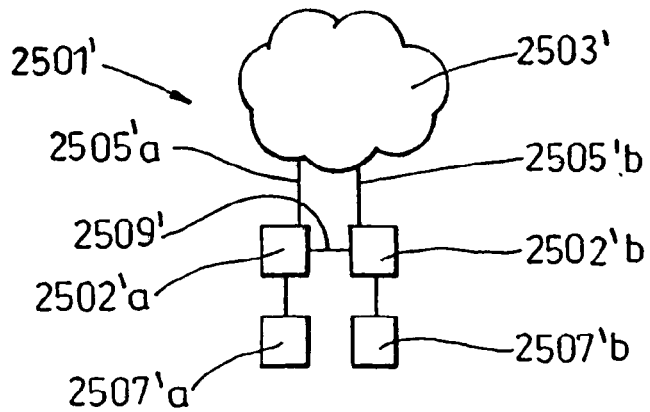

FIG. 25b shows a shared nothing clustered (SNC) server arrangement 2501' in which two servers 2502'a,b are connected to a network 2503' via respective, independent network connections 2505'a,b. Each of the servers 2502'a,b are connected to respective, independent storage devices 2507'a,b that have mirrored data contents. A link 2509' between the servers 2502'a,b enables the servers 2502'a,b to monitor each other's operational status. This arrangement requires expensive, cluster certified components and also there is a requirement to replicate infrastructure in this arrangement, and thereby increasing costs above those of the SEC server arrangements 2500 of FIG. 25a. Additionally, half of the infrastructure and data storage capacity can remain idle at any one time. Thus, this is a highly inefficient arrangement.

Figure 26:
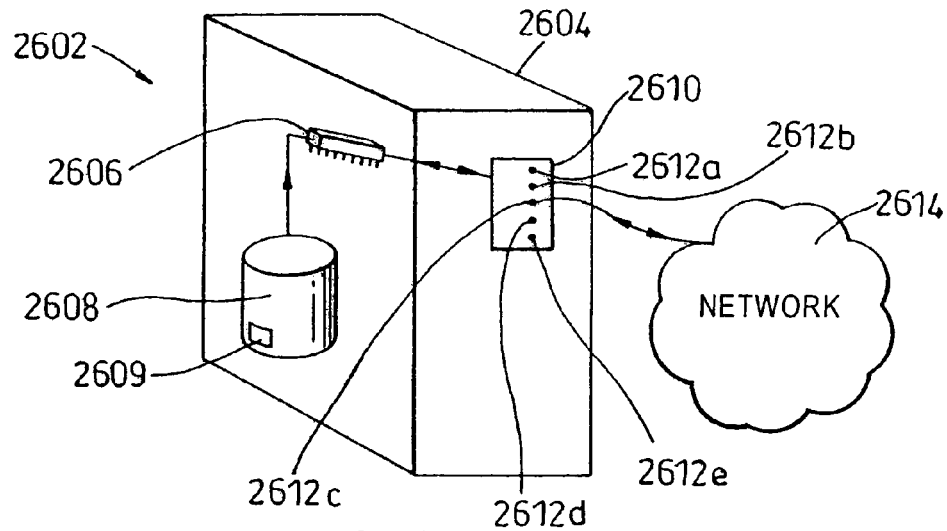
FIG. 26 is a schematic representation of a data management device according to an aspect of an embodiment of the present invention.

Referring now to the new arrangement of FIG. 26, a data content, or resource, server 2602 in accordance with an embodiment of the present invention comprises a housing 2604, a processor 2606, a storage device 2608 and a network interface card (NIC) 2610. The NIC has a plurality of input/output (IO) ports 2612a-e. Typically, the ports 2612a-e are configured to deliver a particular type of data content, or resource, that is stored on the storage device 2608, for example, HTTP (hypertext transfer protocol), RTSP (real time streaming protocol) or FTP (file transfer protocol), to a network 2614.

Is

The storage device 2608, which is typically a hard disc, has an NIC monitoring program 2609 stored therein that is passed to, and executed by the processor 2606 when running the program. The processor 2606 interrupts the NIC 2610 at regular intervals, typically every few seconds, and samples either or both of the outgoing bit rate or/and the incoming bit rate of the NIC. (Alternatively or additionally, the program can sample metrics previously collected by the operating system). The processor 2606 compares the sampled bit rate to a reference, or threshold, bit rate stored within the program. This reference bit rate can be varied in accordance with the type of NIC used and is typically a percentage of the ratio of the theoretical/actually deliverable bit rate capacity of the NIC. The interrupt frequency and the reference bit rate are usually set as default settings at the time of production of the program but can be altered by a network administrator.

Should the sampled bit rate exceed, or alternatively fall, below the threshold reference bit rate the processor 2606 executes a pre-programmed action. For example, when the server 2602 is serving video content, the server 2602 is capable of serving a certain amount of such requests. The processor 2606 samples the outgoing bit rate of the NIC 2610. As the NIC 2610 approaches its saturation level, typically 60-75% of the theoretical/actual deliverable ratio, the reference bit rate threshold is passed and the server 2602 copies the content, or resource, that is needed to serve the requested video content to a further server via the network 2614. The content copying is executed in order to maintain the availability of the content (resource) to users who can request it as a later point in time. The processor 2606 then supplies the network address of the further server to load balancing/routing control, for example, a content-location director or tables for the network, which can be held on the server 2602 or elsewhere on the network (for example, on a demand director server). Alternatively, or additionally, the further server can update the load balancing/routing tables, wherever they can be held.

It will be appreciated that the monitoring performed by monitoring programs need not be NIC usage level monitoring (or not only NIC monitoring), but could also be one or more of: local disc capacity, rate of local disc capacity growth/reduction over past set period (for example, N seconds), or NIC bandwidth growth/reduction over past set period.

Figure 27A:
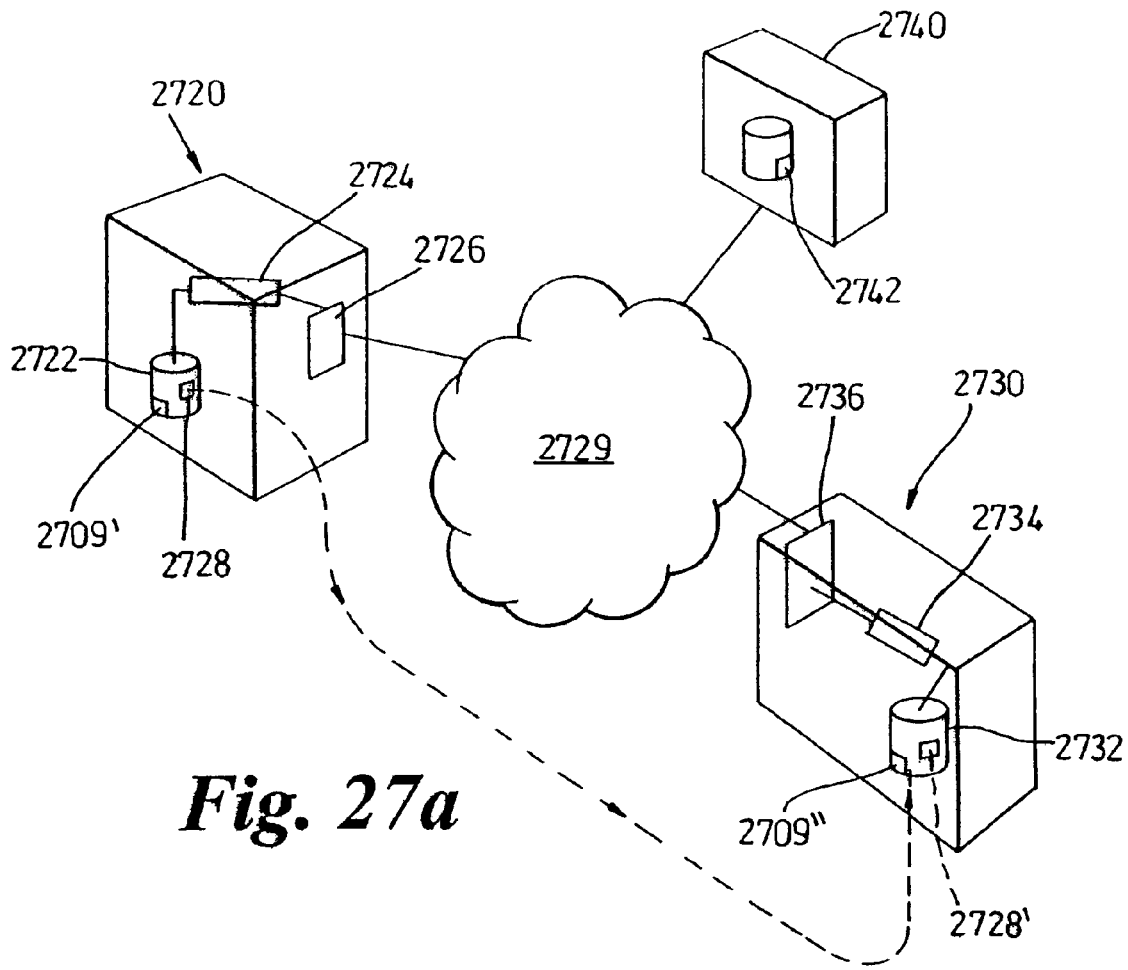
FIGS. 27a and 27b are schematic representations of other examples similar to that of FIG. 26.

As an even more concrete example, see FIG. 27a. This shows a first server 2720 having a hard disc 2722, a processor 2724 and a NIC card 2726, and a second server 2730 network connectable to the first server 2720 via a network 2729, and also having similar components (which have been given similar reference numerals). Server 2720 is running load monitoring software 2709' which notices when demand for a particular application 2728, stored in server 2720 or on network attached storage (NAS) accessed by server 2720, reaches a threshold level. If demand for the application 2728 were to rise above the threshold level, the server 2720 would struggle serving out the application to meet higher levels of demand. The processor 2724 reacts to the demand for application 2728 reaching the threshold level by copying the application 2728 to server 2730, via the network 2729, or just starts it (the application) if the content is there already. Similarly, application software necessary to serve out a video can already reside on a server having the desired video file, in which case the application software can be brought up to serve out the video, or to reduce the load on the server's CPU if the application software is not needed at any particular time. If application software is not available on a server, it can be telecommunicated to it.

In this example, the server 2720 also updates a routing, directing, or load balancing directory/database 2742 in a director server 2740 attached to network 2729 to inform the director server that application 2728 is now available on both server 2720 and server 2730. Thus, when a request to serve out application 2728 is received by the director server 2740, it now can choose to direct the request to server 2720 or server 2730, depending upon which it believes can serve out the requested application satisfactorily.

The application 2728 could, for example, be a video performance, for example, the latest James Bond film. The dynamic generation of extra resource (or application) serving capacity, in real time, without human intervention, allows a network to be dynamically horizontally scaleable. That is to say, simply by attaching extra servers to the network and moving around and/or creating extra copies of requested resource/applications (which need not involve attaching extra servers), it is possible to increase the ability of the network as a whole to serve out particular resources or applications.

It will be appreciated that the threshold, or trigger, level of demand on server 2720 could be one or more of: a certain level of processing power capacity required; a certain level of access of telecommunications channels to serve out the application; a certain level of bandwidth availability in the telecommunications channels. Thus, the application can be copied to another server (or run on a further port (logical network address) on the same server) because the processor 2724 cannot cope with too much additional demand, or because the telecommunications network relating to server 2720 is under strain (for example, NIC and 2726 can be approaching capacity).

It will also be appreciated that although the above discusses copying application 2728 to another server, server 2730, it could be copied or otherwise made available internally in the server 2720 (and any NAS linked to server 2720) so as to increase the capability of the server 2720 to serve out additional application 2728. For example, application 2728 could be originally served out of only one NIC port (in the sense of part of a logical network address), but later, at increased levels of demand for application 2728, it could be served out of two, or more, ports on the NIC of server 2720.

In cases where particular applications, for example data files, are associated with a particular port 2612*a*, the processor can monitor the particular port 2612*a* and copy the application data to an appropriate port on a further server, that is, one that is configured to deliver that particular type of data, if the port on the first server is reaching saturation.

The server 2602 can also be configured to spawn an appropriate application program on the further server (for example, server 2630) in order to allow the copied data content to be delivered, should the further server not already be configured to deliver the data content. That is, if the further server already has the software necessary to serve out data content that is copied to it, it is unnecessary to copy operating software, but if it does not have the requisite operating software, the requisite operating software will have to be copied as well as the subject matter data content.

The processor 2606 can also compare the sampled bit rate with a lower threshold level below which it is expected that the NIC 2610 bit rate will not drop. Should the sampled bit rate fall below this lower threshold limit, the processor 2606 runs a diagnostic code in order to determine if there is a fault, if IO traffic has just decreased, or whether to use a lower serving capacity on that server. If there is a fault, the diagnostic code will typically identify the likely fault source(s) and report it (them) to a system administrator.

It is possible, in an alternative embodiment, that the server 2602 can have more than one NIC. In this embodiment, the processor can monitor one, some or all of the NICs. Each NIC can have its own unique threshold limit or some, or all NIC threshold limits can be the same depending upon the types of NIC used.

Figure 27B:
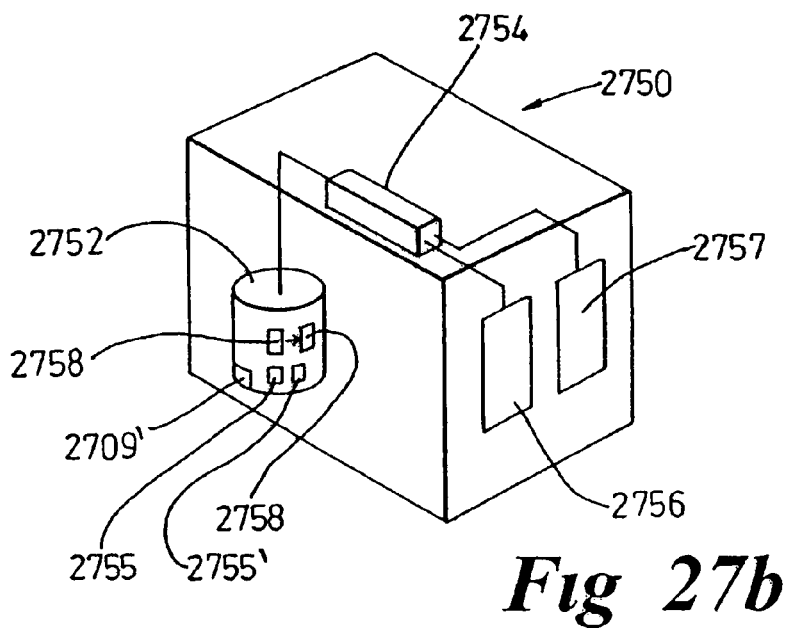

Referring to FIG. 27*b*, a server 2750 has a hard disc 2752, a processor 2754, a first NIC 2756 and a second NIC 2757. An application 2758, in this case a video movie, resides on the hard disc 2752. Self-monitoring "capacity to serve out" software 2709' is running on server 2758 to monitor when the server is likely to encounter difficulty in serving out application 2758 via original NIC 2756. When a threshold level of demand/serving capacity is reached, the software 2709' causes application 2758 to be copied again in the hard drive 2752 and the copy, referenced 2758', is used to serve out the same application 2758, but via the second NIC card 2757. Thus, the server 2750 now has a much greater capacity to serve out the resource that is application 2758 (possibly twice the capacity, or even more, depending upon the bandwidth and processing power allocated to NIC 2757).

Again referring to FIG. 27*b*, the disc drive 2752 does not only have the one application 2758 on it, but rather as other applications, only one of which being application 2755. In a similar manner to that described above, software 2709' also monitors usage of application 2755 and if extra serving-out capacity of application 2755 is required, it causes it to be copied and made available for serving out, either via an additional port on NIC 2756 or via second NIC 2757 (or both).

Figure 28:
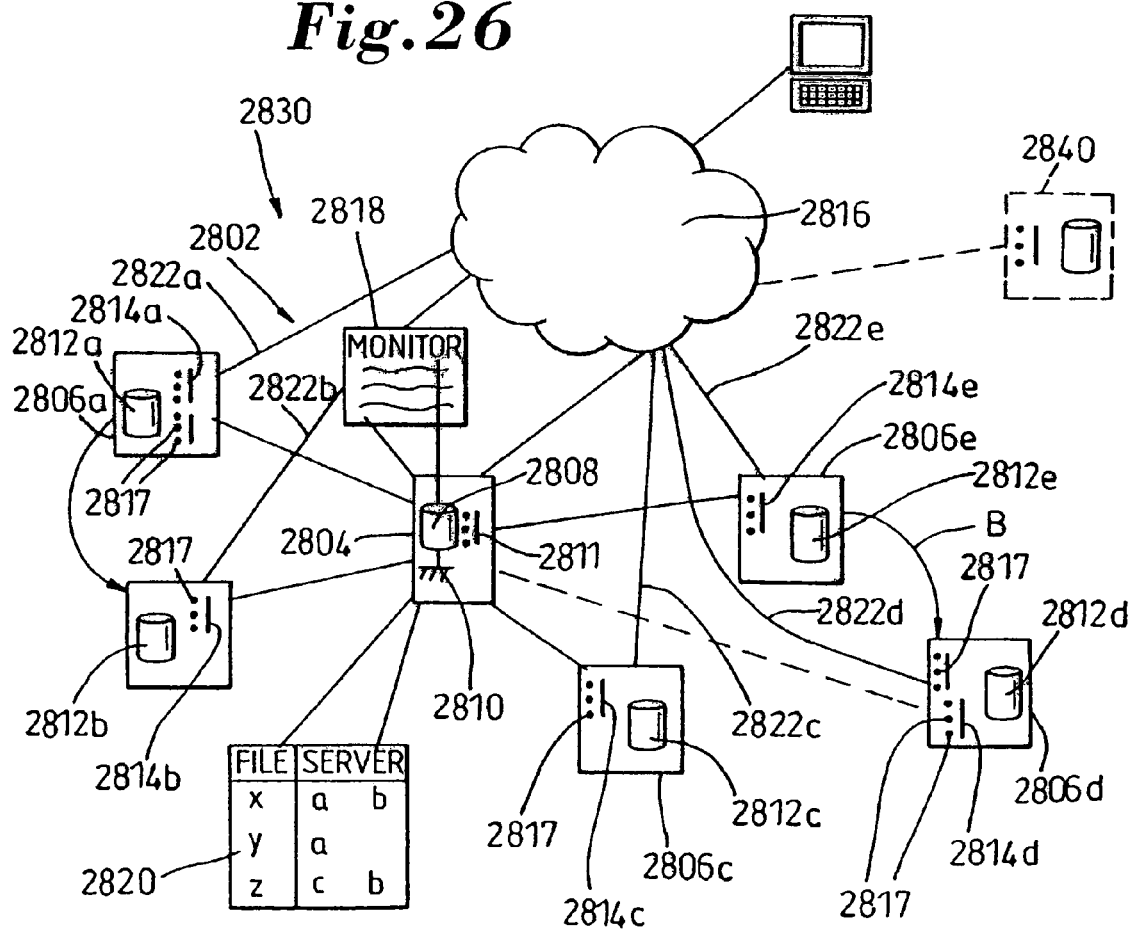
FIG. 28 is a schematic representation of a data management system according to an aspect of an embodiment of the present invention.

Referring now to FIG. 28, a server farm 2802 comprises a director unit 2804 and a plurality of servers 2806*a-e*. The director unit 2804 comprises a data storage device 2808, typically a hard disc drive, a processor 2810 and an NIC 2811.

The servers 2806*a-e* comprise data storage devices 2812*a-e*, typically hard disc drives, and NICs 2814*a-e*. The servers 2806*a-e* are connected to a network 2816 via their NICs 2814 *a-e*, each NIC 2814*a-e* can have a plurality of IO ports 2817.

The director unit's storage device 2808 has a monitoring program 2818 and a load balancing/routing table 2820 stored therein. When executed on the processor 2810, the monitoring program interrupts the NICs 2814*a-e* of the servers 2806*a-e* in order to sample their outgoing bit rate. If the sampled bit rate is above a pre-determined threshold or below a different predetermined threshold, the processor executes an action, as will be described in detail hereinafter. The threshold level is typically a percentage, for example 80% of the theoretical/actual deliverable bit rate for any particular NIC 2814*a*. The frequency of the interrupts and the threshold levels are initially set by the vendor but are typically subsequently alterable by a user. Suitable threshold altering input devices (for example, a keyboard) are connectable to the server, and suitable threshold-altering software resides in the server.

The monitoring program 2818 is usually written in a scripted language that does not require recompilation prior to execution and constitutes a control language rather than an application language. This makes the program 2818 flexible and powerful as it has direct implementational effect upon the system that it is intended to control.

The load balancing/routing table 2820 contains details of which resources or applications, for example, portions of data, are stored on which server 2806*a-e*. This arrangement is of particular importance if there is dissimilar data content distributed over the individual servers 2806*a-e* of the server farm 2802, that is, the data is not merely mirrored across all of the available servers 2806*a-e* of the farm 2802. One server can have different data on it with respect to the other servers and many or all of the servers can have largely different data on them (for example, different video movies). The table 2820 can also include an indicator of which port 2817 a file is associated with.

In one more concrete example of FIG. 28, the network of servers 2806*a* to 2806*e* comprise a Video Farm 2830: a collection of servers networked together and all serving out the same type of resource: video movies, and all accessible by a common input address for a resource (video) requesting party. A customer, referenced 2832, enters the address of the Video Farm 2830 over the Internet, (represented as network 2816). This request is conveyed to the director unit 2804. The director unit knows which video movies are present on which servers 2806*a* to 2806*e*. The director unit knows the remaining unused resource-serving capacity of each of the servers 2806*a* to 2806*e*, and it can load balance the request. Load balancing means that the director unit decides to which server to send the request for the serving out of the requested resource, weighting the current availability of resource and capability of the servers to serve it out successfully, and possibly even with a knowledge of future likely resource-serving capacity of the servers. For example, the director unit can simply direct the request to the server which has the most present, current, capacity to serve out the resource, assuming that there is more than one server with the requested resource/video available. However, the load balancing could possibly be more sophisticated and could take into account future availability, for example, if right now server 406*b* had two minutes of a movie left to play, and for server 2806*b* to accept the request to serve out a further requested movie to a new customer would take it much closer to its saturation threshold then if server 2806*c* dealt with the new request. Server 2806*b* can nevertheless still be allocated the new request to serve out if in two minutes time its available capacity will rise above the level available on server 2806*c* when server 2806*b* stops serving out the movie that has newly finished. This can be attractive if server 2806c has a popular movie on it that is likely to be requested again soon, and it is desired to keep serving capacity of server 2806c available for that eventuality.

If there comes a time when one of the servers, say server 2806a, gets to its threshold level of serving capacity, the server 2806a, or the director unit 2804, causes one or more of the resources of server 2806a to be copied to another server, say server 2806e, so as to increase the capability of the Video Farm as a whole to serve out the resources/video movies that are in demand.

Copying video movies from one server to another, or from one port to another, can reduce the ability of the Video Farm as a whole to serve out other, less popular, videos as the memory that contains the less popular video is overwritten with more popular video, and/or as telecom bandwidth is preferentially allocated to, or reserved for, popular videos.

Thus, the capacity of the Video Farm 2830 to serve out a particular video movie is dynamically and automatically adjustable, depending upon demand.

Furthermore, the Video Farm can add another server, not in the Video Farm at a first moment in time, but networked to or communicable with, the Video Farm. It can therefore dynamically increase its overall capacity to serve out videos (or network resources). It is horizontally scalable. Referring to FIG. 28, server 2840 is connectable to the Video Farm. The director unit 2804 knows the address of server 2840.

As resources, for example, video movies, are moved around between servers, the load balancing address list 2820 is updated to reflect the current addresses and capacity.

The director unit 2804 (or a unit that does no demand directing) can also be utilized in a fault-monitoring role. For example, the director unit 2804 monitors the average data traffic within the farm 2802. Should the average data traffic fall below a threshold, below which it should never fall, the processor 2810 runs a diagnostic code in order to determine whether a fault has occurred or whether it is just an unusual lull in network activity. The diagnostic will usually attempt to determine the source(s) of the fault and notify a systems administrator of them as well as determining if a fault has occurred.

In an alternative, or additional, fault-monitoring role, the director unit (or a monitor unit) 2804 monitors network connections 2822a-e to the servers 2806a-e and the usage of the data content of the servers 2806a-e. This monitoring will typically be on a per-port (part of IP address) basis as each content type, for example, HTTP, FTP, RTSP, typically requires an IO port (referenced as number 2817) to be configured for delivery of the content (this is not the same as a port upon which an application is running). For example, HTTP content is typically served on I/O port or connector 2880, FTP on I/O port or connector 2821 and RTSP content is served on another port or connector. Typically in the case of file-based data, for example, video and/or audio data, each file is associated with a particular I/O port or connector. It is possible to have multiple instances of copies of the same file being run from multiple ports or connectors on a single server.

The director unit 2804 retrieves the utilization information from the respective NICs 2814a-e of the servers 2806a-e. Upon noting a drop in utilization of a network connection 2822, possibly denoting a problem with a server or a failure of a server to respond to an interrogation signal, denoting a possible server failure, the director unit 2804 instigates a transfer of the data content that is unique to the server 2806a to a secondary server 2806b (as denoted by the arrow A in FIG. 28). If the secondary server 2806b does not have the correct applications to service the data from the failed server 2806a, the director unit 2804 spawns the requisite applications, subject to copyright considerations, on the secondary server 2806b. If it is not possible to copy the data from the server 406a, the director unit can access the data from its original source, for example a DVD, CD or tape media. The availability of the same data that is on a failed server, or the data on a server that cannot be accessed due to a telecom failure, is assumed. A reference data store (not shown) is provided to enable the contents of the downed server to be recreated on a "live" server.

Once the transfer of data and applications has been completed, the director unit 2804 updates the load balancing/routing table 2820 with the network address of the secondary server 2806b and the identity of the files, and where applicable a port identifier.

The director unit 2804 can also be used in high-level usage monitoring, in which the director unit 2804 monitors the connections to, and usage of the content on, the servers 2806a-e. This monitoring can be carried out on a per port basis as detailed hereinbefore. For example, if one of the servers 2806e is serving video data, the server can only serve a certain amount of 28.8 Kbps video channels from any NIC. As one of the servers 2806e becomes busy, that is, exceeds the predetermined threshold for its NIC 2810, or receives more requests for a file associated with any port 2817 than it can service, the director unit 2804 add his an additional server 2806f into the farm 2802 and facilitates the copying of part of all of the data content of the busy server 2806e to the additional server 2806f (as denoted by the arrow B in FIG. 28).

Although described as a software-based implementation, it will be appreciated that the 'program' 2818 can be implemented by any suitable hardware or firmware arrangement.

Figure 28A:
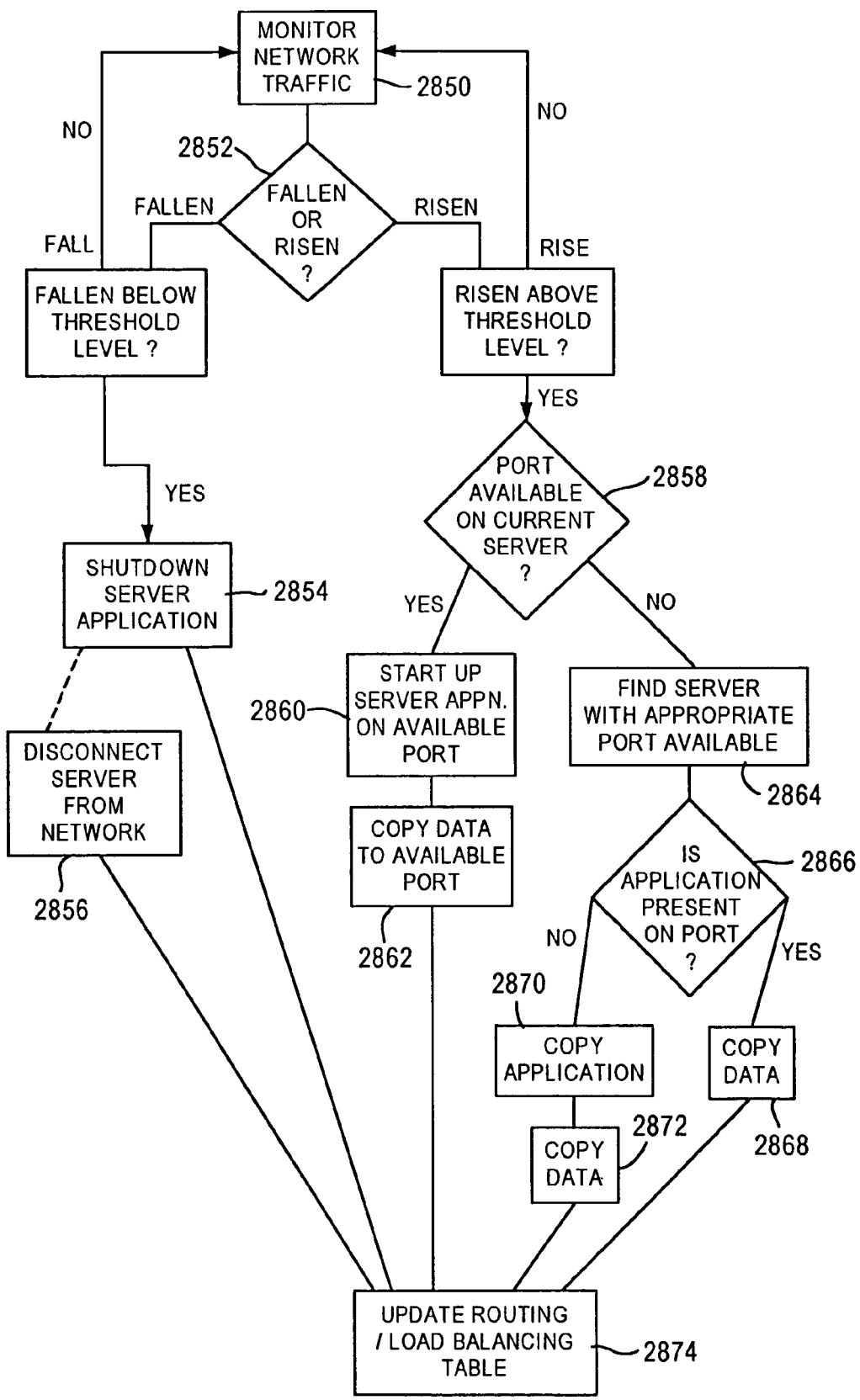
FIG. 28a is a flowchart detailing a method of data management according to an embodiment of the present invention.

Referring now to FIG. 28a, a processor monitors the traffic output for a server via the ports of a NIC (Step 2850). The NIC can be part of a data content server that is associated with the processor and the processor can be monitoring the status of its own NIC. Alternatively, the processor can form part of a director unit and can be arranged to monitor an NIC associated with a server that is remote from it.

The processor checks to see if the network traffic on a given port, monitored at the NIC, has risen or fallen (Step 2852). If the processor notes a fall in the network traffic below a predetermined threshold, it can issue an instruction to the NIC to shutdown a data server application on the port associated with fall in network traffic (Step 2854). If the processor notes a fall in network traffic across all of the ports of an NIC, the processor can issue an instruction to disconnect the server from the network (Step 2856).

If the processor notes an increase in the network traffic on a given port, it checks to see if there are any available ports on the NIC that are capable of serving the same format of data as the busy port (Step 2858). If there is an available port(s) capable of serving the format with spare bandwidth, the processor starts up a data server application on the available port (Step 2860). The processor facilitates the copying of the data associated with the busy server's port to the available port (Step 2862).

If there are no ports available that are capable of serving the same data format as the busy port, the processor issues an instruction to find a further server on the network with an available, suitable port (Step 2864). Once the further server has been found, the processor checks the further server to see if it has the required data server application present upon the suitable port (Step 2866). If the suitable port does have the required data server application therein, the processor facilitates the copying of the data associated with the busy server's port to the suitable port (Step 2868). The processor facilitates the data copying either by direct involvement in the copying process or by issuing an instruction to the busy server to copy the data to the further server.

If the further server's suitable port does not have the required data server application, the processor facilitates the copying of the data server application to the suitable port (Step 2870), again either directly or indirectly. The processor then facilitates the copying of the data to the suitable port (Step 2872) as described hereinbefore.

After completion of the above-mentioned actions associated with either a fall or a rise in network traffic, a database, that contains the location of data on the network, typically as a network address and a port identifier, and the results of the monitoring of the network traffic, is updated (Step 2874). The table is typically used as a routing and/or load-balancing table by a director class server or load-balancing switch.

Another area of use for the present invention is in data logging. The average traffic over a network should not normally fall below a certain level. A monitor server can be set up to watch the level of network traffic and have a minimum traffic level threshold entered into it (possibly an updateable/re-settable threshold). If the threshold level is ever reached, this could trigger a diagnostic code, based upon that threshold, to determine whether or not there was a problem. There can be reasons why traffic will reduce without a system problem being present (for example, Christmas Eve, Christmas Day).

It will be appreciated that hitherto it has not been possible to have cheap enough scalable content layer/tier of content servers, and that by allowing dissimilar content we achieve ready scalability. Being able to bring new servers into a network, with new content (content level granularity) is attractive. Furthermore, while rudimentary load-balancing demand directors are known, none have content and/or application awareness. That is, they do not know what content is where and/or how busy is a server to which a request could be directed. We can add new servers for specific functionality and content can be put onto them to alleviate demands on, for instance, a server serving a particular video stream that is requested by users frequently.

We can well wish to provide a content-type farm (a collection of servers acting together to serve out a given resource (or application) type (for example, video streaming 1). The farm can provide a load-balanced service.

Dynamically distributing content over available networked content servers so as to maximize performance of the network to serve out the content is a broad concept. A content server can be "self-aware" and migrate content when it decides to. Alternatively, a master server, or monitor server, can be "others-aware" and can decide to migrate content from other servers (it can also be "self-aware"). The monitoring can be via NIC cards/ports. Any server, for example, a content server, can be able to monitor groups of servers of interest (and hence be a monitor server).

Self-aware and others-aware functionality can be used to migrate data onto servers on a network and/or to look for other problems and compensate automatically for them. For example, an "impaired" server can be impaired because it is approaching capacity and will struggle to serve out further resources, or because it has a fault, or because the telecom links to it are faulty, or themselves struggling with capacity. Whatever the reason for the impairment to the ability of a server to serve out in the future resources in response to a request for resources available on the server, some embodiments of the invention allow these "impaired" or "missing" resources to be made available from other, less impaired, servers, so as to maintain the capability of the network as a whole to serve out the resource in question. They system can monitor for failures, or high-level usage, or both. Data logging can be performed to ensure usage levels are within acceptable/usual bounds.

An example of failure monitoring is: a management station/director server monitors connections to a collection of servers and usage of the content on those servers (this can be on a per port basis, for example, when running multiple instances of the same server application (for example, web serving/video streaming)). When a given server or servers fails, the management station ensures that new servers are brought into play by spawning the appropriate application processes on new servers to cope with the loss and content is replicated to the new servers from its source. In order to do this, the management station or director server monitors each of the compute elements delivering a given type of content (for example, web serving, video serving, FTP serving) and retrieves utilization information from each of the servers, when connections to a server fail, the management station/director server instigates a replication of the contents from its original source (which is assumed to be replicated elsewhere) on to the new server and starts appropriate application services on that server to enable it to serve the new content. The director then updates appropriate load balancing technology or routing tables to allow that new server resource to be utilized (for example, hardware load balancing switch) and the failed server is removed from the configuration until such time as it is repaired and can be brought into play.

An Example of High-Level Usage Monitoring is:

A management station/director server monitors connections to a collection of serves and usage of the content on those servers (this can be on a per port basis, for example, when running multiple instances of the same server application (for example, web serving/video streaming). When content becomes "busy" on a given server, or servers, the management station ensures that new servers are brought into play by spawning the appropriate application processes on new servers to cope with the demand and content is replicated to the new servers from its source.

The management station or director monitors each of the servers delivering a given type of content (for example, web serving, video serving, FTP serving) and retrieves utilization information from each of the servers. When connections to a server increase over a given threshold, the management station/director instigates a replication of the content onto the new server and starts appropriate application services on that server to enable it to serve the new content. The director then updates appropriate load balancing technology or routing tables in use to allow that new server resource to be utilized (for example, hardware load balancing switch).

It will be appreciated that a demand director/monitor server, or other processor, can evaluate whether a current level of servers and a current distribution of resources on those servers is capable of meeting expected reasonable levels of future demand, and if not, to take appropriate action to increase the chance of such future demand being met satisfactorily.

Although in principle the network benefits of aspects of the invention can be obtained with two content servers (and a demand director or master server, with perhaps one of the content servers being a demand director and/or master server as well), there will be many times when the benefits show more clearly when there are 3, 4, 5, 6, 7, 8, 9, 10, 20, or more content servers. There can be of the order of at least half a dozen content servers. By having a large number of content servers (for example, 6 or more), or a very large number of content servers (for example, 10-15 or more), it is possible to have significantly different content on different servers, possibly even sub classes of content of the same general kind on different servers. For example, it can be possible to have action movies on one server, comedy on another, science fiction on another, romantic on another, drama on another, etc.

It will be appreciated that a significant advantage of many embodiments of the invention is that the level of service available on a network accurately reflects consumption of the resources. We believe that it cannot be desirable to replicate data and application software services endlessly such that capacity is only ever over-provided. The amount of application serving that the collection of resource servers can provide at any one time can, in some embodiments, accurately reflect consumption of those resources by users. There can be a "low water mark" that ensures that there is never complete cessation of application serving in the event of consumers appearing, possibly suddenly appearing, not to want to resource anymore. It can well be undesirable to make the user wait until a resource can be copied and an application server brought up to service a request for that resource. It can therefore be desirable always to have at least one copy of all potentially available resources available for serving, or at least one copy of all potentially available resources present in the memory of a resource server (or accessible to the resource server), and appropriate application software for serving out any specific resource.

Figure 29:
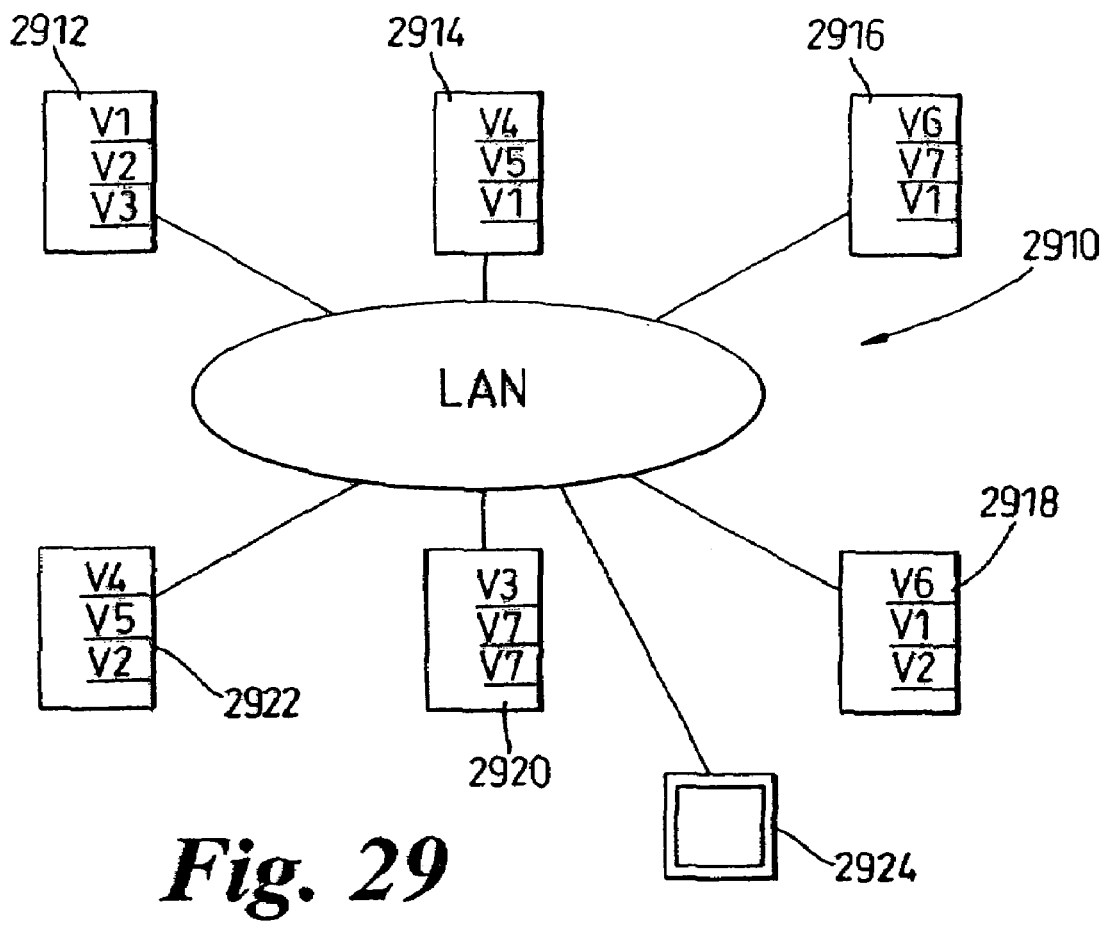
FIG. 29 is a representation of a LAN of video servers, comprising a video farm.

Referring to FIG. 29, a further example of a Video Farm 2910 comprises video servers 2912, 2914, 2916, 2918, 2920, and 2922 connected in a local area network 2924. A user 2926 is connected to the network 2924 (possibly via the Internet). Each video server has a number of video movies therein, for example, about 100 to 500 movies on each, with each movie being of about 1½ hours-2 hours duration. Again referring to FIG. 29, each video server has 3 movies. In the case of video server 2912, they are movie V1, movie V2, and movie V3. In the case of video server 2914, they are movie V4, movie V5, and another copy of movie V1. It will be seen that some movies are present on more than one video server. Furthermore, sometimes more than one copy of a movie is present in the same video server (see video 2920 which has two copies of movie V7).

Figure 30:
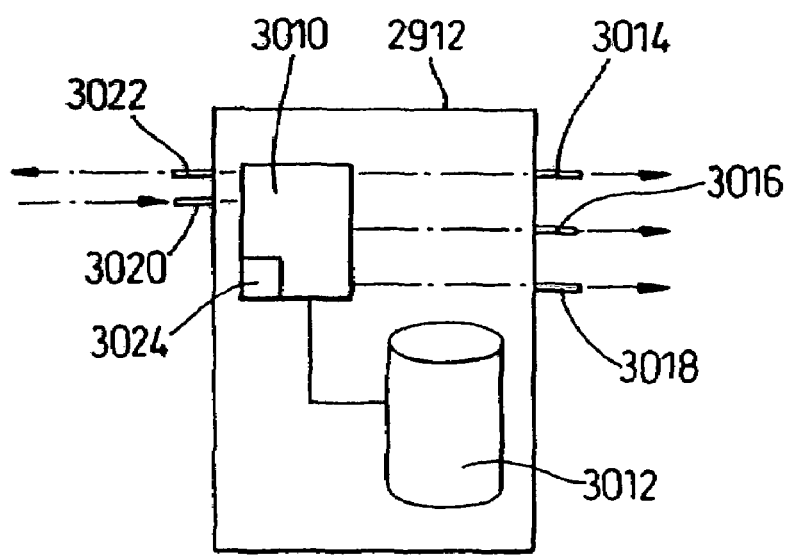
FIG. 30 is a representation of a video server of FIG. 29.

Referring to FIG. 30, each video server has a central processor 3010, a memory 3012 containing the video movies, a number of video streaming output ports 3014, 3016, 3018 or connections, a monitoring input port or connection 3020, and a control signal output port or connection 3022. Control software 3024 resides on the processor 3010 of each video server.

The control software 3024 makes each server capable of being "self-aware" and of being "others aware", in the sense of being able to determine the performance abilities and/or characteristics of each video server in the farm 2910.

This enables the video server to self manage and execute remedial actions based upon their visibility of video content usage on the network, and upon the ability of each video server to deliver video content. It also enables an individual server to contribute to managing the performance as a whole. The video farm 2910 is able to distribute video content dynamically, in response to changing conditions, over the video servers of the farm, and to bring up a new serving processes when it is determined appropriate to do so. For example, if one video server failed, for example, server 2916, the video farm can create extra copies of those videos that were capable of being served out from server 2916 on the other servers, so that the overall capacity of the farm to serve out videos stored upon (or accessed via) a faulty server is not significantly changed. Again referring to FIG. 29, fault tolerance for video files is available, for example, for each server having certain videos, or video items, stored therein, there is another copy of each of its video items stored on at least one other server. This means that if one server is faulty, or the telecommunications lines to it are faulty, its content is still accessible from elsewhere on the farm, available to be copied/brought into service.

In the video farm 2910 one of the video servers, say server 2912, takes the role of master video content servability monitor and is aware of its own operational conditions and parameters and has the operational conditions and parameters of the other servers 2914 to 2922 communicated to it via its port 3020.

If for any reason the current master video server, server 2912, is unable to perform its role properly (for example, it develops a fault or its telecommunication links to the rest of the farm become impaired) another of the video servers can take over as the master video server.

Figure 31:
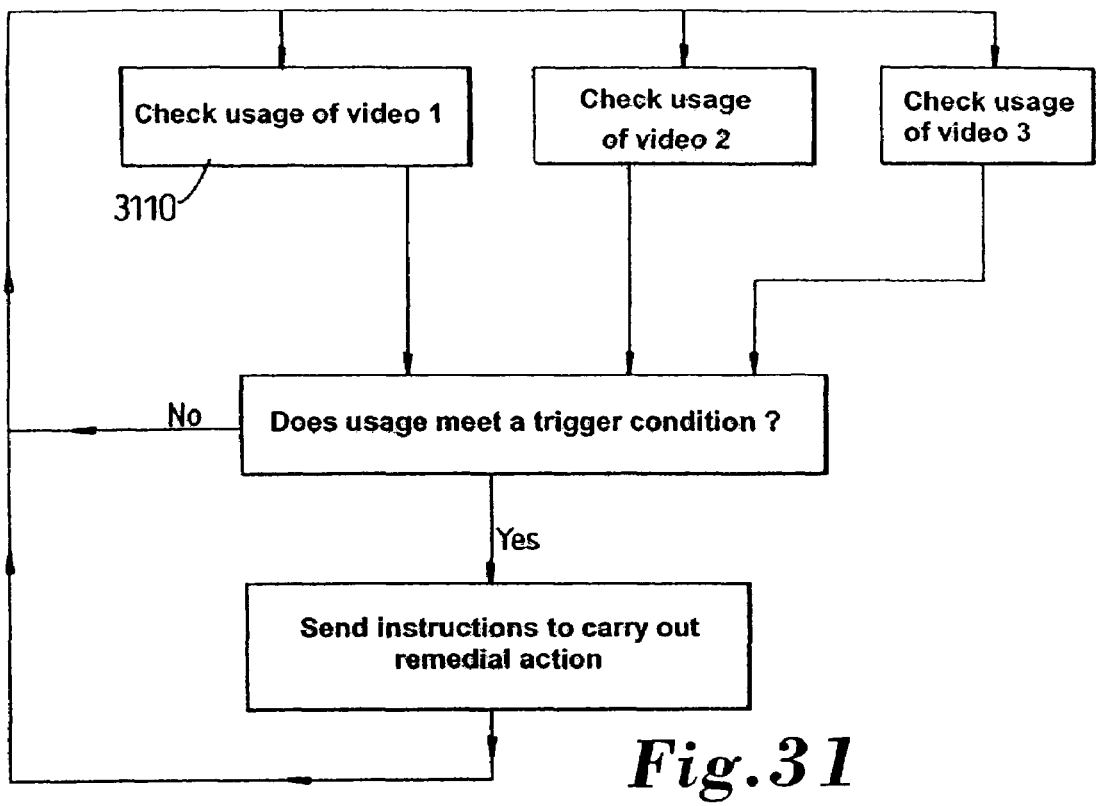
FIG. 31 is a representation of a monitoring routine of the video farm of FIG. 29.

FIG. 31 illustrates one of the software processes being performed on the processor 3010 of the master video server, for example, server 2912.

Gating thresholds are programmed for performance parameters, possibly by a system manager (person) and are generally alterable/reprogrammable (a generic fixed threshold would not be able to adapt to the usage conditions experienced). In FIG. 31, the performance parameter is to the level of usage of each video item (for example, video movie) capable of being served out by the video farm. Usage levels for video items are checked in parallel, rather than sequentially, as illustrated.

The master video processor determines how many video items of each specific video item is being served out (for example, how many video V1s are being streamed out, how many video V2s are being played, how many V3s are being played, etc). The number of video items currently being played is checked for each video item (movie) against an evaluated known total capacity of the farm to serve out each specific video item. It is desired to have the level of resources in the farm such that it is possible to serve out another specified number of each video item, in addition to those currently being served out. This additional, reserve capacity is the number of servable video items that can be the same for each of the video items (that is, the farm is capable of serving out 3 more V1s, 3 more V2s, 3 more V3s, etc), or the number of servable video items that can be different for at least one of the servable video items (for example, 5 more V1s in reserve, 2 more V2s, one more V3, etc). It can be desirable to have a higher reserve capacity to serve out a popular video movie than a relatively unpopular movie. For example, a newly released movie can be in more demand by users and it can be appropriate to have more reserve capacity to serve out that movie than an older "classic" movie (such as Gone with the Wind). More users are likely to want to access a new release in a short time.

Thus, upon checking the usage of video, step 3110 in FIG. 31, the processor 3010 compares the actual number of videos of each specific title being served out (step 3310 in FIG. 33) with the potential capability of currently being served out (step 3312) and establishes a reserve capacity 3314 to serve out video V1 in the short-term future. This reserve capacity 3314 is compared with a maximum threshold level 3316, and with a minimum threshold level 3318 and the capacity of the farm to serve out extra additional copies of V1 in the future is increased, step 3320, or decreased, step 3322, depending upon whether the minimum or maximum threshold is met or exceeded.

The capability of the farm 2910 to serve out a specific video V1 can be increased by starting up appropriate video serving application software on a video server that already has the specific video V1, or by creating extra copies of it on the servers 2912 to 2922, and/or making available greater telecommunications capacity for V1, for example, by opening up video serving applications on ports (parts of the network address space) of the video server that were previously used for something else (for example, voice telecom or text communications). Similarly, capacity to serve out V1 can be reduced, freeing up capacity to serve out other videos, by shutting down software applications that access V1 in the memory of one or more servers and/or by overwriting or deleting V1 in the memory of one or more servers. It is probably best as a first measure simply to disable the ability of the server to serve out V1 (still retaining V1 in memory of the server, for example, in disc storage accessible by the server). This is easier to reverse in the future and often it is the processing power of a server's CPU, or the telecom availability at its connecting ports, that restricts serving capacity rather than absolute lack of memory accessible by the server for extra copies of popular videos.

Figure 32:
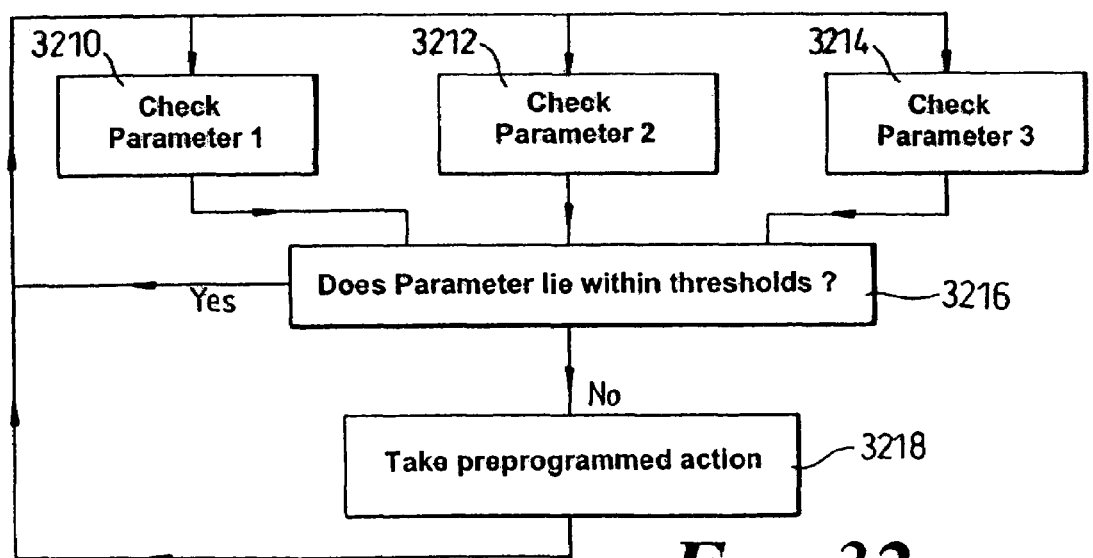
FIG. 32 is a representation of another monitoring routine of the video farm of FIG. 29.

FIG. 32 is a schematic representation of software on the processor 3010 for checking other parameters that can affect the overall ability of the farm to serve out content. In steps 3210, 3212, and 3214, the processor checks a number of different parameters (in this case 3) for each of the servers in the network (in this case 6). The parameters are checked in separate threads of execution (that is, in parallel). In step 3216, each parameter is compared with one or more respective thresholds (for example, parameter/with maximum threshold 1 and minimum threshold 1, and parameter 2 with maximum threshold 2 and minimum threshold 2). In step 3218, the processor sends out control signals in response to threshold conditions being true. The actions initiated by the control signals are pre-programmed, typically by a system administrator (person), and can typically be amended and new different actions input, or new different threshold conditions can be input (again typically by a systems administrator).

Figure 34:
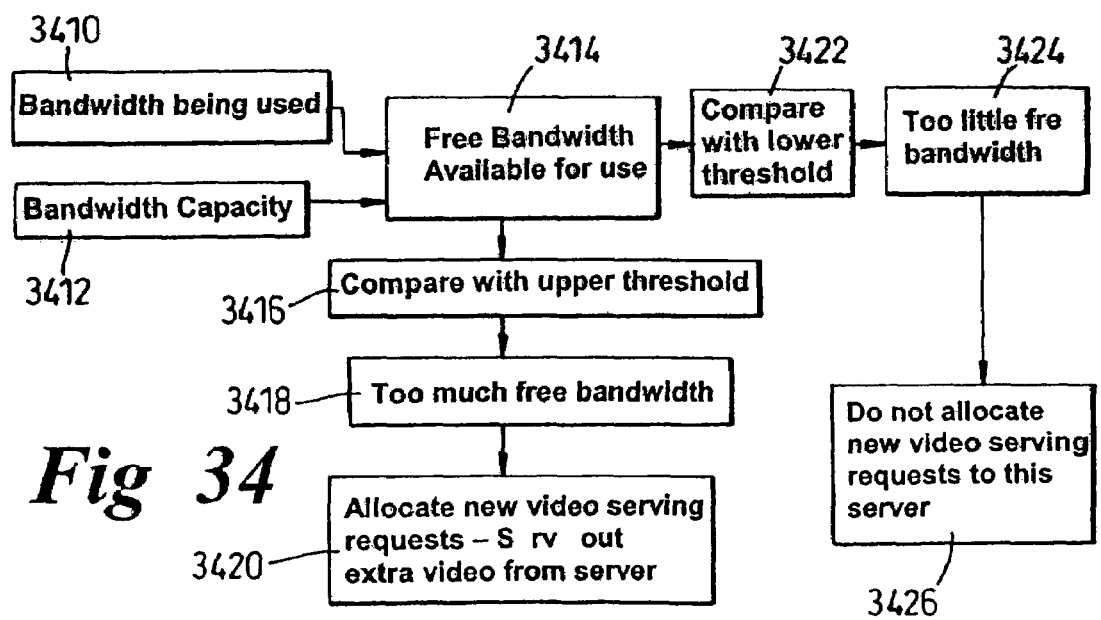
FIG. 34 is a representation of schematically checking bandwidth usage.

FIG. 34 is a schematic representation of one parameter being monitored, namely, the bandwidth available for new users at a specific video server, say server 2922. The master server 3022 polls each of the other servers 2914-2918 in the network to ask them how much bandwidth they are using. Each server runs a routine on its external network communications NIC card that monitors an appropriate parameter and reports to the master server. Thus, the bandwidth being used is established for each server, step 3410. The potential available bandwidth to each server is known to the master server (step 3412), or to each server itself. This enables a bandwidth free for future use, step 3414, to be established. This is compared with an upper threshold, step 3416 and if it is above that (too much bandwidth available, step 3418) then remedial action is taken. In this case, in step 3420, additional requests to serve out new videos are allocated to a video server (for example, server 2922) that is adjudged to have too much free bandwidth. That is to say, in a load balancing routine controlled by the master server 2912, requests to be served a video item can be allocated to whichever video server is adjudged to have sufficient, or best, telecommunication availability. This can at least be one of the factors in deciding to which video server a request for a video is sent (assuming more than one server has the video available for serving).

Again referring to FIG. 34, in step 3422, a comparison is made of the free bandwidth available for use, for each server, with a lower threshold. If it is established that there is too little free bandwidth, step 3424, then remedial action is taken. This action could be, as in step 3426, the decision not to direct new requests for videos to be served out to the particular server that is getting close to its bandwidth capacity.

Steps 3470 and 3426 need not be as described. For example, a video actually being served out of the server that is adjudged to be too busy (too great a strain on telecommunications links) can be started up on another server, and (optionally) shut down on the busy server with an arrangement so that a user currently receiving the video from the busy server does not notice the transfer of the source of the video to the less busy server.

The thresholds can be adaptive, in the sense that a threshold for a specific server can go up or down depending upon what is happening elsewhere in the network. For example, while it can normally be undesirable to start up more videos on a server that is using 80% of its telecom bandwidth, the master server can not have any choice if that server is the only server to have a copy of the requested video available for serving to a new user.

As a further example, the network can have a control database that maintains network-wide global, serving state details for each server. This can be held in the master server, or elsewhere.

A guide to what might be appropriate code is:

EXAMPLE 1

Database (vf0, vf, vf, vf) {query ("select*from showing")} (.inactive<3): 'cool'+.titleID (.inactive>3): 'heat'+.titleID } every 2 seconds

EXAMPLE 2 exec ('bandwidth vf2') {<1024 k: 'bring up vf3'>2048 k: 'mover vf2'} every 10 seconds The wrapper whole database ( . . . ) { } specifies a database to run queries against, within that, queries are of the 'exec' or 'query' form. The fist example here specifies that is a title that is currently showing has more than three inactive connections, it should reduce that serving capacity for that title by calling an external process called 'cool' with an argument specifying which title to cool. Conversely, if there are less than three inactive connections for a given title, then more serving processes for that title should be started up, by calling an external process called 'heat' with an argument specifying which title needs more serving capacity from the farm. In both cases, cool and heat then run queries against serving capacity of the farm and make judgements based on appropriate serving loads on resource servers to determine where those new serving processes are started up.

The case of example 1 illustrates the desire that a given video title served should never have too many active processes able to serve it. Hence, if there are more than three active connections, reduce the ability to serve that title. In this case, it is assumed that this would be the result of running the external process 'cool' with the title to cool as a specified argument (that is, .title 12 would be 'cooled').

The second case illustrates the desire to check the available bandwidth from a video server called vf2. The separate code called "bandwidth" can be increased on either the server vf2 or upon a remote server connected to vf2 via a network. When increased, vf2 "bandwidth" returns the data transfer rates from vf2, typically obtained from the network card of vf2. If vf2's transfer rate is above an upper threshold value, for example, 2 MB/sec, another server is brought into use in order to reduce the load on vf2. If vf2's transfer rate is below a lower threshold, for example, 1 MB/sec, it will typically be allocated more content to serve, as it is not fully utilizing its data transfer capacity.

When run upon a remote server, "bandwidth" samples the data transfer rate that is available from vf2. In this case, if the sampled available transfer rate is below a threshold value, for example, 1 MB/sec, vf2 is using a significant fraction of its available data transfer capacity and therefore, another server is added. Conversely, if the sampled available transfer rate is above a threshold value, for example, 2 MB/sec this indicates a significant fraction of vf2's data transfer capacity is unused. Therefore, vf2 can be allocated more content to serve.

In either case, it is assumed that the external processes "bring up" or "move" will cause those events to occur.

All of the items within the database ( ) { } block are run in separate threads, that is, not sequentially so, in this manner, as soon as the condition occurs, a true remedial action is taken. The condition can also be set for various times (for example, 'every N seconds'). This ensures that the monitoring process does not swamp the CPU upon which it is being executed and also that if measuring statistics, they are measured over an appropriate time period, that is, in the case of network statistics, it is not burst capacity that is being measured.

Figure 33:
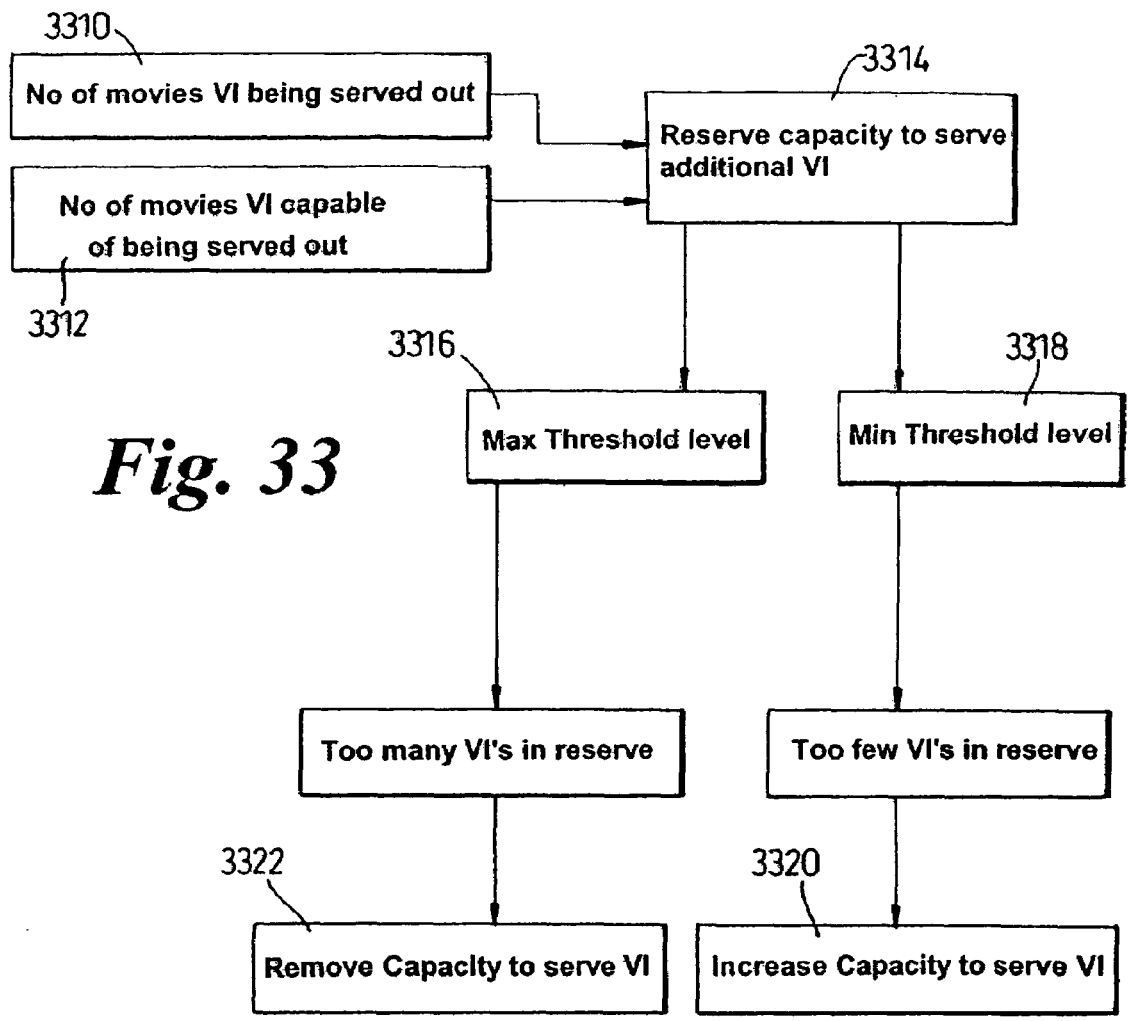
FIG. 33 is a representation of schematically checking movie usage.

It will be appreciated that although FIGS. 33 and 34 used monitored capacity and unused capacity was then evaluated therefrom, it can be possible to monitor unused capacity directly.

The master server is typically aware of its own activities as a video server. If it is not actually a video server, then clearly it need not know of its own serving activities/capabilities.

There are at least three things that can impair the ability of a video server to serve out a video to a user, namely, the telecommunication capability from the server's output port or connection to the user, the internal telecommunication within the server from the server's memory to its output port or connection (the video has to get from memory to I/O port), and the CPU performance (the CPU has to control, manage, and perhaps format or encode the data stream, and call it from memory). All three of these can be parameters to be monitored. We have already discussed the first. It is possible to monitor the I/O streaming performance of the disc sub stream (disc to I/O port), that is, the storage I/O performance. It is also possible to monitor CPU performance (for example, how many of its clock cycles per second are actually being used).

By "memory" of the server is meant fast access chip memory, disc (non-volatile) memory inside the server, and memory attached to the server, but not necessarily physically in its housing.

It will be appreciated that each video server could run its own diagnostic on itself and communicate the results to the master server. Alternatively the master server could interrogate the other servers for their self-performed diagnostic result. Alternatively, the master server could perform the diagnostic routines on the other servers.

When a server is completely cut off from the remainder of the network, or is completely "dead", it cannot communicate anything to the master server. The absence of information/an appropriate response to a query can itself serve as information to the master server to be acted upon.

Performance/capacity information can be obtained for each video item that is, each video movie can be evaluated as a separate thread of inquiry.

It will be appreciated that a demand director/load balancing server could take into account not only the question of whether a particular video server has a particular video content upon it, but also whether its telecommunications, CPU, and memory access were capable of serving out a requested video effectively, and could allocate requests with this capacity in mind. Furthermore, if it seemed appropriate to re-distribute video content over the video servers in the network this could be done automatically. For example, if a particularly busy video server had one copy of movie 101, and only one other quieter video server had a copy of movie 101, the master server could cause movie 101 to be copied as a precaution, for example, from the "quieter" server, to another server so that there was an increased spare capacity to serve out movie 101.

Similarly, if a specific server developed a fault and was inoperative, or could not be communicated with (fault in telecommunications), then the master server could take that into account while dynamically controlling the distribution of video content over the receiving servers and/or while allocating requests for videos to be served out to specific ones of the remaining video servers.

The master video server 2912 checks parameters beyond usage levels of specific video movies.

It is desirable to load balance telecommunications over the video farm so as to avoid bottlenecks in data transfer/video streaming.

Other parameters that could be monitored, and used to control overall network performance, that is, affecting things, include:

Memory usage
Latency (response time to "pings")
CPU utilization
Average I/O rate per second
Other performance indicative statistics.

The above could be per server (and usually will be), but could also be evaluated for the network as a whole. For example, it can be possible to determine that nothing is wrong with any server but that nevertheless the network is struggling to meet demand and that more servers and/or better telecoms and/or better CPU's are needed. The remedial action can be automatic (for example, adding another server), or it can comprise the automatic generation of a report or alert to be acted upon by a human.

The response to monitored parameters meeting pre-programmed conditions could be based upon existing demand, or could be policy-based to take into account projected future demand. For example, greater free reserve bandwidth can be required at a time of day when it is known people like to watch video movies (for example, 8:00 pm) and the acceptable thresholds can be adjusted, automatically or manually (for example, by altering a program) to allow for that. The software allows programmable specification of network and serving conditions that require remedial action and the action(s) to be taken based upon those conditions becoming true.

The memory of a video, or resource, server typically includes non-volatile disc memory.

It will be appreciated that the embodiments of the present described above can be used with each other, in any combination.

The invention claimed is:

1. A method of serving out video over a network of video servers, comprising:
   establishing for each video server in a network of video servers an established ability of each video server to serve out a specific video item;
   evaluating an overall capability of the network of video servers to serve out the specific video item using said established ability of each said video server; and
   varying said overall capability to serve out the specific video item based upon the evaluation;

wherein the video item is a video item for which there is less demand than for other video items, and wherein varying the overall capacity of the network includes decreasing the capacity of the network as a whole to serve out the video item.

2. A method of serving out video over a network of video servers, comprising:
 establishing for each video server in a network of video servers an established ability of each video server to serve out a specific video item;
 evaluating an overall capability of the network of video servers to serve out the specific video item using said established ability of each said video server; and
 varying said overall capability to serve out the specific video item based upon the evaluation;
 identifying a problem with a particular video server that reduces a capability of the particular video server to output a specific video item; and
 providing additional capability to output the specific video item from at least one other video server, thereby improving capacity of the network to output the specific video item;
 wherein providing additional capability comprises at least one of:
 (1) copying the specific video item to another server; and
 (2) executing application software on a video server on which the specific video item resides, the application software configured to make the specific video item available for outputting.

3. A method according to claim 2, wherein the specific video is copied from one networked video server to another networked video server.

4. A method according to claim 3, wherein providing additional capability comprises making the specific video item available on an additional port address of at least one of the particular video server and the other video server.

5. A video server monitor configured to monitor a network of video servers comprising at least one video item, the video server monitor comprising:
 an input adapted to receive at least one input representative of a capability of each video server to serve out each video item;
 an output adapted to output at least one output control; and
 at least one processor configured to monitor the network of video servers, the at least one processor comprising:
 a first module for processing the at least one received input;
 a second module for evaluating the overall capacity of the network to sever out each video item based upon the received input; and
 a third module for generating the at least one output control, the at least one output control adapted to vary the overall capacity of the network to server out a selected video item;
 wherein said processor is adapted to:
 establish if demand for a specific video item is below a minimum threshold level; and
 generate at least one output control that decreases capacity of the network to serve out the specific video item.

6. A network of video servers having video items available for serving, and a video server monitor, said monitor comprising an input adapted to receive inputs, an output adapted to output outputs, and a processor adapted to process said inputs and generate said outputs, said inputs being representative of capabilities of each of said video servers to serve out video items potentially servable from respective said video servers; and said processor, in use, being capable of evaluating an overall capacity of said network from said inputs representative of each individual video server's capacity for each video item, and said processor being capable of using its evaluation of said overall capacity of said network to control said outputs, said outputs being adapted to vary said overall capacity of said network to serve out a selected one of said video items;
 wherein said processor is adapted to establish if demand for a specific video item is below a minimum threshold level and if so is adapted to produce outputs which are capable of decreasing capacity of said network as a whole to serve out said specific video item.

7. A network of video servers wherein each video server is aware of its own capability to serve out videos that it has, and is aware of a capability of each other networked video server to serve out videos that they have, and wherein one of said video servers assumes a role of master video serving capacity controller and assesses a future capability of said network as a whole to serve out an additional copy of each video that is potentially servable in said network, and compares this assessed future capability for each video with threshold capabilities for each video and upon said assessed capability reaching said threshold capabilities said controller takes pre-programmed action automatically.

8. A network according to claim 7 wherein said pre-programmed action includes at least one of (i) increasing capability of said network to serve out a video that has an assessed capability below a minimum threshold by copying said video to an additional video server, or by running suitable video serving software on an additional port address of a video server and/or (ii) reducing capability of said network to serve out a video that has an assessed capability above a maximum threshold.

9. Software for running on a processor of a video server, said video server having a memory containing video items, an input port, a control output port, and a video streaming port, said software comprising:
 a monitor routine adapted to at least one of process signals received by said input port from other video servers networked to said video server so as to establish a network-wide usage level for each video item, and establish a capacity of said network to serve out an additional copy of a video item; and
 a video item availability-controlling routine, which based upon the established usage level for each video item, causes varies an ability of said network to serve out at least one specific video item;
 wherein the software causes at least one of:
 an additional copy of an existing specific video item to be made on a video server of said network; and
 bringing up on a server an application software adapted to serve out an existing specific video stem;
 thereby increasing capacity of said network to serve out said specific video item; and
 wherein the software causes said specific video item to be copied within a video server to occupy more memory of said video server, thereby increasing capacity for said video server to serve out said specific video item.

10. A method of modifying availability of video items on a network of video servers comprising:
 providing a network of video servers wherein each video server is aware of its own capability to serve out videos that it has, and is aware of a capability of each other networked video server to serve out videos that they have,
 wherein one of said video servers assumes a role of master video serving capacity controller and assesses a future capability of said network as a whole to serve out an additional copy of each video that is potentially servable in said network, and compares this assessed future capability for each video with threshold capabilities for each video, and upon said assessed capability reaching said threshold capabilities said controller performs at least one pre-programmed action; and setting said maximum and minimum threshold.

11. A method of modifying availability of video items on a network of video servers comprising:

providing a network of video servers wherein each video server is aware of its own capability to serve out videos that it has, and an assessment of an aggregate capability of said network to server out each video is made by aggregating individual video server capabilities, and modifying availabilities of videos on specific video servers so as to modify the aggregate capability of said network to serve out specific video items; and facilitating the replication of video content of said server that is serviced by a failing port address to a further video server.

* * * * *